US011608546B2

(12) United States Patent
Allard, Jr. et al.

(10) Patent No.: US 11,608,546 B2
(45) Date of Patent: Mar. 21, 2023

(54) ALUMINUM-CERIUM-MANGANESE ALLOY EMBODIMENTS FOR METAL ADDITIVE MANUFACTURING

(71) Applicants: UT-Battelle, LLC, Oak Ridge, TN (US); Eck Industries Incorporated, Manitowoc, WI (US); Iowa State University Research Foundation, Inc., Ames, IA (US); Lawrence Livermore National Security, LLC, Livermore, CA (US); University of Tennessee Research Foundation, Knoxville, TN (US)

(72) Inventors: Lawrence Allard, Jr., Knoxville, TN (US); Sumit Bahl, Knoxville, TN (US); Ryan Dehoff, Knoxville, TN (US); Hunter Henderson, Knoxville, TN (US); Michael Kesler, Knoxville, TN (US); Scott McCall, Livermore, CA (US); Peeyush Nandwana, Oak Ridge, TN (US); Ryan Ott, Ames, IA (US); Alex Plotkowski, Knoxville, TN (US); Orlando Rios, Knoxville, TN (US); Amit Shyam, Knoxville, TN (US); Zachary Sims, Knoxville, TN (US); Kevin Sisco, Knoxville, TN (US); David Weiss, Manitowoc, WI (US); Ying Yang, Knoxville, TN (US)

(73) Assignees: UT-Battelle LLC, Oak Ridge, TN (US); Eck Industries Incorporated, Manitowoc, WI (US); Iowa State University Research Foundation, Inc., Ames, IA (US); Lawrence Livermore National Security, LLC, Livermore, CA (US); University of Tennessee Research Foundation, Knoxville, TN (US)

(*) Notice: Subject to any disclaimer, the term of this patent is extended or adjusted under 35 U.S.C. 154(b) by 215 days.

(21) Appl. No.: 16/894,551

(22) Filed: Jun. 5, 2020

(65) Prior Publication Data

US 2021/0214823 A1 Jul. 15, 2021

Related U.S. Application Data

(60) Provisional application No. 62/979,720, filed on Feb. 21, 2020, provisional application No. 62/959,718, filed on Jan. 10, 2020.

(51) Int. Cl.
 *C22C 21/00* (2006.01)
 *B33Y 70/00* (2020.01)
 (Continued)

(52) U.S. Cl.
 CPC .............. *C22C 21/00* (2013.01); *B22F 10/00* (2021.01); *B33Y 70/00* (2014.12); *B22F 2301/052* (2013.01); *B33Y 10/00* (2014.12)

(58) Field of Classification Search
 CPC ....... C22C 21/00; C22C 1/0416; B22F 10/00; B22F 2301/052; B22F 10/20; B33Y 70/00; B33Y 10/00; B33Y 80/00; Y02P 10/25
 See application file for complete search history.

(56) References Cited

U.S. PATENT DOCUMENTS

| 2,656,270 A | 10/1953 | Russell |
| 3,252,841 A | 5/1966 | Foerster |

(Continued)

FOREIGN PATENT DOCUMENTS

| CN | 102877060 A | * | 1/2013 |
| CN | 104004947 A | | 8/2014 |

(Continued)

OTHER PUBLICATIONS

Coury, et al., "Design and production of Al—Mn—Ce alloys with tailored properties," Materials and Design, vol. 110, pp. 436-448, Aug. 4, 2016 (Year: 2016).*

(Continued)

*Primary Examiner* — John A Hevey
(74) *Attorney, Agent, or Firm* — Klarquist Sparkman, LLP

(57) ABSTRACT

Disclosed herein are embodiments of an Al—Ce—Mn alloy for use in additive manufacturing. The disclosed alloy (Continued)

embodiments provide fabricated objects, such as bulk components, comprising a heterogeneous microstructure and having good mechanical properties even when exposed to conditions used during the additive manufacturing process. Methods for making and using alloy embodiments also are disclosed herein.

**16 Claims, 33 Drawing Sheets
(7 of 33 Drawing Sheet(s) Filed in Color)**

(51) Int. Cl.
*B22F 10/00* (2021.01)
*B33Y 10/00* (2015.01)

(56) References Cited

U.S. PATENT DOCUMENTS

| | | | |
|---|---|---|---|
| 4,464,199 A | 8/1984 | Hildeman et al. | |
| 4,787,943 A | 11/1988 | Mahajan et al. | |
| 4,915,869 A | 4/1990 | Aubert et al. | |
| 5,037,608 A | 8/1991 | Tarcy et al. | |
| 5,074,935 A | 12/1991 | Matsumoto et al. | |
| 5,318,642 A | 6/1994 | Kita | |
| 5,320,688 A | 6/1994 | Matsumoto et al. | |
| 5,431,751 A | 7/1995 | Okochi et al. | |
| 5,578,144 A * | 11/1996 | Satou | C22C 45/08 148/438 |
| 5,647,919 A | 7/1997 | Kita et al. | |
| 5,900,210 A | 5/1999 | Buchler et al. | |
| 6,231,808 B1 | 5/2001 | Hashikura et al. | |
| 6,248,453 B1 | 6/2001 | Watson | |
| 9,079,211 B1 | 7/2015 | Deshpande et al. | |
| 9,394,596 B2 | 7/2016 | Kramer et al. | |
| 9,963,770 B2 | 5/2018 | Rios et al. | |
| 2003/0183306 A1 | 10/2003 | Hehmann et al. | |
| 2004/0156739 A1 | 8/2004 | Song | |
| 2004/0238150 A1 | 12/2004 | Adachi et al. | |
| 2005/0199318 A1 | 9/2005 | Doty | |
| 2005/0271543 A1 | 12/2005 | Pfannen-Mueller et al. | |
| 2008/0219882 A1 | 9/2008 | Woydt | |
| 2009/0263266 A1 | 10/2009 | Pandey | |
| 2009/0288796 A1 | 11/2009 | Song et al. | |
| 2010/0226817 A1 | 9/2010 | Pandey | |
| 2010/0282428 A1 | 11/2010 | Pandey | |
| 2012/0152414 A1 | 6/2012 | Che et al. | |
| 2013/0312876 A1 | 11/2013 | Palm | |
| 2014/0326368 A1 | 11/2014 | Okamoto | |
| 2015/0135897 A1 | 5/2015 | Sutcliffe et al. | |
| 2016/0053346 A1 | 2/2016 | Szuromi et al. | |
| 2017/0096730 A1 | 4/2017 | Rios et al. | |
| 2017/0362687 A1 | 12/2017 | Rios | |
| 2018/0080103 A1 | 3/2018 | Plotkowski et al. | |
| 2018/0237893 A1 | 8/2018 | Rios et al. | |
| 2021/0129270 A1* | 5/2021 | Dehoff | B33Y 10/00 |
| 2021/0130934 A1* | 5/2021 | Bahl | B33Y 70/00 |

FOREIGN PATENT DOCUMENTS

| | | |
|---|---|---|
| DE | 10 2011 111365 | 2/2013 |
| JP | H07 268597 | 10/1995 |
| JP | 3392509 | 3/2003 |
| WO | WO 02/086175 A1 | 10/2002 |
| WO | WO 2011/035653 | 3/2011 |
| WO | WO 2017/007908 | 1/2017 |
| WO | WO 2018/156651 A1 | 8/2018 |

OTHER PUBLICATIONS

Sun, CN102877060A. machine translation (Year: 2013).*
Coury et al., "Design and production of Al—Mn—Ce Alloys with tailored properties," *Materials and Design*, vol. 110, pp. 436-448, Aug. 4, 2016.
Coury et al., "Insight into the complex ternary phase behavior in Al—Mn—Ce alloys," *Journal of Alloys and Compounds*, vol. 727, pp. 460-468, Aug. 18, 2017.
Coury et al., "Reassessment of the effects of Ce on quasicrystal formation and microstructural evolution in rapidly solidified Al—Mn alloys," *Acta Materialia*, vol. 98, pp. 221-228, Jul. 23, 2015.
Gordillo et al., "Phase stability in a powder-processed Al—Mn—Ce alloy," *J Mater Sci*, vol. 49, pp. 3742-3754, Feb. 15, 2014.
Abbas, "Effect of high power diode laser surface melting on wear resistance of magnesium alloys," *Wear*, vol. 260, pp. 175-180, May 10, 2005.
"Aluminum Cerium Alloy," https://www.americanelements.com/aluminum-cerium-alloy last accessed May 4, 2022.
Audebert et al., "Production of glassy metallic layers by laser surface treatment," *Scripta Materialia*, 48(3):281-286, Feb. 2003.
Bakke et al., "Improving the Strength and Ductility of Magnesium Die-Casting Alloys via Rare-Earth Addition," *The Journal of the Minerals, Metals & Materials Society*, 55(11): 46-51, Nov. 2003.
Cecchinato et al., "Influence of Magnesium Alloy Degradation on Undifferentiated Human Cells," *PLOS One*, 10(11): 1-18, Nov. 23, 2015.
Chen et al., "Mechanical Properties of Nanometric $Al_2O_3$ Particulate-Reinforced Al—$Al_{11}Ce_3$ Composites Produced by Friction Stir Processing," *Materials Transactions*, 51(5):933-938, Apr. 7, 2010.
Davis, "Aluminum and Aluminum Alloys," *ASM International*, pp. 1-2, 18, and 309-310 (1993).
Debroy et al., "Additive Manufacturing of Metallic Components—Process, Structure and Properties," *Progress in Materials Science*, vol. 92, pp. 112-224 (2018).
Dudas et al., "Preventing Weld Cracks in High-Strength Aluminum Alloys," *Weld. Res.*, vol. 45, pp. 241-249 (Jun. 1966).
Eskin et al., "A Quest for a New Hot Tearing Criterion," *Metall. Mater. Trans. A Phys. Metall. Mater. Sci.*, vol. 38A, pp. 1511-1519 (Jul. 2007).
Fan et al., "Dual characteristic of trace rare earth elements in a commercial casting Al—Cu—X alloy," *Rare Metals*, 34(5): 308-313, May 2015.
Fodran, "Microstructural Evolution and Thermal Stability of Al—Ce—Ni Ternary Eutectic"; Dissertation from University of Florida, 2002.
Frazier, "Metal Additive Manufacturing: A Review," *J. Mater. Eng. Perform.*, vol. 23(6), pp. 1917-1928 (Jun. 2014).
Gallo, "Aluminum Fluxes and Fluxing Practice," *ASM Handbook vol. 15: Casting*, 2008.
Graham et al., "Coarsening of Eutectic Microstructures at Elevated Temperatures," *Transactions of the Metallurgical Society of AIME*, vol. 236, pp. 94-102, Jan. 1966.
International Search Report and Written Opinion issued for International Application No. PCT/US2016/041293 dated Nov. 17, 2016.
International Search Report and Written Opinion issued for International Application No. PCT/US2017/042208 dated Oct. 20, 2017.
International Search Report and Written Opinion issued for International Application No. PCT/US2017/042203 dated Oct. 20, 2017.
International Search Report and Written Opinion issued for International Application No. PCT/US2018/019046 dated Jul. 17, 2018.
International Search Report and Written Opinion issued for International Application No. PCT/US2018/051218 dated Dec. 21, 2018.
Jin et al., "Thermodynamic evaluation and optimization of Al—La, Al—Ce, Al—Pr, Al—Nd and Al—Sm systems using the Modified Quasichemical Model for liquids," *CALPHAD: Computer Coupling of Phase Diagrams and Thermochemistry*, 35(1): 30-41, Dec. 14, 2010.
Jun et al., "Characterization and wear resistance of laser surface melting AZ91D alloy," *Journal of Alloys and Compounds*, vol. 455, pp. 142-147, Jan. 16, 2007.
Kang et al., "Critical evaluation and thermodynamic optimization of the Al—Ce, Al—Y, Al—Sc and Mg—Sc binary systems," *Computer Coupling of Phase Diagrams and Thermochemistry*, 32(2): 413-422, Mar. 27, 2008.
Knipling et al., "Criteria for developing castable, creep-resistant aluminum-based alloys—A review," *Z. Metallkd.*, 97(3):246-265, Mar. 2006.
Kou, "A Criterion for Cracking During Solidification," *Acta Mater.*, vol. 88, pp. 366-374 (2015).

(56) References Cited

OTHER PUBLICATIONS

Kou, "A Simple Index for Predicting the Susceptibility to Solidification Cracking," *Weld. J.*, vol. 94, pp. 374-388 (Dec. 2015).
Kou, "Welding Metallurgy, Second Edition," *John Wiley & Sons, Inc.*, Hoboken, NJ, 466 pages (2003).
Lewandowski et al., "Metal Additive Manufacturing: A Review of Mechanical Properties," *Annu. Rev. Mater. Res.*, vol. 46, pp. 151-186 (2016).
Lin et al., "Hot-Tear Susceptibility of Aluminum Wrought Alloys and the Effect of Grain Refining," *Metall. Mater. Trans. A Phys. Metall. Mater. Sci.*, vol. 38, pp. 1056-1068 (2007).
Manca et al., "Microstructure and Properties of Novel Heat Resistant Al—Ce—Cu Alloy for Additive Manufacturing," *Metals and Materials International*, 8 pages (Nov. 2018) [available online: https://doi.org/10.1007/s12540-018-00211-0].
Meng et al., "Thermodynamic optimization of the Al—Yb binary system," *Journal of Alloys and Compounds*, 452(2): 279-282, Dec. 5, 2006.
Miller et al., "Recent Development in Aluminium Alloys for the Automotive Industry," *Mater. Sci. Eng. A.*, vol. 280, pp. 37-49 (2000).
Non-Final Office Action issued for U.S. Appl. No. 16/132,231 dated Jun. 15, 2021, 15 pages.
Office Action, dated Jul. 2, 2019, issued in U.S. Appl. No. 15/650,664.
Phillion et al., "A New Methodology for Measurement of Semi-Solid Constitutive Behavior and its Application to Examination of As-Cast Porosity and Hot Tearing in Aluminum Alloys," pp. 1-24 (also published as Phillion et al., "A New Methodology for Measurement of Semi-Solid Constitutive Behavior and its Application to Examination of As-Cast Porosity and Hot Tearing in Aluminum Alloys," *Mater. Sci. Eng. A.*, vol. 491, pp. 237-247 (2008)).
Plotkowski et al., "Corrigendum to 'Evaluation of an Al—Ce alloy for additive manufacturing,'" [Acta Mater. 126 (2017) 507-519] *Acta Materialia*, vol. 159, pp. 439-441, Aug. 22, 2018.
Plotkowski et al., "Evaluation of an Al—Ce alloy for laser additive manufacturing," *Acta Materialia*, vol. 126, pp. 507-519, Dec. 27, 2016.
Prakash et al., "The effect of Mg Addition on Microstructure and Tensile and Stress Rupture Properties of a P/M Al—Fe—Ce alloy," *Scripta Materialia*, vol. 39., No. 7, pp. 867-872, Sep. 1998.

Raghavan, "Al—Ce—Mg (Aluminum-Cerium-Magnesium)", *Journal of Phase Equilibria and Diffusion*, p. 453-455, Aug. 2007.
Rappaz et al., "A New Hot-Tearing Criterion," *Metall. Mater. Trans. A.*, vol. 30A, pp. 449-455 (Feb. 1999).
Riani et al., "Ternary rare-earth aluminum systems with copper: a review and a contribution to their assessment," *Journal of Phase Equilibria and Diffusion*, 25(1): 22-52, Feb. 2004.
Sames et al., "The Metallurgy and Processing Science of Metal Additive Manufacturing," pp. 1-76 (also published as SAMES et al., "The Metallurgy and Processing Science of Metal Additive Manufacturing," *Int. Mater. Rev.*, vol. 61, pp. 315-360 (2016)).
Sims et al., "Cerium-Based, Intermetallic-Strengthened Aluminum Casting Alloy: High-Volume Co-product Development," *The Minerals, Metals & Materials Society*, 68(7): 1940-1947, May 23, 2016.
Sims et al., "Characterization of Near Net-Shape Castable Rare Earth Modified Aluminum Alloys for High Temperature Application," *Light Metals*, ed. Edward Williams, pp. 111-114, 2016.
Sims et al., "High performance aluminum-cerium alloys for high-temperature applications," *Materials Horizons*, 4(6): 1070-1078, Aug. 1, 2017.
Tomida et al., "Improvement in wear resistance of hyper-eutectic Al—Si cast alloy by laser surface remelting," *Surface and Coatings Technology*, vol. 169-170, pp. 468-471, 2003.
Trevisan, "On the Selective Laser Melting (SLM) of the AlSi10Mg Alloy: Process, Microstructure, and Mechanical Properties," *Materials*, 10(76):1-23, Jan. 2017.
van Dalen et al., "Erbium and ytterbium solubilities and diffusivities in aluminum as determined by nanoscale characterization of precipitates," *Acta Materialia*, 57(14): 4081-4089, Jun. 6, 2009.
Yao et al., "Effects of La on the age hardening behavior and precipitation kinetics in the cast Al—Cu alloy," *Journal of Alloys and Compounds*, 540(5): 154-158, Jun. 26, 2012.
Yao et al., "Phase relations in the Cu-poor part of the Ce—Al—Cu system at 503 K," *Journal of Alloys and Compounds*, 484(1-2): 86-89, Sep. 18, 2009.
Yilmaz et al., "The microstructure and mechanical properties of unidirectionally solidified Al—Si alloys," *Journal of Materials Science*, vol. 24, pp. 2065-2070, 1989.
Zhang, "Effect of substituting cerium-rich mischmetal with lanthanum on microstructure and mechanical properties of die-cast Mg—Al—Re alloys," *Materials and Design*, 30(7): 2372-2378, Aug. 2009.

* cited by examiner

P6: L + Al$_8$Mn$_5$ => Al$_{10}$Mn$_2$Ce + Al$_{11}$Mn$_4$  @988°C
P5: L + Al$_{11}$Mn$_4$ => Al$_{10}$Mn$_2$CE + Al$_4$Mn  @919°C
P4: L + Al$_{10}$Mn$_2$Ce => Al$_4$Mn + Al$_{20}$Mn$_2$Ce  @738°C
P3: L+ Al$_4$Mn => Al$_{20}$Mn$_2$Ce + Al$_6$Mn @705°C
P2: L+ Al$_{10}$Mn$_2$Ce => Al$_{20}$Mn$_2$Ce + AL11Ce$_3$ @700°C
I1: L => Al$_6$Mn + fcc(Al) + Al$_{20}$Mn$_2$Ce @658°C
P1: L+ Al$_{20}$Mn$_2$Ce => fcc(Al) + Al$_{11}$Ce$_3$ @641°C

ALUMINUM-CERIUM-MANGANESE ALLOY EMBODIMENTS FOR METAL ADDITIVE MANUFACTURING

CROSS REFERENCE TO RELATED APPLICATION

This application claims the benefit of the earlier filing date of U.S. Provisional Patent Application No. 62/959,718, filed on Jan. 10, 2020, and U.S. Provisional Patent Application No. 62/979,720, filed on Feb. 21, 2020; each of these prior applications is incorporated herein by reference in its entirety.

ACKNOWLEDGMENT OF GOVERNMENT SUPPORT

This invention was made with government support under Contract Nos. DE-AC05000R22725, DE-AC52-07NA27344, and DE-AC02-07CH11358 awarded by the United States Department of Energy. The government has certain rights in the invention.

FIELD

The present disclosure is directed to embodiments of an Al—Ce—Mn-based alloy designed for additive manufacturing and additive manufacturing method embodiments using the same to provide high-strength products for use in various industrial applications.

PARTIES TO JOINT RESEARCH AGREEMENT

The invention arose under an agreement between UT-Battelle, LLC, University of Tennessee Research Foundation, Iowa State University of Science and Technology, Lawrence Livermore National Laboratory, and Eck Industries, Inc., funded by the Critical Materials Institute of the United States Department of Energy, which agreement was in effect on or before the effective filing date of the claimed invention.

BACKGROUND

Aluminum alloys are being increasingly adopted in transportation, aerospace, and defense applications to replace more dense materials, such as Ti- and Fe-based alloys. Additive manufacturing (AM) offers a route for manufacturing complex designs for further weight savings and improved performance; however, very few existing Al alloys are well suited for AM process conditions, particularly in view of the very high cooling rates used in such methods. Instead, Al alloys used in the art typically are designed for wrought processing and post-process aging. Such Al alloys, however, tend to exhibit hot-cracking under welding and AM conditions and also exhibit poor high-temperature performance, losing a large fraction of their strength in the range of 250-450° C. There exists a need in the art for Al-based alloy embodiments that can be used in AM methods to prepare bulk alloys and that also exhibit good mechanical strength and other properties at high temperatures.

SUMMARY

Disclosed herein are embodiments of an alloy composition for additive manufacturing. In some embodiments, the alloy composition comprises 4 wt % to 20 wt % cerium; 0.25 w % to 15 wt % manganese; zero to 2 wt % iron; zero to 2 wt % magnesium; zero to 2 wt % zirconium; and a balance of aluminum. In independent embodiments, the alloy composition (i) does not comprise 9 wt % or 10 wt % Mn when Ce is present in an amount of 9 wt %; and (ii) does not comprise 13 wt % Mn when Ce is present in an amount of 16 wt %; and/or (iii) does not comprise 10 wt % Mn when Ce is present in an amount of 17 wt %.

In additional embodiments, an alloy composition for additive manufacturing is disclosed that comprises cerium and manganese, wherein the cerium and the manganese independently are present in an amount sufficient to provide an $Al_{20}Mn_2Ce$ intermetallic phase in an additively manufactured component, wherein the $Al_{20}Mn_2Ce$ intermetallic phase has a higher nucleation rate than an $Al_{10}Mn_2Ce$ intermetallic at a melt temperature of 700° C.; trace amounts of iron and/or magnesium; and a balance of aluminum.

Also disclosed are embodiments of a fabricated object comprising an alloy composition according the present disclosure, wherein the fabricated object comprises a heterogeneous microstructure.

Also disclosed are embodiments of a method, comprising (a) adding a first amount of a feedstock comprising an alloy composition according to the present disclosure to a build platform; (b) exposing the first amount, or a portion thereof, of the feedstock to an energy source to provide a first energy-treated region on the build platform; (c) adding a second amount of the feedstock to the build platform, wherein the second amount of the feedstock is positioned immediately adjacent to the first energy-treated region on the build platform; and (d) exposing the second amount, or a portion thereof, of the feedstock to the energy source to provide a second energy-treated region on the build platform.

The foregoing and other objects and features of the present disclosure will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2C are back scatter scanning electron micrographs (SEM) showing features of the heterogeneous microstructure at different magnifications (FIG. 2A=magnification of 500; FIG. 2B=magnification of 1K; and FIG. 2C=magnification of 11K); FIG. 2D is a scanning transmission electron micrograph (STEM) that shows intermetallic phases present in the heterogeneous microstructure; FIG. 2E is an atomic scale high resolution scanning transmission electron micrograph (HRSTEM) of an $Al_{20}Mn_2Ce$ intermetallic phase observed in the heterogeneous microstructure of the fabricated object on a <110> zone; FIG. 2F shows a magnified view of FIG. 2E and makes a comparison to the atomic positions based on XRD refinement, wherein Al, Ce, and Mn atoms are labeled; and FIG. 2G provides a comparison of the observed HRSTEM pattern from FIG. 2E and a simulated HRSTEM pattern based on the XRD derived crystal structure.

FIG. 4A is a dark field image showing observed $Al_{11}C_3$, $Al_{20}Mn_2Ce$, and Mn-rich intermetallics; FIG. 4B is a STEM-EDS hypermap showing Al, Ce, and Mn fields of the analyzed region; and FIG. 4C is a STEM-EDS hypermap showing Ce and Mn, in addition to minor Si impurities.

FIG. 5B shows an SEM image of the "rosette-like" region and a corresponding STEM HAADF image.

FIG. 8A is an HRSTEM of the intermetallic platelet after the fabricated object is exposed to a temperature of 400° C. for 200 hours; FIG. 8B shows FIG. 8A at a higher magnification, which shows the distinct contrast difference within the intermetallic platelet; FIG. 8C is an STEM-EDS image showing that the dark regions of the intermetallic platelet (as shown in FIG. 8B) are lower in Mn; and FIG. 8D is an image showing that the dark regions are positively identified at atomic resolution as the <121> zone of the $Al_{20}Mn_2Ce$ intermetallic.

FIG. 10A shows yield strength results for the fabricated object as compared to objects made using the comparison alloys; FIG. 10B shows tensile strength results for the fabricated object as compared to objects made using the comparison alloys; and FIG. 10C shows elongation results for the fabricated object as compared to objects made using the comparison alloys.

FIG. 11A shows results for yield strength as a function of thermal exposure time and compares the Al—Ce—Mn alloy embodiment at 400° C. (averaging 3 tests at 0.5 hours exposure and 2 tests at 200 hours) to a 2618-T651 alloy tested at 370° C.; FIG. 11B shows results for hardness as a function of exposure time at various temperatures and compares the Al—Ce—Mn alloy embodiment to a thermally stable, peak-aged Al—Cu—Mn—Zr alloy; and FIG. 11C shows results for hardness has a function of exposure temperature for 200 hours of the Al—Ce—Mn alloy embodiment compared to a variety of conventional cast alloys (i.e., RR350, 319, 206, 356, A356-0.5Cu, and Al7CuMZ); hardness data are averaged from 5 indents and error bars for all measurements indicate ±2 standard deviations.

FIGS. 12A-12F are XRD spectra showing results from heat treatments at 300° C. (FIGS. 12A and 12B), 350° C. (FIGS. 12C and 12D), and 400° C. (FIGS. 12E and 12F); and FIGS. 12G and 12H are SEM images showing decomposition of certain phases of the alloy.

FIGS. 13A-13F show SEM images of the fractography of certain examples tested at room temperature and at 400° C. after 200 hours of pre-conditioning, wherein FIGS. 13A-13C show that the fraction behavior of the alloy in the as-fabricated state is related to the melt pool shapes, and the variations in microstructure across those melt pools; and FIGS. 13D-13F show that the fraction behavior at high temperature following thermal exposure is significantly more ductile, but still appears to be largely driven by the morphology of the intermetallic particles.

FIGS. 14A and 14B are calculated liquidus projections of an Al—Ce—Mn ternary system, wherein FIG. 14B shows the Al-rich corner of the liquid projection and the solidification path for the measured composition of a disclosed Al—Ce—Mn alloy embodiment.

FIG. 17B=20 μm scale) illustrating the interface growth velocity of an Al—Ce—Mn alloy embodiment as a function of location within the melt region/pool.

(FIG. 18A) and 400° C. (FIG. 18B), wherein the black dots in FIGS. 18A and 18B show the approximate location of a measured Al—Ce—Mn alloy composition according to the present disclosure.

DETAILED DESCRIPTION

I. Overview of Terms

Figure 1:
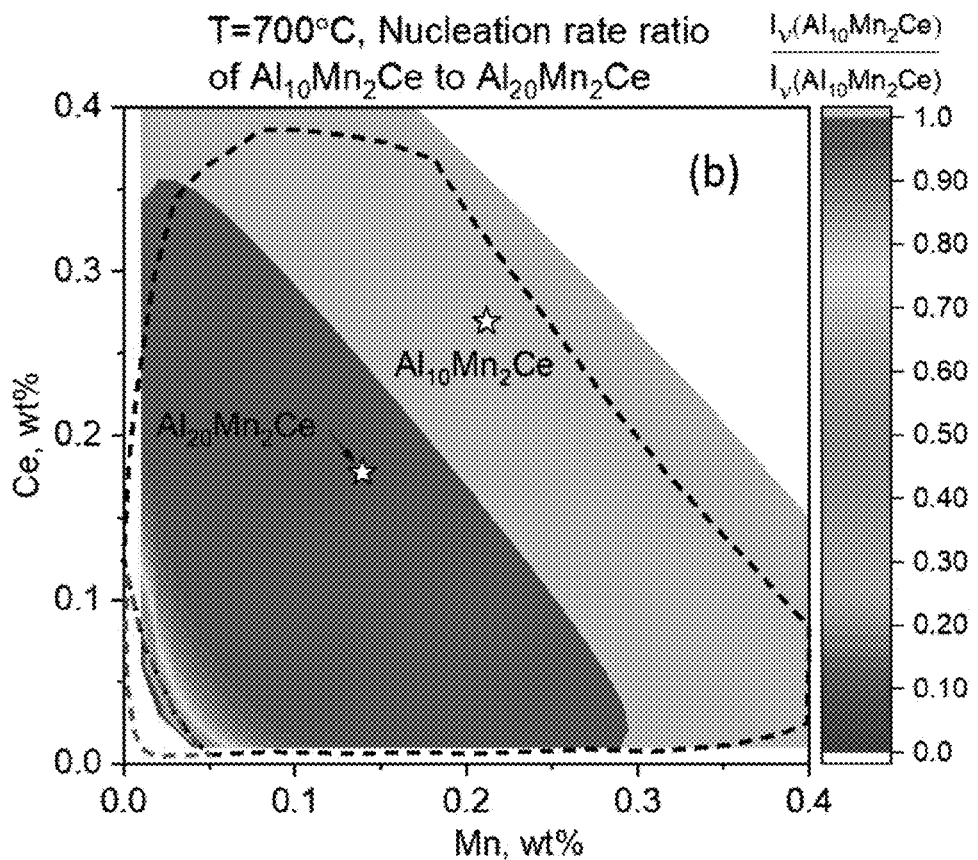
FIG. 1 is a graph showing the ratio of nucleation rate of $Al_{10}Mn_2Ce$ to that of $Al_{20}Mn_2Ce$ as a function of alloy composition in undercooled liquid at 700° C.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

The notation "Al-aCe-bMn," (or "AlaCebMn") as used in certain embodiments described herein, indicates the composition of the alloy, where "a" is the percent by weight of the cerium in the alloy and where "b" is the percent by weight of the manganese in the alloy. For example, Al-10Ce-8Mn indicates an alloy of 10 wt % Ce and 8 wt % Mn. As disclosed herein, the Al—Ce—Mn alloy can comprise additional minor alloying elements and/or trace impurities. In such embodiments, such components can be present in trace amounts that do not significantly modify the balance weight of aluminum, unless expressly stated otherwise. For example, the balance weight percent of the alloy can comprise aluminum and trace impurities at very low levels.

The following terms and definitions are provided:

Adjacent: When used in reference to the position of one or more layers making up a fabricated object made using an additive manufacturing process, this term refers to a physical orientation (or ordering) of a reference layer (e.g., a first layer of a feedstock that is provided and subjected to the energy source used in the additive manufacturing process) and another layer (e.g., a subsequent layer of a feedstock that is provided and subjected the energy source used in the additive manufacturing process) wherein the reference layer and the other layer are physically associated through one or more intervening layers (e.g., one or more layers of a feedstock that are provided and subject to the energy source used in the additive manufacturing process).

Alloy: A solid or liquid mixture of two or more metals, or of one or more metals with certain metalloid elements, e.g., silicon.

Aluminum Matrix: The primary aluminum phase in an alloy embodiment, such as the alloy phase having aluminum atoms arranged in a face-centered cubic structure, optionally with other elements in solution in the aluminum structure.

Dendrite: A characteristic tree-like structure of crystals that grows as molten metal solidifies.

Eutectic Structure/Composition: A homogeneous solid structure formed when multiple solid phases grow together in a cooperative manner from a liquid or molten material. For binary materials, a super lattice is formed having a unique molar ratio between the two alloying elements. At this molar ratio, the mixtures melt as a whole at a specific temperature—the eutectic temperature. At other molar ratios for the binary material, one component of the mixture will melt at a first temperature and the other component(s) will melt at a different (e.g., higher) temperature.

Fabricated Object: An object (e.g., a component or a layer) formed during an additive manufacturing process, wherein a feedstock (e.g., a feedstock powder) is exposed to an energy source to form a shape (e.g., a consolidated pre-defined shape). Any particular shape is contemplated herein, but when the object is "fabricated," the object is intended to be different (e.g., in terms of exhibited properties, or in terms of form, and/or intermetallic composition) from the feedstock (or feedstock powder) used to prepare the fabricated object.

Feedstock (or Feedstock Powder): In some embodiments, this term refers to an alloy composition as described herein (wherein the alloying metals or metal precursors are premixed and/or provided by an atomized alloy ingot) that is used to form a layer of a fabricated object made using the AM methods described herein. In some other embodiments, this term can refer to the starting materials (e.g., individual metals or metal precursors that are not pre-mixed and/or provided by alloy atomized ingots) that are used to form a layer of a fabricated object made using the AM methods described herein. In some particular embodiments, the feedstock can be a powder.

Intermetallic Phase: A solid-state compound present in a fabricated object comprising an alloy embodiment of the present disclosure. In some embodiments, the intermetallic phase contains two or more metallic elements and can exhibit metallic bonding, defined stoichiometry, and/or an ordered crystal structure, optionally with one or more non-metallic elements. In some instances, a fabricated object comprising an alloy of the present disclosure may include regions of a single metal (e.g., Al) and regions of an intermetallic phase (e.g., a ternary intermetallic phase like $Al_{20}Mn_2Ce$ or $Al_{10}Mn_2Ce$, and/or one or more additional binary, quaternary, and/or single-element intermetallic phases).

Immediately Adjacent: When used in reference to the position of one or more layers provided and/or made during an additive manufacturing process used to make fabricated objects of the present disclosure, this term refers to a physical orientation (or ordering) of the reference layer and another layer wherein the reference layer and the other layer are in direct physical contact (e.g., the reference layer is positioned on top of, on the bottom of, or to the immediate left/right of the other layer).

Melt Pool (or Melt Region): As used herein, the terms "melt region" or "melt pool" refer to a region of a fabricated object (or intermediate form thereof) that has been melted (e.g., by exposure to a laser or induction melting) and re-solidified.

Microstructure: The fine structure of an alloy (e.g., grains, cells, dendrites, rods, laths, platelets, precipitates, etc.) that can be visualized and examined with a microscope at a magnification of at least 25×. Microstructure can also include nanostructure (e.g., a structure that can be visualized and examined with more powerful tools, such as electron microscopy, transmission electron microscopy, atomic force microscopy, X-ray computed tomography, etc.).

Minor Alloying Elements: Elements added intentionally to modify the properties of an alloy. Exemplary minor alloying elements can include silicon, magnesium, iron, zirconium, nickel, scandium, vanadium, titanium, erbium, or combinations thereof. If silicon, magnesium, iron, and/or zirconium are present as minor alloying elements, they can be included in amounts ranging from 0 to 2 wt %, such as greater than 0 to 1 wt % or greater than 0 to 0.5 wt %. In embodiments comprising nickel, scandium, vanadium, titanium, erbium, each such minor alloying element is present, individually, in an amount ranging from 0 to 1% or less, such as greater than 0 to 1% or less.

Mischmetal: An alloy of rare earth elements, typically comprising 47-70 wt % cerium and from 25-45 wt % lanthanum. Mischmetal may further include small amounts of neodymium, praseodymium, and/or trace amounts (i.e., less than 1 wt %) of other rare earth elements, and may include small amounts (i.e., up to a total of 15 wt %) of impurities such as Fe or Mg. In some examples, mischmetal comprises 47-70 wt % Ce, 25-40 wt % La, 0.1-7 wt % Pr, 0.1-17 wt % Nd, up to 0.5 wt % Fe, up to 0.2 wt % Si, up to 0.5 wt % Mg, up to 0.02 wt % S, and up to 0.01 wt % P. In certain examples, mischmetal comprises 50 wt % cerium, 25-30 wt % La, with the balance being other rare-earth metals. In one example, mischmetal comprises 50 wt % Ce, 25 wt % La, 15 wt % Nd, and 10 wt % other rare earth metals and/or iron. In an independent example, mischmetal comprises 50 wt % Ce, 25 wt % La, 7 wt % Pr, 3 wt % Nd, and 15 wt % Fe.

Molten: As used herein, a metal is "molten" when the metal has been converted to a liquid form by heating. In some embodiments, the entire amount of metal present may be converted to a liquid or only a portion of the amount of metal present may be converted to liquid (wherein a portion comprises greater than 0% and less than 100% [wt % or vol %] of the amount of metal, such as 90%, 85%, 80%, 70%, 60%, 50%, 40%, 30%, 20%, 10%, 5%, and the like.

Platelet: A thin layer or plate-like structure that can be present in a fabricated object comprising an alloy embodiment according to the present disclosure.

Trace Impurities: Elements that may be found in an alloy embodiment at low levels due to contamination resulting from processing (e.g., from manufacturing materials and/or equipment) and/or present in starting materials used to make an alloy embodiment.

Vickers Hardness: A hardness measurement determined by indenting a test material with a pyramidal indenter, particular to Vickers hardness testing units, that is subjected to a load of 50 to 5000 gf for a period of time and measuring the resulting indent size. Vickers hardness may be expressed in units of HV. In particular disclosed embodiments, the Vickers hardness can be measured by as measured by ASTM method E384.

Yield Strength (or Yield Stress): The stress a material can withstand without permanent deformation; the stress at which a material begins to deform plastically.

II. Introduction

Aluminum alloys have been increasingly used to replace heavier alloys in weight-critical applications owing to their high specific strength, specific stiffness, excellent corrosion resistance, and recyclability. Simultaneously, metal additive manufacturing (also referred to herein as "AM") has recently emerged as a promising method for producing complex optimized geometries that cannot be fabricated with conventional manufacturing techniques. Unfortunately, Al alloys currently known in the art have not been widely adopted for AM processing, despite their applicability to a variety of applications in the aerospace and automotive sectors. The primary reason for limited use of aluminum in AM is the lack of alloys suitable for the complex thermal cycles experienced during processing. For example, precipitation-hardened Al alloys with the most desirable properties are prone to hot-tearing during solidification. Consequently, most additive manufacturing of Al alloys has been limited to near-eutectic Al—Si compositions, which do not produce properties competitive with "2xxx" alloys, "7xxx" alloys, or other wrought Al alloys. Additive processing of commercial wrought Al compositions, however, has found only limited success, with advances being obtained either by modifying existing compositions or by adding nano-scale grain refiners to reduce hot-tear susceptibility. Al alloys also have been sought as replacements for Ti alloys for use in moderate temperature applications (250-450° C.), but Al alloys currently known in the art lose a large fraction of their strength above approximately 200° C. Consequently, even if existing Al alloy compositions could be modified for use in AM and potentially provide similar properties to wrought products, they are unlikely to enable elevated temperature performance.

Al alloys that would have the highest probability of industrial adoption must provide exceptional property sets that cannot be obtained with conventional processing routes. And, if an Al alloy is to be used in AM, it should be amenable to the extreme thermal conditions in additive manufacturing. For example, the Al alloy should exhibit minimal manufacturing defects, a desirable microstructure, mechanical properties at room temperature comparable to current peak-aged wrought alloys, and also should retain a high fraction of its strength at high temperatures (e.g., temperatures above 200° C., such as 250° C. to 800° C., or 250° C. to 700° C., or 250° C. to 600° C., or 250° C. to 500° C.). By way of comparison, most wrought alloys are designed for precipitation hardening and their solidification microstructure often includes deep dendritic mushy zones with limited permeability for liquid feeding, enabling cracking near the base of the dendrites. In the solid state, precipitation is a potent strengthening mechanism, but these precipitates easily coarsen or dissolve at elevated temperatures. Also, while near-eutectic alloys can reduce the hot-tear susceptibility by reducing the depth of the mushy zone, they also can produce comparatively coarse microstructures relative to solid-state precipitation, with correspondingly lower strengths.

Al—Sc alloys (commercialized as "Scalmalloy") are known for their use in casting and rapid solidification processes due to their good age hardening by the precipitation of $Al_3Sc$ $L1_2$ particles. While such alloys have recently been adapted for AM, even very small amounts of Sc dramatically increase the cost of these alloys, and the effect of precipitation strengthening still degrades at elevated temperatures. Additionally, Al—Mg—Zr alloys are processable due to the grain refining effect of $Al_3Zr$ primary intermetallic particles that form in the liquid near the melt pool boundaries and, while such alloys display an increase in hardness with aging at 400° C. (likely due to additional precipitation of nano-scale $Al_3Zr$ $L1_2$ particles), they begin to decrease in hardness if overaged past approximately 20 hours.

Most Al alloys designed for AM to-date rely on $L1_2$ type precipitates for strengthening and grain refinement, and the limited thermal stability of these particles restricts their use for high-temperature applications. The low solubility of most elements in Al also limits the total volume fraction of $L1_2$ precipitates. As such, there exists a need in the art for Al alloys that can be used in AM methods. The present disclosure describes alloy embodiments that reach a balance between appropriate strengthening mechanisms and manufacturability and microstructure stability at elevated temperatures. In contrast to such alloys, the present disclosure is directed to alloy embodiments that are suitable for AM methods, including, but not limited to, layer-by-layer manufacturing methods suitable for metal alloys, such as direct metal laser sintering, direct energy deposition, electron beam melting, selective heat sintering, selective laser melting, selective laser sintering, laser powder bed additive manufacturing, and microinduction. In particular embodiments, the alloy embodiments exhibit exceptional properties when processed with rapid solidification techniques. And, the alloy embodiments are suitable for use in AM methods that result in bulk production of alloys.

III. Alloy Embodiments and Fabricated Object Embodiments

Alloy embodiments disclosed herein can comprise a ternary combination of Al, Ce, and Mn. The Al—Ce—Mn alloy embodiments are specifically designed for AM methods and exhibit good strength retention at elevated temperatures. In some embodiments, the Al—Ce—Mn alloy can comprise Al, Ce, and Mn as main alloying components and can further comprise other minor alloying elements and/or trace impurities.

Al—Ce—Mn alloy embodiments described herein can comprise Ce in an amount ranging from 4 wt % to 20 wt %, such as 4 wt % (or higher) to 15 wt %, or 4 wt % (or higher) to 12 wt %, or 4 wt % (or higher) to 10 wt %, or 4 wt % (or higher) to 8 wt %. In some embodiments, Ce can be present in an amount ranging from more than 4 wt % to 20 wt %, such as 5 wt % to 20 wt %, or 6 wt % to 20 wt %, or 8 wt % to 20 wt %, or 10 wt % to 20 wt %, or 12 wt % to 20 wt %, or 15 wt % to 20 wt %. In particular embodiments, Ce can be present in an amount ranging from 8 wt % to 12 wt %, such as 8 wt %, 9 wt %, 10 wt %, 11 wt %, or 12 wt %. Al—Ce—Mn alloy embodiments described herein also can comprise Mn in an amount ranging from greater than zero wt % to 15 wt %, such as 0.25 wt % to 15 wt %, or 0.5 wt % to 15 wt %, or 1 wt % to 15 wt %, or 3 wt % to 15 wt %, or 5 wt % to 15 wt %, or 7 wt % to 15 wt %, or 9 wt % to 15 wt %, or 11 wt % to 15 wt %. In particular embodiments, Mn can be present in an amount ranging from 5 wt % to 10 wt %, such as 5 wt %, 6 wt %, 7 wt %, 8 wt %, 9 wt %, or 10 wt %. In representative embodiments, the amount of Mn can be 7.7, 7, 6.2, and 6. The amount of aluminum present makes up the balance after Mn, Ce, and any minor alloying elements and/or trace impurities are accounted for.

In yet some additional embodiments, the amount of Ce and Mn included in the alloy can be amounts that are sufficient to provide a particular microstructure and/or intermetallic phases in the microstructure, particularly at high temperatures involved in additive manufacturing. For example, components made using Al—Ce—Mn alloy embodiments described herein in an additive manufacturing process can comprise a microstructure that includes an $Al_{20}Mn_2Ce$ intermetallic, but no $Al_{10}Mn_2Ce$ intermetallic (or only trace amounts of such an intermetallic). This is in contrast to embodiments using such alloys but in a typical casting method rather than additive manufacturing. Embodiments using a casting method (and thus not an additive manufacturing method) can comprise a microstructure comprising an $Al_{10}Mn_2Ce$ intermetallic in combination with any $Al_{20}Mn_2Ce$ intermetallic that may be present. Without being limited to a single operating theory, it currently is believed that $Al_{20}Mn_2Ce$ formation may be kinetically favored with increasing cooling rate and can have a higher nucleation rate than the $Al_{10}Mn_2Ce$ intermetallic at a melt temperature of 700° C. As such, in some embodiments, the Ce and Mn components can be present in amounts that provide compositions wherein an $Al_{20}Mn_2Ce$ intermetallic phase of the alloy has a higher nucleation rate than an $Al_{10}Mn_2Ce$ intermetallic for melt temperature of 700° C. In some embodiments, such amounts can include Ce and Mn amounts that fall within the wt % ranges included in the darkly shaded region of the graph shown by FIG. 1 (this region is labeled as region "A"). FIG. 1 is a graph showing the ratio of nucleation rate of $Al_{10}Mn_2Ce$ to that of $Al_{20}Mn_2Ce$ as a function of composition in undercooled liquid at 700° C., wherein the star symbols represent the stoichiometric composition of $Al_{10}Mn_2Ce$ and $Al_{20}Mn_2Ce$. The dashed lines define the primary solidification regions without considering nucleation kinetics effect. The region A represents the nucleation-preferred region for $Al_{20}Mn_2Ce$ and region "B" represents compositions where $Al_{10}Mn_2Ce$ is included as an intermetallic, and the dashed lines are provided to show the equilibrium lipid projection.

Naturally occurring mischmetal may be a less expensive alternative than pure cerium. Natural mischmetal has a variable composition, but typically comprises, in terms of weight percent, 50 wt % cerium, 30 wt % lanthanum, balance other rare earth elements. Thus, in some independent embodiments, cerium component can be obtained using mischmetal rather than pure cerium. In such embodiments, the Al—Ce—Mn alloy will typically further comprise at least some lanthanum.

In some embodiments, minor alloying elements that can be present in the Al—Ce—Mn alloy can include Fe, Mg, Zr, and Si. In some embodiments, the amount of any Fe, Mg, or Zr present in the Al—Ce—Mn alloy is, for each element individually, 2 wt % or less. In particular embodiments, the amount of any Fe, Mg, or Zr present in the Al—Ce—Mn alloy is, for each element individual, less than 2 wt %. In some embodiments, the amount of any Si present in the Al—Ce—Mn alloy is 1 wt % or less. In particular embodiments, the amount of any Si present in the Al—Ce—Mn alloy is less than 1 wt %. In particular embodiments comprising Fe, the Fe can be present in an amount ranging from greater than 0 wt % up to 2 wt %. In particular embodiments comprising Si, the Si can be present in an amount ranging from greater than 0 wt % to less than 1 wt %. In particular embodiments comprising Mg, the Mg can be present in an amount ranging from greater than 0 wt % up to 2 wt %. In particular embodiments comprising Zr, the Zr can be present in an amount ranging from greater than 0 wt % up to 2 wt %. In yet additional embodiments, the minor alloying element(s) can be selected from nickel, scandium, vanadium, titanium, erbium, or combinations thereof, wherein each element, individually, is present in an amount ranging from 0 to 1 wt %, such as greater than 0 to 1% or less.

In a representative embodiment, the Al—Ce—Mn alloy can comprise 10 wt % Ce, 8 wt % Mn, and low amounts of Fe, Si, and Mg, such as less than 0.1 wt % Fe, less than 0.1 wt % Si, and 0.02 wt % Mg, with the balance made up by aluminum. In another representative embodiment, the Al—Ce—Mn alloy can comprise 10 wt % Ce, 7.7 wt % Mn, and low amounts of Fe, Si, and Mg, such as less than 0.1 wt % Fe, less than 0.1 wt % Si, and 0.02 wt % Mg, with the balance made up by aluminum. In another representative embodiment, the Al—Ce—Mn alloy can comprise 9 wt % Ce, 6.2 wt % Mn, and low amounts of Fe, Si, and Mg, such as less than 0.1 wt % Fe, less than 0.1 wt % Si, and 0.02 wt % Mg, with the balance made up by aluminum. In another representative embodiment, the amount of Ce can range from 9.99 to 10.04 wt %, the amount of Mn can range from 7.68 to 7.71 wt %, and the amount of Fe, Si, and Mg can be relatively low, such as less than 0.1 wt % Fe, less than 0.1 wt % Si, and 0.02 wt % Mg, with the balance made-up by aluminum.

In an independent embodiment, the Al—Ce—Mn alloy is not an Al—Ce—Mn alloy selected from: Al9Mn9Ce, Al10Mn9Ce, Al13Mn16Ce, Al10Mn17Ce, Al16Mn20Ce, or Al20Mn9Ce (wherein the formulas represent the wt % of each alloying element). In an additional independent embodiment, the Al—Ce—Mn alloy is not an Al—Ce—Mn alloy selected from: Al5Mn2Ce, Al6Mn2Ce, Al8Mn4Ce, Al6Mn4Ce, Al10Mn5Ce, or Al12Mn2Ce (wherein the formulas represent the atomic % of each alloying element). In some independent embodiments, such alloys can be used in an AM process according to the present disclosure and can give rise to fabricated objects having properties that are different as compared to properties of objects obtained by exposing such alloys to non-AM processes.

Figure 2A:
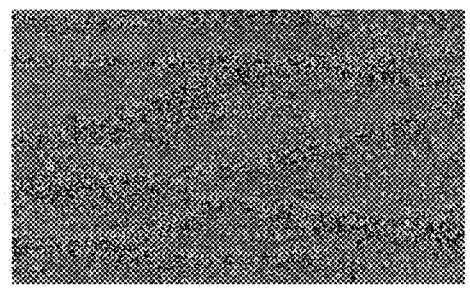
FIGS. 2A-2G are images showing features of a heterogeneous microstructure of a fabricated object made with an Al—Ce—Mn alloy embodiment of the present disclosure, wherein the fabricated object was fabricated using additive manufacturing.
Figure 2B:
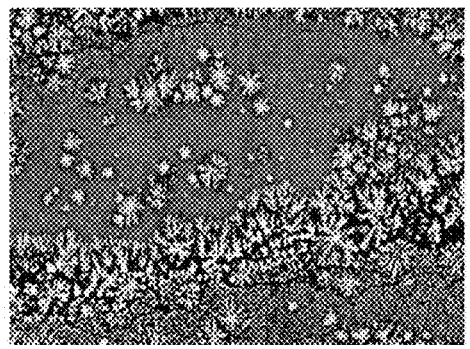
Figure 2C:
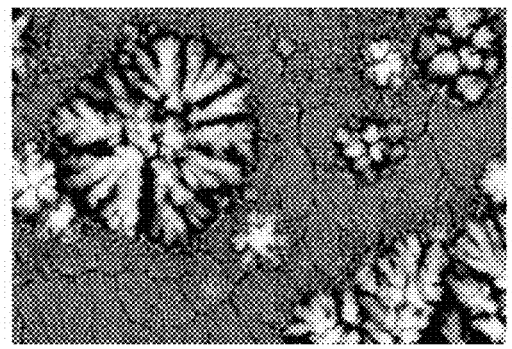
Figure 2D:
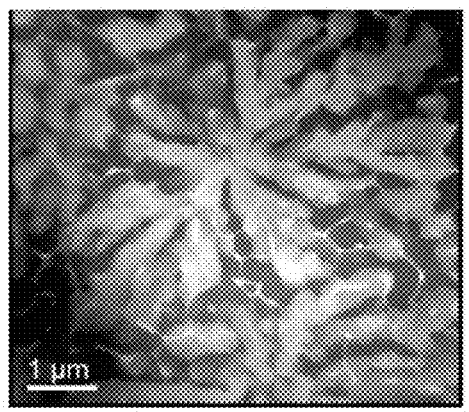

Fabricated components comprising an Al—Ce—Mn alloy embodiment of the present disclosure comprise a unique microstructure. In particular embodiments, the microstructure is heterogeneous. In some embodiments, the heterogeneous microstructure comprises two different morphological distributions that are arranged in a pattern reflective of the melt-pool geometry. In some embodiments, a first region of the microstructure comprises intermetallic particles. In some embodiments, such intermetallic particles can have a "rosette-like" morphology. In some embodiments, a second region of the microstructure comprises a eutectic structure. The eutectic structure can comprise an intermetallic and Al solid solution. In some embodiments, the eutectic structure can comprise platelets. Such platelets can have a lamellar spacing. In some particular embodiments, the lamellar spacing can be on the order of 100 nm to 200 nm. In some particular embodiments, the "rosette-like" particles of the first region can have diameters ranging from 1 μm to 5 μm in diameter. A representative example of the first and second regions of a representative microstructure is shown in FIGS. 2A-2C. The "rosette-like" shape of the intermetallic particles of the first region can be seen in the higher magnification images provided by FIGS. 2B and 2C. In some particular embodiments, a comparatively dark Al-rich region can be found between these particles. In yet some additional embodiments, another phase can be found between the arms of the "rosette-like" particles. A representative embodiment of such a phase can be seen, in some embodiments, using scanning transmission electron microscopy with bright contrast (e.g., see FIG. 2D). In yet some other embodiments, the alloy chemistry can be modified to allow for selecting one particular microstructure over another, rather than a heterogeneous mixture of both.

In some embodiments, the microstructure of fabricated Al—Ce—Mn alloy objects made using Al—Ce—Mn alloy and method embodiments of the present disclosure can comprise certain intermetallic phases. In some embodiments, an intermetallic phase present in the microstructure is an $Al_{20}Mn_2Ce$ intermetallic. In yet some additional embodiments, an intermetallic phase present in the microstructure is an $Al_{10}Mn_2Ce$ intermetallic. In yet some additional embodiments, a combination of an $Al_{20}Mn_2Ce$ intermetallic and an $Al_{10}Mn_2Ce$ intermetallic can be present, but typically only trace amounts of the $Al_{10}Mn_2Ce$ intermetallic. In such embodiments, the $Al_{20}Mn_2Ce$ intermetallic is present as the majority intermetallic. In some embodiments, $Al_{20}Mn_2Ce$ can be the primary intermetallic. In yet some additional embodiments, an $Al_{11}Ce_3$ intermetallic is present. In yet some additional embodiments, a Mn-rich intermetallic is observed. In particular embodiments, the microstructure does not comprise an $Al_{12}Mn$ intermetallic, even after being subjected to post-fabrication heat treatments.

In some embodiments, an Al—Ce—Mn alloy composition can be modified to reduce the relative fraction of the primary intermetallic particles of the microstructure (e.g., "rosette-like" particles, such as those shown in FIG. 2B) and increase the fraction of the eutectic (e.g., the eutectic region shown in FIG. 2A) to increase the strength of the Al—Ce—Mn alloy. Solely by way of example, in some embodiments, adjusting the alloy chemistry to be lower in both Ce and Mn can facilitate providing microstructures nearer to a $Al_{20}Mn_2Ce+Al$ binary eutectic, which can increase the eutectic fraction by increases in the amount of undercooling required for the high velocity growth of the primary $Al_{20}Mn_2Ce$ phase. And, in some embodiments, increasing velocity of the solid-liquid interface can reduce the relative fraction of primary intermetallic particles.

Figure 3:
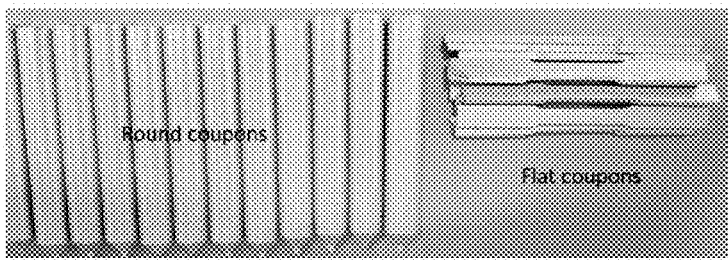
FIG. 3 shows fabricated objects made using an Al—Ce—Mn alloy embodiment according to the present disclosure, including round coupons (left image), flat coupons (middle image), and an impeller (right image).
Figure 3:
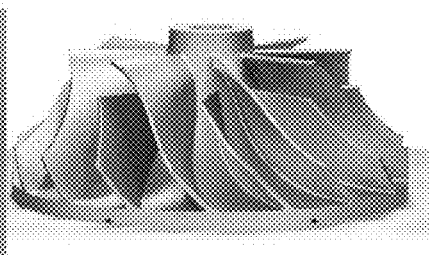

Fabricated Al—Ce—Mn alloy objects made using the Al—Ce—Mn alloy embodiments described herein can include objects that typically cannot be obtained using casting methods or other non-AM methods known in the art. In particular disclosed embodiments, the fabricated Al—Ce—Mn alloy objects are components used in the automotive, locomotive, aircraft, and aerospace industries. In some embodiments, the fabricated object is a bulk component. Bulk components are distinct from thin sections made using rapid solidification processes, such as melt spinning. Some exemplary products include, but are not limited to, automotive powertrain components (such as engine pistons, cylinder heads, blocks, water cooled turbocharger manifolds, and other automotive components), aerospace components, heat exchanger components, and any other components requiring aluminum alloys that do not lose structural integrity and/or strength at high temperatures (e.g., temperatures above 200° C.). Representative bulk components comprising an Al—Ce—Mn alloy embodiment according to the present disclosure are shown in FIG. 3. In an independent embodiment, the fabricated Al—Ce—Mn alloy objects of the present disclosure do not include cast alloy products and instead include products that are formed using AM techniques, such as energy source-mediated layer-by-layer manufacturing processes (e.g., laser AM, electron beam AM, induction-mediated AM, and the like). In an independent embodiment, the fabricated object is not an object obtained by exposing an alloy to a melt spinning process, a hot extrusion process, an arc melting process, and/or a casting process.

IV. Method Embodiments

Disclosed herein are embodiments of an AM method utilizing the Al—Ce—Mn alloy embodiments described herein. The AM method embodiments described herein can involve layer-by-layer manufacturing methods suitable for metal alloys, such as direct metal laser sintering, direct energy deposition, electron beam melting, selective heat sintering, selective laser melting, selective laser sintering, laser powder bed additive manufacturing, and microinduction.

In some embodiments, the method is used to make a fabricated object from an Al—Ce—Mn alloy embodiment disclosed herein. The method can be carried out using a device, such as device used in a laser-based additive manufacturing method. The device can include a powder bed, an energy source, a build platform, a deposition apparatus capable of depositing the feedstock (e.g., a roller, a blade, and the like), and other suitable components that will be recognized by a person of ordinary skill in the art with the benefit of the present disclosure. In some embodiments, the method comprises adding a first amount of a feedstock comprising the Al—Ce—Mn alloy to a build platform; exposing the first amount, or a portion thereof, of the feedstock to an energy source to provide a first energy-treated region on the build platform; adding a second amount of the feedstock to the build platform, wherein the second amount of the feedstock is positioned immediately adjacent to the first energy-treated region on the build platform; and exposing the second amount, or a portion thereof, of the feedstock to the energy source to provide a second energy-treated region on the build platform. In some embodiments, the feedstock is contained in a powder bed that is coupled to the building platform.

Al—Ce—Mn alloy embodiments of the present disclosure can be used in the method and are in the form of a feedstock. In particular embodiments, the feedstock is in the form of a powder or a wire. In some embodiments, the feedstock powder can be made by combining the alloying elements discussed above and producing a cast ingot from the Al—Ce—Mn alloy. The cast ingot can then be atomized under an inert atmosphere to provide the feedstock powder. In some embodiments, the feedstock powder can be sieved to provide a particular size distribution. In representative embodiments described herein the size distribution can range from 1 µm to 200 µm, such as 20 µm to 70 µm, such as 20 µm to 65 µm, or 20 µm to 60 µm. However, other powder particle and/or grain sizes can be made depending on the AM technique to be used. These would be recognized by person of ordinary skill in the art with the guidance of the present disclosure. In yet other embodiments, feedstocks in the form of a wire or other non-powdered form can be used to form the fabricated Al—Ce—Mn alloy embodiments described herein.

The energy source can be a laser or other energy source sufficient to provide sufficient energy to melt and consolidate the feedstock (e.g., a heater or the like). When exposed to the energy source, the feedstock is sintered and/or melted to provide an energy-treated region (e.g., a consolidated region). This region can be allowed to cool and solidify. The process is repeated to provide sequential layers of energy-treated regions that become fused together during the process, thereby producing the fabricated object. In some embodiments, the method can further comprise preparing a feedstock powder used in embodiments of the method by casting the Al—Ce—Mn alloy into an ingot and atomizing the ingot to provide the feedstock powder. In some embodiments, method parameters can be modified to increase growth velocity, such as by increasing the laser velocity and decreasing the preheat temperature, particularly for laser powder bed fusion additive manufacturing. In yet some additional embodiments, additional heat treatment steps can be performed. In some such embodiments, the additional heat treatment could increase ductility.

V. Overview of Several Embodiments

Disclosed herein are embodiments of an alloy composition for additive manufacturing, comprising: 4 wt % to 20 wt % cerium; 0.25 w % to 15 wt % manganese; zero to 2 wt % iron; zero to 2 wt % magnesium; zero to 2 wt % zirconium; and a balance of aluminum. In some embodiments, the alloy composition (i) does not comprise 9 wt % or 10 wt % Mn when Ce is present in an amount of 9 wt %; and (ii) does not comprise 13 wt % Mn when Ce is present in an amount of 16 wt %; (iii) does not comprise 10 wt % Mn when Ce is present in an amount of 17 wt %.

In some embodiments, the cerium is present in an amount ranging from 8 wt % to 20 wt %.

In any or all of the above embodiments, the cerium is present in an amount ranging from 8 wt % to 12 wt %.

In any or all of the above embodiments, the manganese is present in an amount ranging from 5 wt % to 15 wt %.

In any or all of the above embodiments, the manganese is present in an amount ranging from 5 wt % to 10 wt %.

In any or all of the above embodiments, the alloy comprises iron and the iron is present in an amount ranging from greater than zero wt % to less than 1 wt %.

In any or all of the above embodiments, the alloy comprises magnesium and/or zirconium and wherein each of the magnesium and/or zirconium is present in an amount ranging from greater than 0 wt % to 2 wt % or less.

In any or all of the above embodiments, the alloy further comprises silicon, nickel, scandium, vanadium, titanium, erbium, or any combination thereof, wherein each of the silicon, nickel, scandium, vanadium, titanium, and erbium are individually present in an amount ranging from greater than 0 wt % to 1% or less.

In any or all of the above embodiments, the alloy comprises 10 wt % cerium, 8 wt % manganese, zero wt % to less than 0.1 wt % iron, zero wt % to less than 0.1 wt % silicon, zero wt % to 0.02 wt % or less magnesium, and a balance of aluminum.

Also disclosed herein are embodiments of an alloy composition for additive manufacturing, comprising: cerium and manganese, wherein the cerium and the manganese independently are present in an amount sufficient to provide an $Al_{20}Mn_2Ce$ intermetallic phase in an additively manufactured component, wherein the $Al_{20}Mn_2Ce$ intermetallic phase has a higher nucleation rate than an $Al_{10}Mn_2Ce$ intermetallic at a melt temperature of 700° C.; trace amounts of iron and/or magnesium; and a balance of aluminum.

Also disclosed herein are embodiments of a fabricated object comprising an alloy embodiment of the present disclosure, and wherein the fabricated object comprises a heterogeneous microstructure. In some embodiments, the fabricated object comprises an alloy according to any or all of the above alloy embodiments.

In some embodiments, the heterogeneous microstructure comprises a first region comprising intermetallic particles and a second region comprising a eutectic structure with lamellar spacing.

In any or all of the above embodiments, the intermetallic particles comprise an intermetallic having an $Al_{20}Mn_2Ce$ structure, an $Al_{11}C_3$ structure, and/or an $Al_6Mn$ structure.

In any or all of the above embodiments, the intermetallic further comprises a Mn-rich region.

In any or all of the above embodiments, the heterogeneous microstructure does not comprise or is free of an intermetallic having an $Al_{12}Mn$ structure.

Also disclosed herein are embodiments of a method, comprising: (a) adding a first amount of a feedstock comprising the alloy of any or all of the above alloy embodiments to a build platform; (b) exposing the first amount, or a portion thereof, of the feedstock to an energy source to provide a first energy-treated region on the build platform; (c) adding a second amount of the feedstock to the build platform, wherein the second amount of the feedstock is positioned immediately adjacent to the first energy-treated region on the build platform; and (d) exposing the second amount, or a portion thereof, of the feedstock to the energy source to provide a second energy-treated region on the build platform.

In some embodiments, the method further comprises repeating any one of (a) through (d).

In any or all of the above embodiments, the feedstock is a feedstock powder and the energy source is a laser.

In any or all of the above embodiments, each of the first energy-treated region and the second energy-treated region comprises a consolidated alloy formed from melting and consolidating particles of the feedstock powder.

In any or all of the above embodiments, the method is used to make a fabricated bulk component comprising an Al—Ce—Mn alloy and comprising a heterogeneous microstructure.

In any or all of the above embodiments, the method further comprises atomizing an ingot comprising the alloy to produce the feedstock.

VI. Examples

Heat Treatment, Hardness, and Mechanical Testing—With reference to the examples discussed herein, mechanical testing and microstructural characterization were performed on as-fabricated samples at various test temperatures, as well as following long term thermal exposure. Mechanical test coupons were machined from printed coupons according to the ASTM E8 standard with a 0.25 in. gage diameter. For mechanical testing at elevated temperatures ranging from 150 to 400° C., a temperature ramp rate of 10° C./min was applied, and samples were held at temperature for 30 minutes prior to testing to allow for thermal equilibration. Additional samples were pre-conditioned for 200 hours at 400° C. using a resistance furnace, and then tested at the same temperature. As-atomized powder samples were also pre-conditioned using the same procedure for characterization by X-ray diffraction. Vickers hardness testing was performed on both as-fabricated and thermally exposed samples. To achieve a representative sampling of the microstructure, a 5 kg load with a 10 s dwell time was used, and measurements were averaged over 5 indents. Smaller indentations, using a 100 g load with a 13 s dwell time, were also used to locally probe microstructural regions. In this case, data was averaged over 10 indents.

Microscopy and X-ray Diffraction—Microstructures were first characterized by scanning electron microscopy (SEM) using both a Hitachi S-4800 Field Emission Gun (FEG)-SEM and Zeiss EVO LS15 on samples tested and heat treated at the temperatures listed above. Elemental distribution were mapped by energy dispersive spectroscopy (EDS) methods in the Hitachi S-4800. X-ray diffraction (XRD) data were collected on the gas atomized metal powder and additively manufactured samples in the as-fabricated and thermally exposed conditions using a PANalytical Empyrean instrument configured with a Bragg-Brentano geometry. Cu-Kα radiation was used (45 kV and 40 mA) and incident and diffracted beam optics included programmable divergent slits, anti-scattering slits and a PIXcel detector. Data were collected between 15 and 120 degrees 2θ with a step size of 0.026 degrees and a dwell time of 100 s. Aberration-corrected scanning transmission electron microscopy (AC-STEM) was also used to characterize the microstructure of the as-fabricated and thermally exposed material. Disks, 3 mm in diameter, were prepared by grinding and electropolishing using a Struers A/S TenuPol dual-jet electropolisher. The foils were then characterized using a JEOL 2200FS microscope outfitted with a CEOS GmbH aberration corrector. The instrument was also used to collect STEM-EDS spectra.

Computations—Computer coupling of phase diagrams and thermo-chemistry, i.e., the CALPHAD approach was used to aid understanding of the as-solidified and thermally exposed microstructure. In this approach, the Gibbs energy of individual phases was modeled based on crystal structure, defect type and phase chemistry. The model parameters were obtained through an optimization procedure that aims at consistently reproducing the experimentally assessed phase equilibria and thermodynamic properties by the model-calculated ones. The thermodynamic database, i.e., a compilation of Gibbs energy functions of individual phases, was modeled in sequence from unary, binary and ternary. The Gibbs energy functions of the three unary systems Al, Ce and Mn were adopted from the SGTE (Scientific Group Thermodata Europe) database compiled by Dinsdale. The Gibbs energy functions of phases in the three constituent binaries were adopted from Al—Mn, Al—Ce, and Ce—Mn energy functions known in the art. No thermodynamic modeling has been done for the Al—Ce—Mn ternary system. The Gibbs energy functions of phases in the Al-rich region of the Al—Ce—Mn system were obtained by the present inventors.

Example 1

An Al-10Ce-8Mn (wt %) alloy was produced by alloying in a gas fired furnace in a 250 g SiC crucible using Argon as the cover gas. Alloying elements were certified to at least 99.6% purity. Impurity content of silicon was less than 0.10%, and iron less than 0.15%. Cast ingots were then Nitrogen atomized (Argon was used as the initial melt cover gas). The resulting powder was sieved for a 20-63 µm size distribution. Additive manufacturing was performed using a Concept Laser M2 laser powder bed fusion system. The as-fabricated Al—Ce—Mn alloy composition was measured using inductively coupled plasma. Two separate samples were measured, and the composition range is shown in Table 1.

TABLE 1

Measured as-fabricated specimen composition.
All values given in wt. %.

| Al | Ce | Mn | Fe | Si | Mg |
|---|---|---|---|---|---|
| Balance | 9.99-10.04 | 7.68-7.71 | <0.1 | <0.1 | 0.02 |

Example 2

Figure 2E:
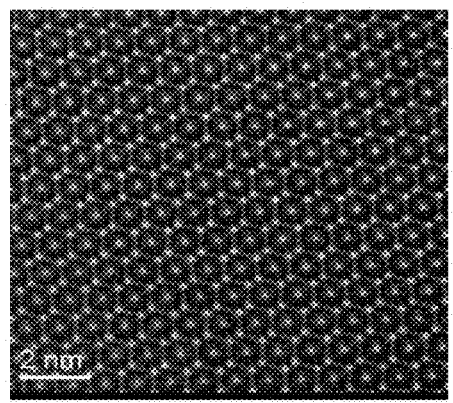
Figure 2F:
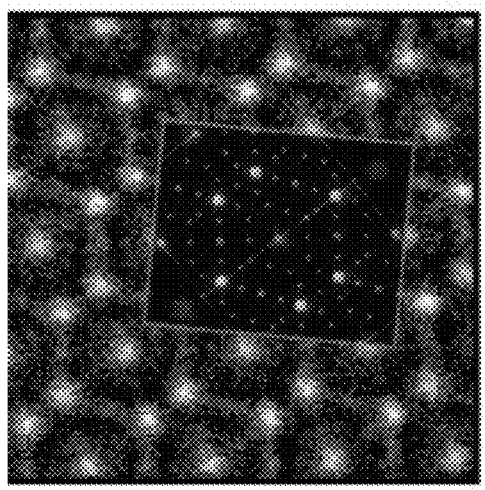
Figure 2G:
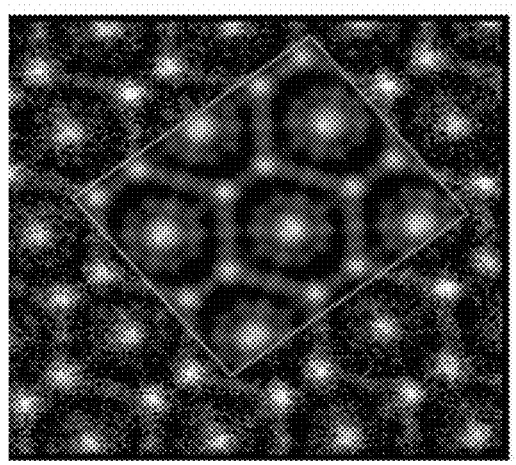
Figure 4A:
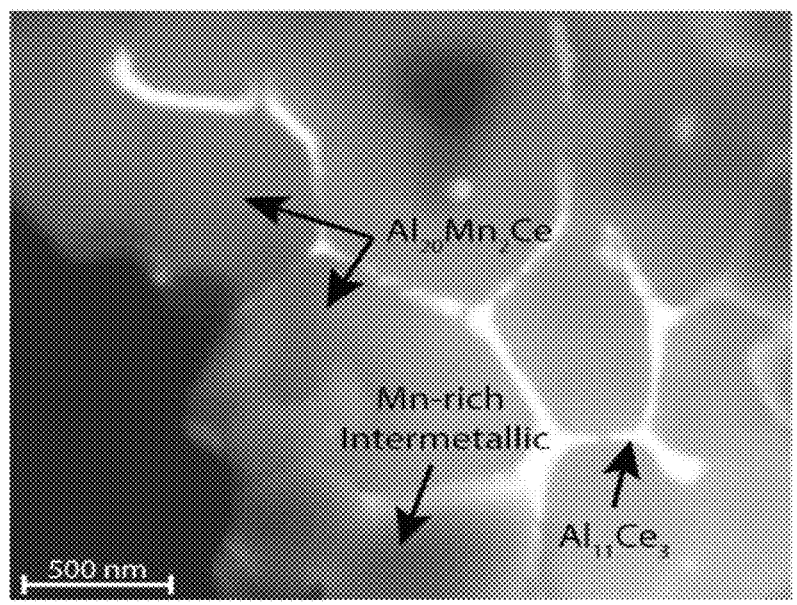
FIGS. 4A-4C are images obtained from analyzing a thinned region of a fabricated object made with an Al—Ce—Mn alloy embodiment of the present disclosure to evaluate the predominant intermetallic constituents.
Figure 4B:
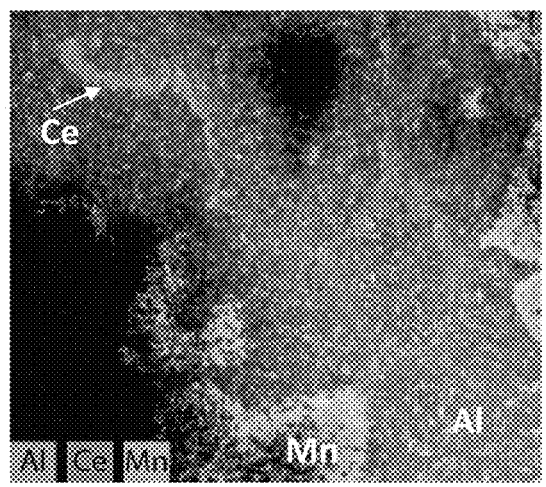
Figure 4C:
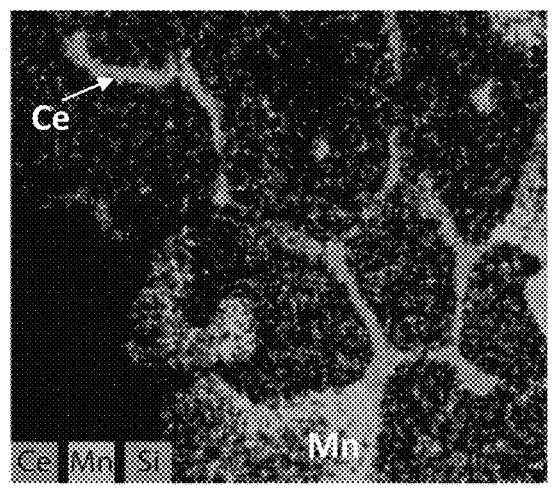
Figure 5A:
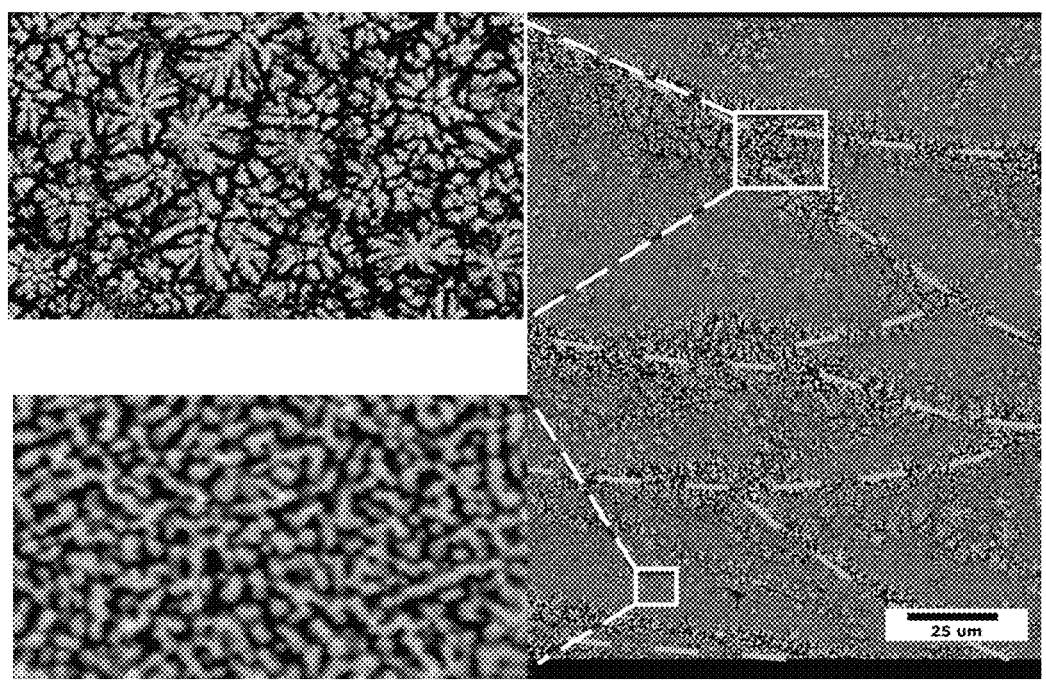
FIGS. 5A and 5B images showing microstructural features of the weld pool of an alloy embodiment, wherein FIG. 5A includes SEM images of "rosette-like" regions of the weld pool and eutectic regions of the weld pool.
Figure 5B:
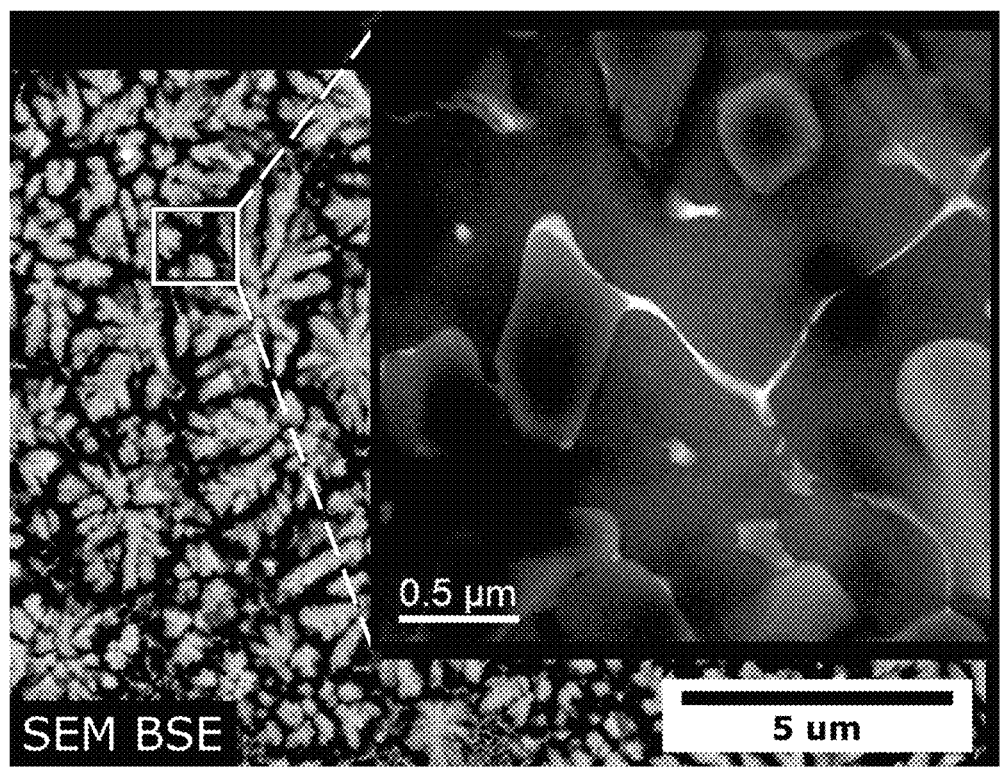

In this example, identities of intermetallics present in the microstructure of the as-fabricated Al—Ce—Mn alloy summarized in Table 1 were determined characterize. High resolution STEM imaging was used to characterize the primary intermetallic phase as shown in FIG. 2A. Based on this data, the primary phase appears to be consistent with the structure of the $Al_{20}Mn_2Ce$ intermetallic, and is also found in the platelet structure at the center of the melt pool, forming by coupled growth with FCC-Al. The HRSTEM image was also simulated based on the refined crystal structure and overlaid on the observed crystal lattice, showing good agreement, as shown by FIGS. 2E, 2F, and 2G. The predominant intermetallic phases were further characterized using STEM-EDS as shown in FIGS. 4A-4C. The $Al_{20}Mn_2Ce$ phase is clearly visible as can be seen in FIG. 4A, and the lightest phase was identified as the $Al_{11}Ce_3$ intermetallic. An additional Mn-rich intermetallic was also observed. FIG. 4B shows a STEM-EDS hypermap of the region shown in FIG. 4A, showing at least certain locations of Al, Ce, and Mn observed in the fabricated object. FIG. 4C shows a STEM-EDS hypermap showing at least certain locations of Ce and Mn in the fabricated object, along with minor amounts of Si located within certain regions. Additional images of the weld pool microstructure of another representative alloy embodiment (Al10Ce7.7Mn) are shown in FIGS. 5A and 5B. FIG. 5A shows that "rosette-like" regions of the weld pool can comprise $Al_{20}Mn_2Ce$ near the edge of the weld tracks and a finer eutectic of Al and $Al_{20}Mn_2Ce$ in the weld pool interior. FIG. 5B shows that $Al_{11}Ce_3$ can exist in the "rosette-like" region at a very low volume fraction (e.g., less than 5% in some examples) of the total phases.

Figure 6A:
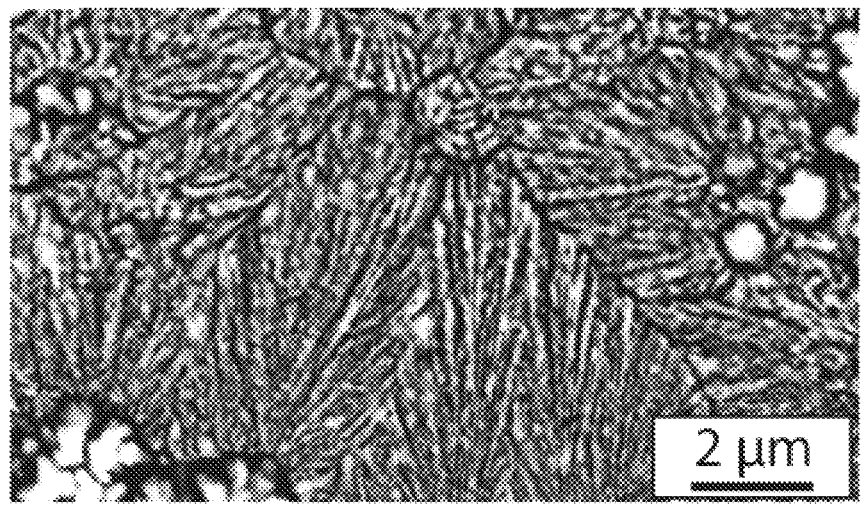
FIGS. 6A-6F are back scatter SEM micrographs at different magnifications levels comparing the microstructure of a fabricated object made using an Al—Ce—Mn alloy embodiment of the present disclosure (FIGS. 6A and 6D) with the microstructure observed after exposing the fabricated object to a temperature of 350° C. for 96 hours (FIGS. 6B and 6E), and the microstructure after exposing the fabricated object to a temperature of 400° C. for 200 hours (FIGS. 6C and 6F).
Figure 6B:
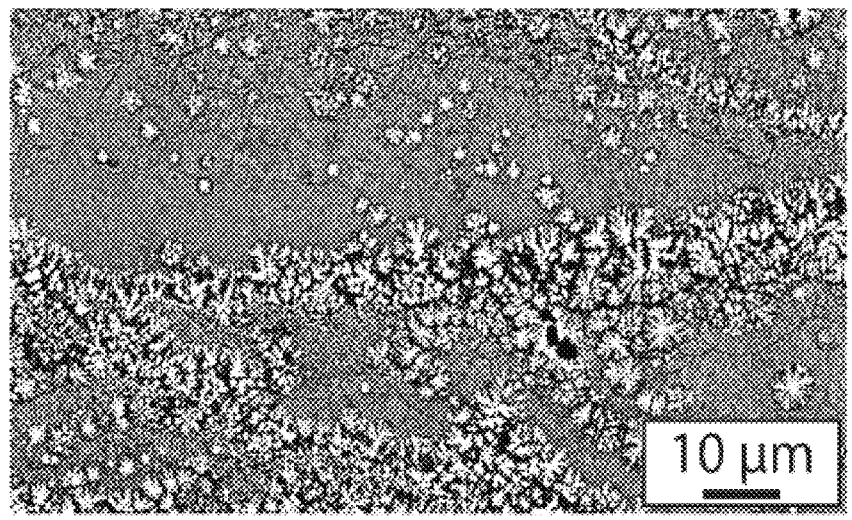
Figure 6C:
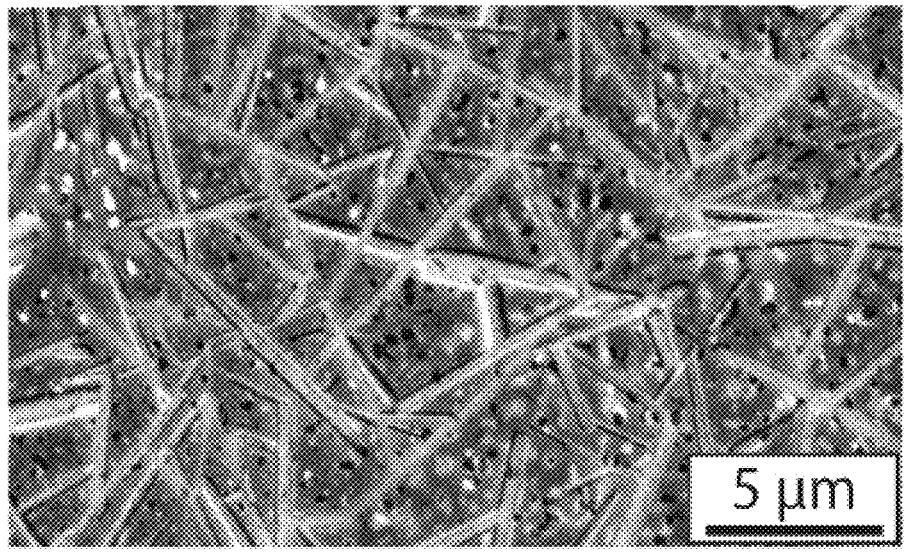
Figure 6D:
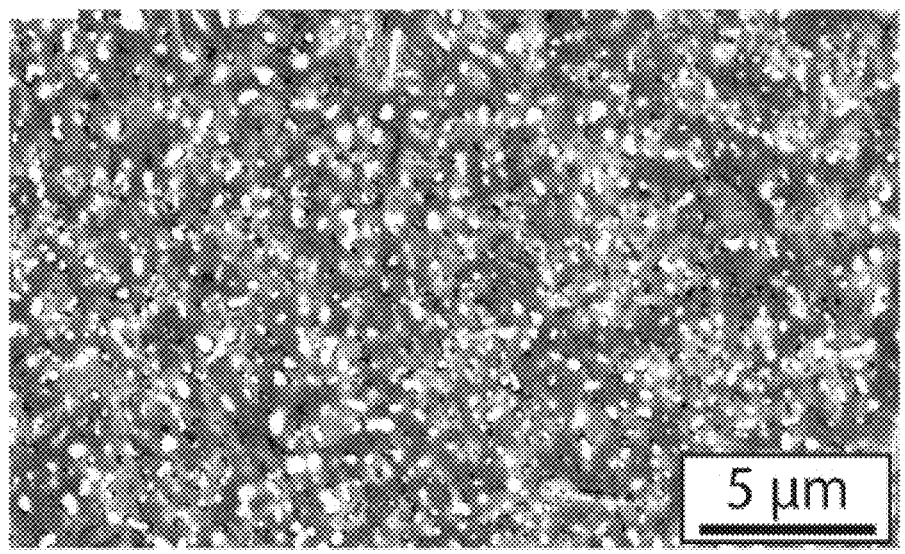
Figure 6E:
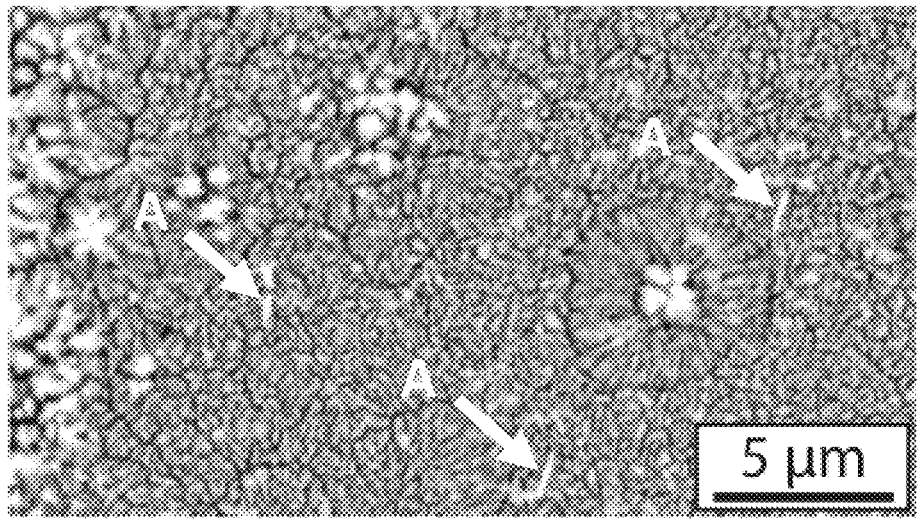
Figure 6F:
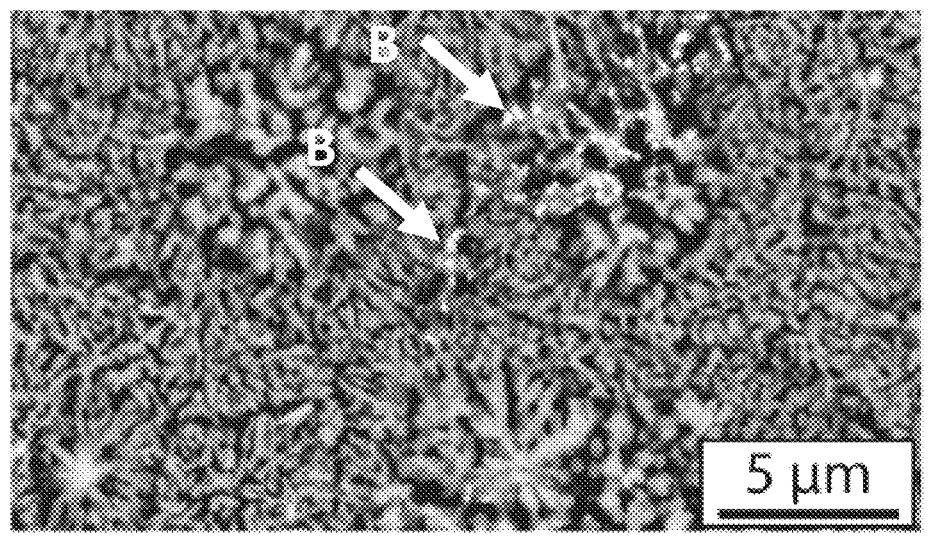

The microstructure was also characterized following progressive thermal exposures; results are shown in FIGS. 6A-6F. Examples of the as-fabricated structure, the structure after thermal exposure at (400° C. for 200 hours), and representative samples of an intermediate state (350° C. for 96 hours) are shown in FIGS. 6C/6D, and FIGS. 6E/6F, respectively. As can be seen by FIGS. 6C and 6D, the microstructure is heterogeneous even after long term thermal exposure, similar to the as-fabricated structure (FIGS. 6A and 6B), but with different phases and phase morphologies. Some regions contain high aspect ratio intermetallic platelets, while other regions exhibit a fine, globular phase distribution. Evidence of the partially transformed phase structure was found after exposure at 350° C. for 96 hours as shown in FIGS. 6E and 6F (shown with arrows A and B, respectively). The partially transformed state shows that the platelets have grown from the fine eutectic solidification structure, while the globular particle distribution results from the decomposition of the large rosette intermetallic particles.

Figure 7A:
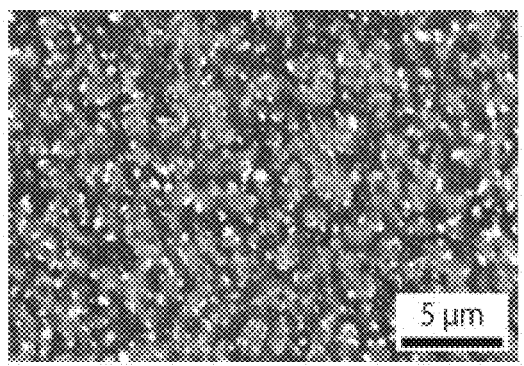
FIGS. 7A-7J are images of a heterogeneous microstructure of a fabricated object made using an Al—Ce—Mn alloy embodiment of the present disclosure after thermally treating the fabricated object; micrographs in FIGS. 7A and 7B, which show the microstructure of two different regions within the fabricated object, were examined using EDS to provide the images of FIGS. 7C-7J.
Figure 7B:
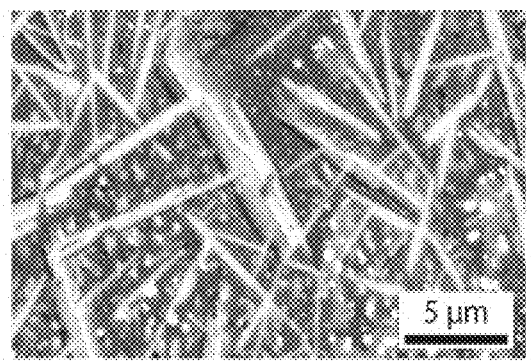
Figure 7C:
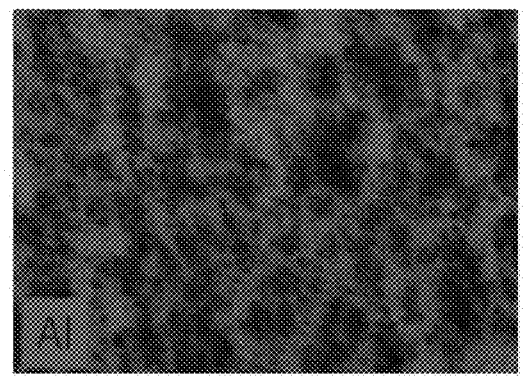
Figure 7D:
Figure 7E:
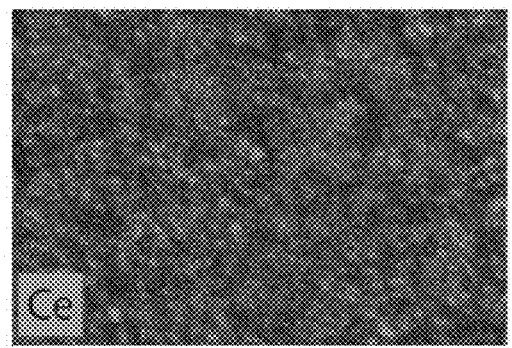
Figure 7F:
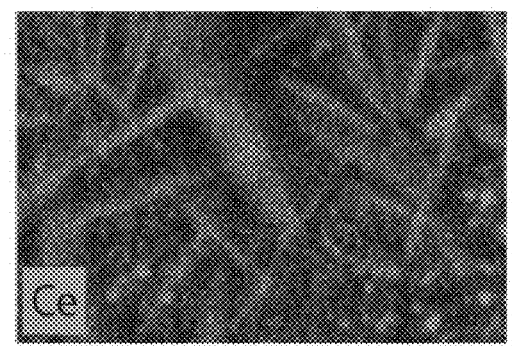
Figure 7G:
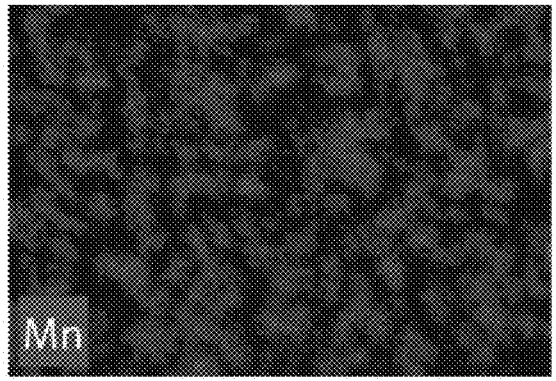
Figure 7H:
Figure 7I:
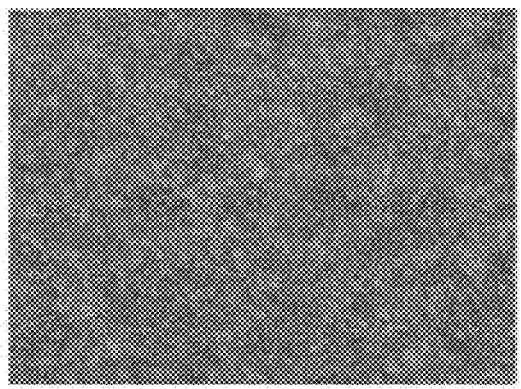
Figure 7J:
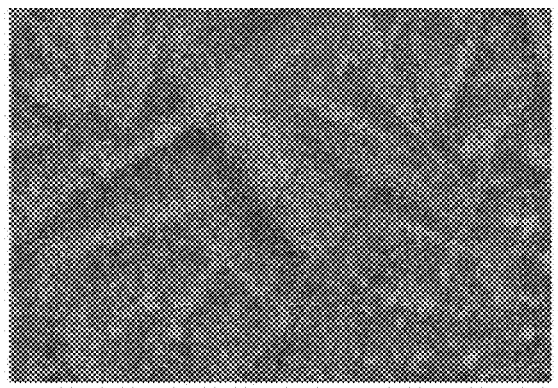

The heterogeneous phase distribution in the thermally exposed state was characterized by SEM-EDS as shown in FIGS. 7A-7J. The fine globular structure shown in FIGS. 7A and 7B was found to comprise a combination of four phases: the Al matrix (FIGS. 7C and 7D), a Ce-rich intermetallic (FIGS. 7E and 7F), a Mn-rich intermetallic (FIGS. 7G and 7H), and a ternary intermetallic containing Al and both Ce and Mn (FIGS. 7I and 7J). The platelet intermetallic particles contain both Ce and Mn. A fine distribution of globular Ce and Mn containing binary intermetallic particles are found between the platelets.

Figure 8A:
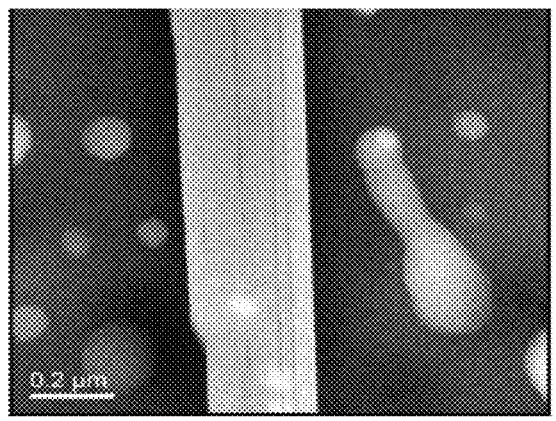
FIGS. 8A-8D are images of an intermetallic platelet observed in a fabricated object after thermal exposure, wherein the fabricated object was made with an Al—Ce—Mn alloy embodiment according to the present disclosure.
Figure 8B:
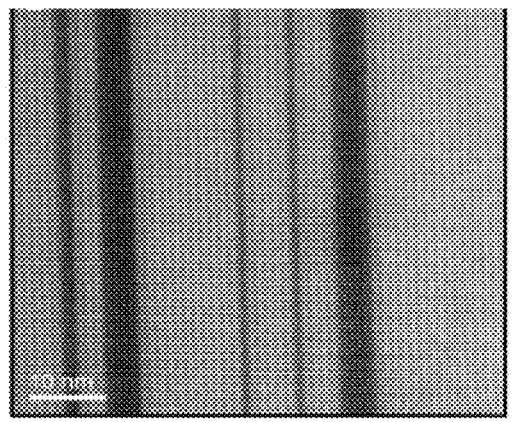
Figure 8C:
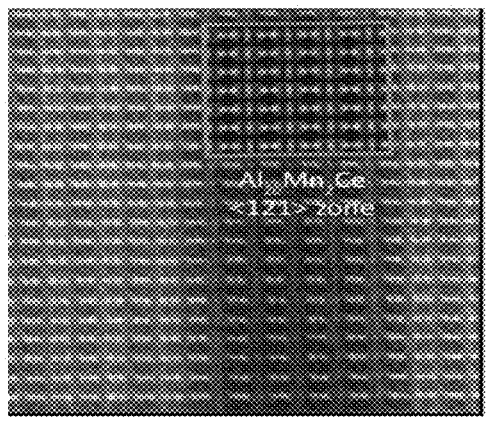
Figure 8D:
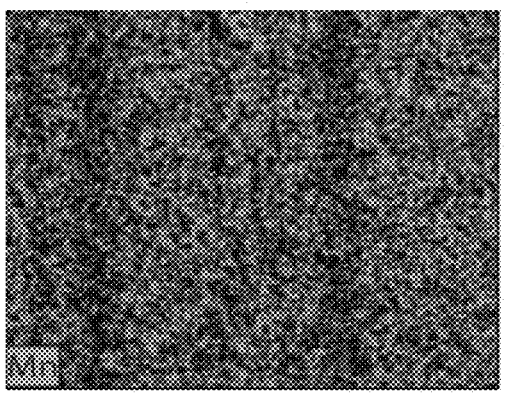

The platelet intermetallic phase was examined using HRSTEM as shown in FIGS. 8A and 8B. At moderate magnification, the platelets appear to contain a series of lower contrast stripes. With progressively higher magnification, the platelets are revealed to contain two compositionally distinct phases which alternate in bands. Lattice imaging shows that the structure of the regions with dark contrast has atomic positions consistent with the <121> zone of the refined $Al_{20}Mn_2Ce$ structure (FIG. 8C). By STEM-EDS, the brighter areas were found to exhibit a relative increase in the concentration of both Mn and Ce (FIG. 8D). The presence of any $Al_{10}Mn_2Ce$ structure was ruled out.

Figure 9A:
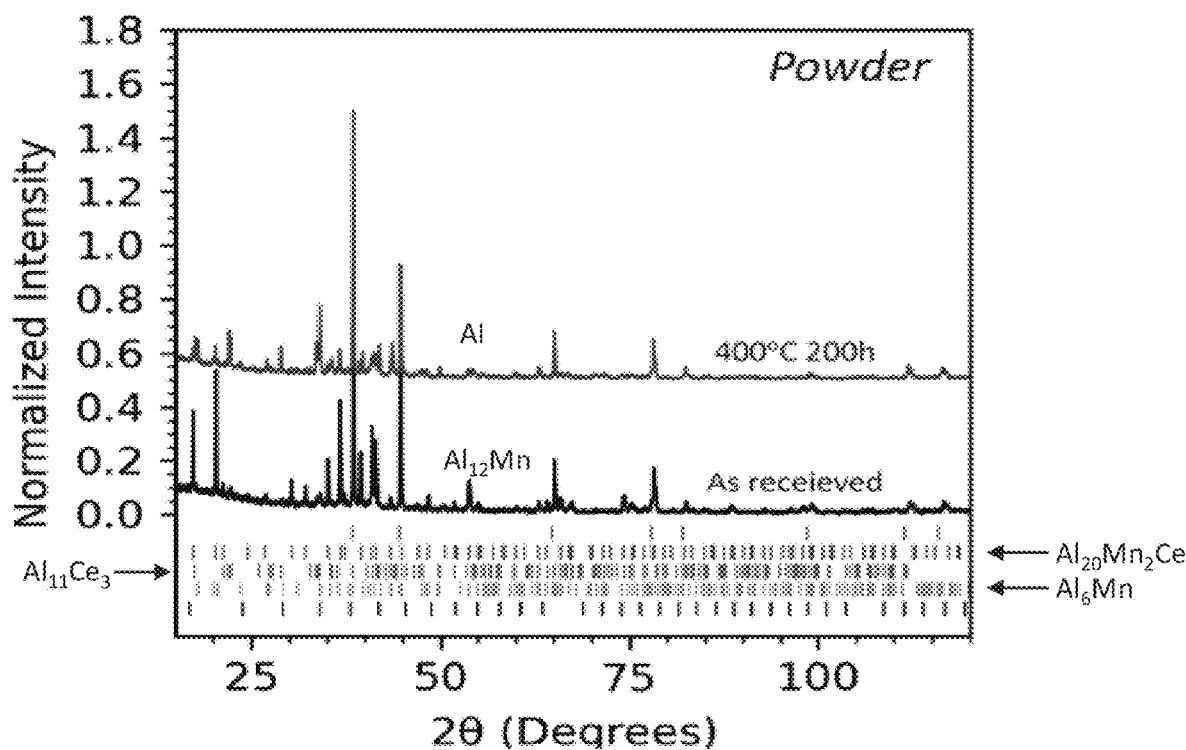
FIGS. 9A-9D are X-ray diffraction (XRD) spectra obtained from analyzing (i) a feedstock powder form of an Al—Ce—Mn alloy embodiment of the present disclosure (FIGS. 9A and 9B, wherein FIG. 9A shows the full spectrum and FIG. 9B shows an expanded view of the spectrum); and (ii) a fabricated objected made from the feedstock powder using an additive manufacturing method (FIGS. 9C and 9D, wherein FIG. 9C shows the full spectrum and FIG. 9D shows an expanded view of the spectrum); each of FIGS. 9A, 9B, 9C, and 9D shows results for the feedstock powder or fabricated object before and after thermal treatment at 400° C. for 200 hours.
Figure 9B:
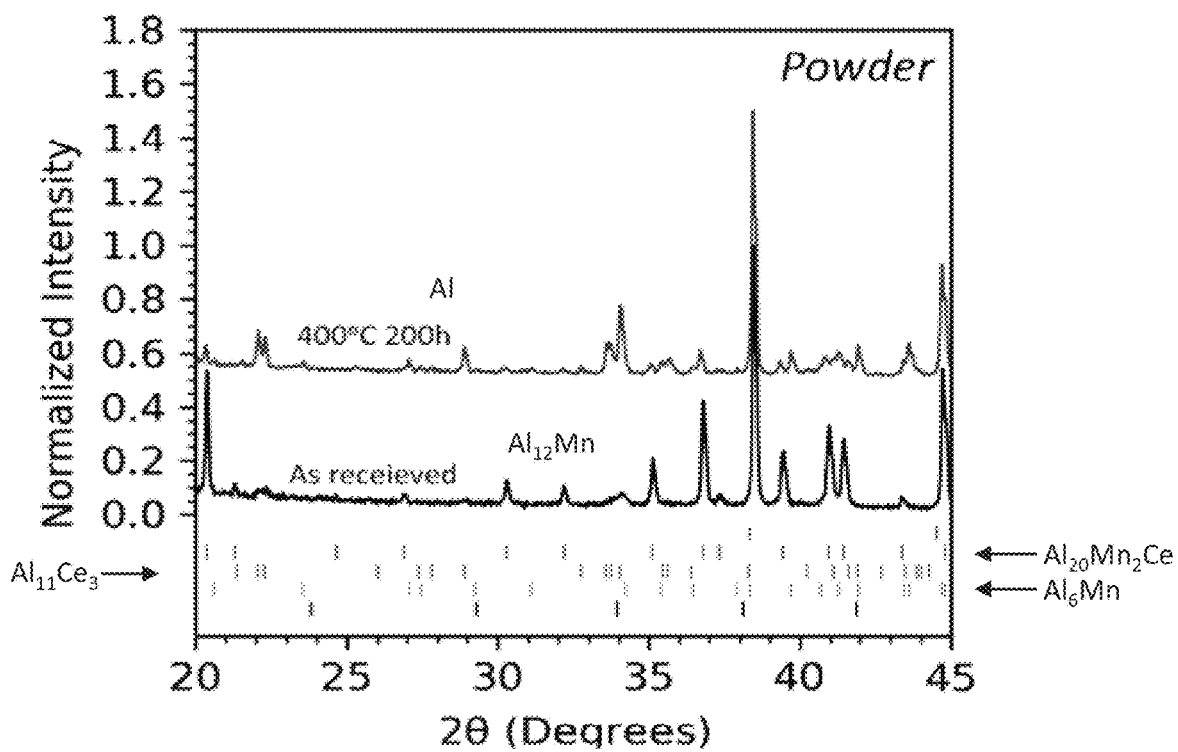
Figure 9C:
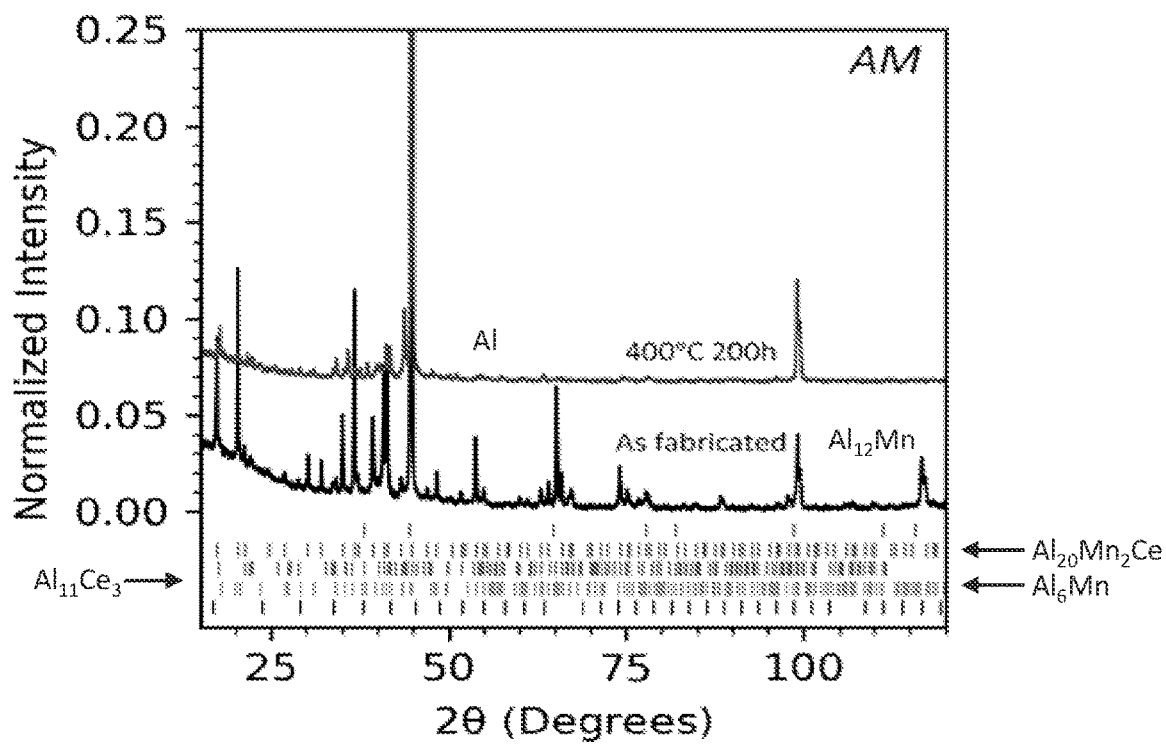
Figure 9D:
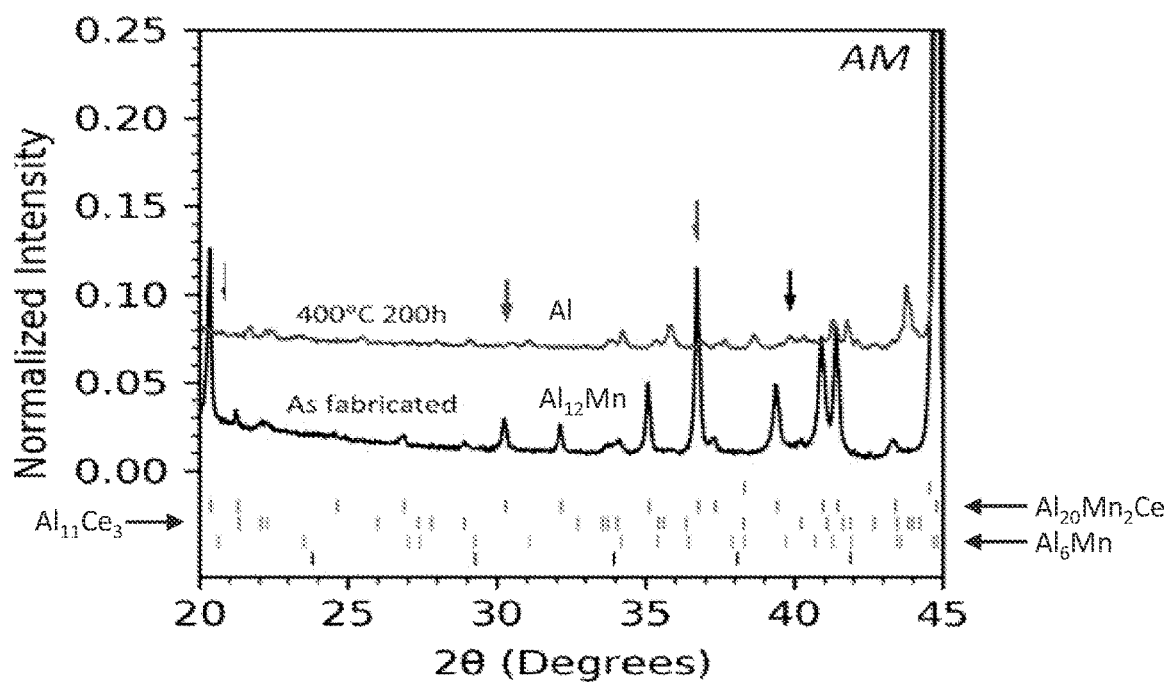

X-ray diffraction spectra for the atomized powder (FIGS. 9A and 9B) and additively manufactured samples (FIGS. 9C and 9D) for both as-fabricated and thermally exposed conditions. The powder sample shows a significant fraction of the $Al_{20}Mn_2Ce$ phase in the as-received condition, the peaks for which decrease in magnitude significantly following thermal exposure (see FIGS. 9A and 9B). Simultaneously, the peaks for $Al_{11}Ce_3$ appear to increase, and new peaks consistent with $Al_6Mn$ appear. Interpretation of the additively manufactured sample is somewhat more difficult owing to the significant texturing of some the phases, which exaggerates some peaks (the Al [200] and [400] peaks for example) and leaves absent others. However, broadly similar trends are observed, in that thermal exposure results in a decrease in magnitude of the $Al_{20}Mn_2Ce$ peaks and increase in the $Al_{11}Ce_3$ and $Al_6Mn$ peaks (see FIGS. 9C and 9D). Notably, in both the powder and additively manufactured samples, peaks consistent with $Al_{12}Mn$ were not observed.

Example 3

Figure 10A:
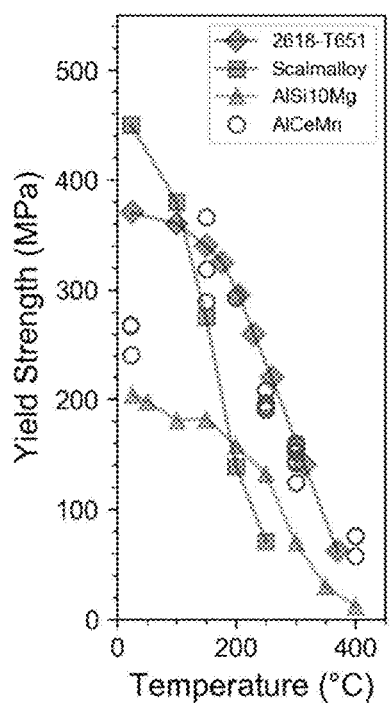
FIGS. 10A-10C are graphs of mechanical properties as a function of temperature showing results obtained from analyzing different properties of comparative objects made from a 2618-T651 alloy, Scalmalloy, and an AlSi10Mg alloy as compared to a fabricated object made using an Al—Ce—Mn alloy embodiment according to the present disclosure, wherein the fabricated object comprising the Al—Ce—Mn alloy is made with an additive manufacturing method.
Figure 10B:
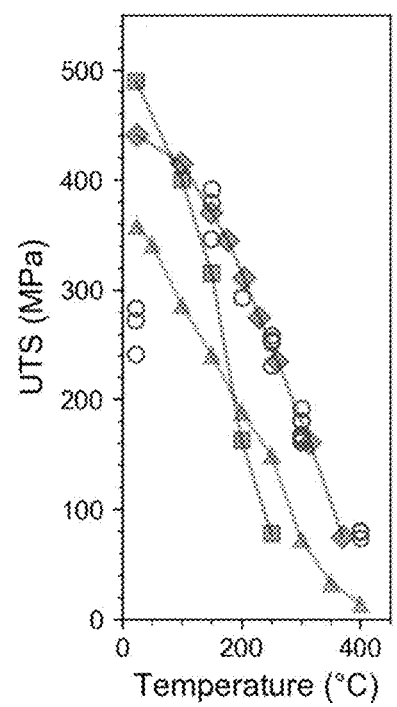
Figure 10C:
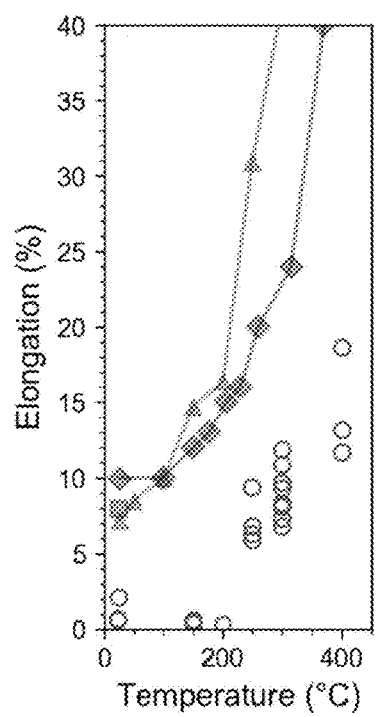

In this example, the mechanical properties of the as-fabricated Al—Ce—Mn alloy as a function of temperature were evaluated. Results are shown in FIGS. 10A-10C, utilizing a 10° C./min ramp rate and a 30 minute soak time. Three other alloys are also plotted for reference. Alloy 2618-T651 is an aged wrought Al—Cu based alloy commonly used for elevated temperature applications with properties plotted following 30 min thermal exposure. AlSi10Mg is the most commonly used Al alloy for additive manufacturing, the data for which was taken from for samples that were soaked at temperature for 10 minutes before testing. Scalmalloy is an Al—Sc alloy designed for additive manufacturing with data taken from the associated data sheet in which the thermal exposure duration was not disclosed. The Al—Ce—Mn alloy shows yield strengths lower than 2618 and Scalmalloy at room temperature, but higher than additively manufactured AlSi10Mg (see FIG. 10A). The elongation at these temperatures is low, however, and the strength values are ductility limited, which is also reflected in the tensile strength, which is lower than the reference alloys at room temperature. Beginning at 150° C., the strength of the Al—Ce—Mn alloy is greater than that of both AlSi10Mg and Scalmalloy, and competitive with 2618 for short thermal exposures (see FIG. 10C). Similarly, the tensile strength increases at elevated temperatures, and is similar to 2618 up to 400° C. (see FIG. 10B).

Figure 11A:
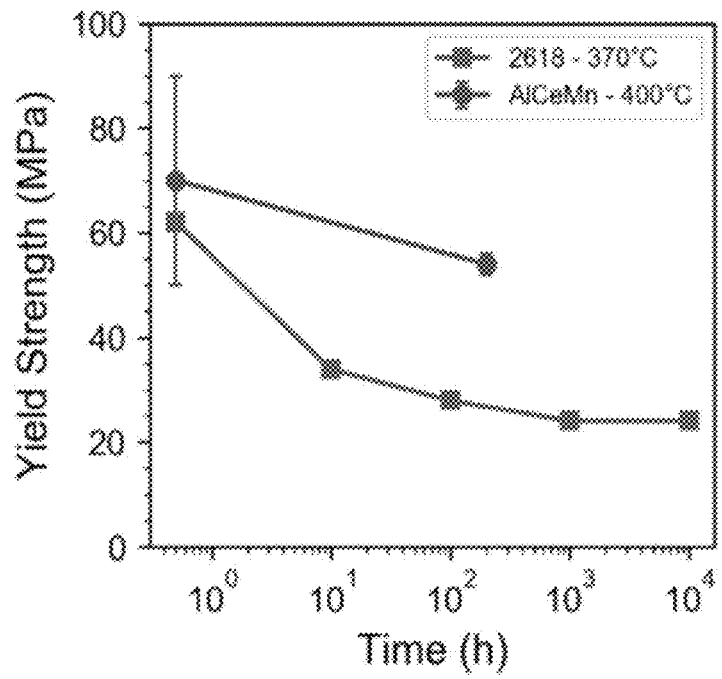
FIGS. 11A-11C are graphs of mechanical properties as a function of time (FIGS. 11A and 11B) or temperature (FIG. 11C) showing results obtained from analyzing different properties of different comparative samples as compared to a fabricated object made using an Al—Ce—Mn alloy embodiment according to the present disclosure.

The long term strength retention of the Al—Ce—Mn alloy as a function of exposure time was characterized by measuring the tensile properties following thermal exposure at 400° C. Data for 30 minutes and 200 hours thermal exposure times are compared to data for alloy 2618-T651 for preconditioning between 30 minutes and 10,000 hours at 370° C. (FIG. 11A). At short exposure times, the Al—Ce—Mn alloy shows a modest increase in strength compared to 2618, even with the slightly higher test temperature; however, the strength retention with exposure time is significantly higher, resulting in a much higher strength following long term temperature exposure up to at least 200 hours.

Figure 11B:
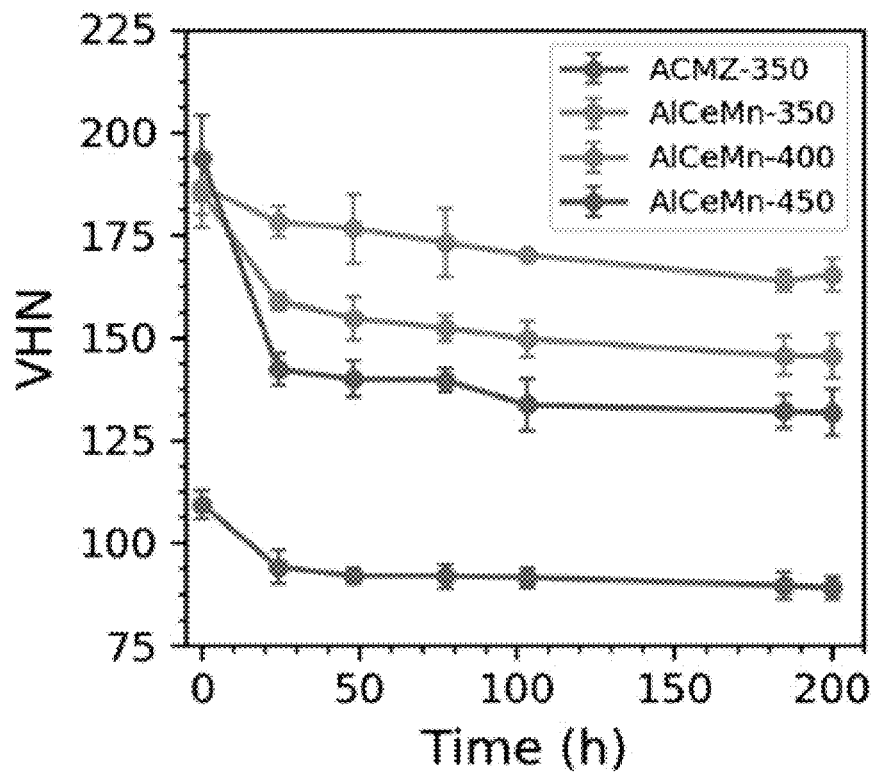

The thermal stability of the Al—Ce—Mn alloy was measured for a greater number of conditions using room temperature Vickers hardness following progressive heat treatments. FIG. 11B shows the room temperature hardness of the Al—Ce—Mn alloy as a function of thermal exposure time at three different temperature (350° C., 400° C., and 450° C.) as compared to a thermally stable cast Al—Cu—Mn—Zr (ACMZ) alloy exposed at 350° C. The as-fabricated hardness of the AM Al—Ce—Mn alloy exceeds that of the cast alloy by approximately 80 VHN. After 200 hours, the stable hardness value, even at 450° C., exceeds the cast alloy by more than 50%. The hardness at this time appears to be approaching a steady value, which also suggests that the yield strength at 200 hours shown in FIG. 11A will not decrease dramatically even for much longer thermal exposures.

Figure 11C:
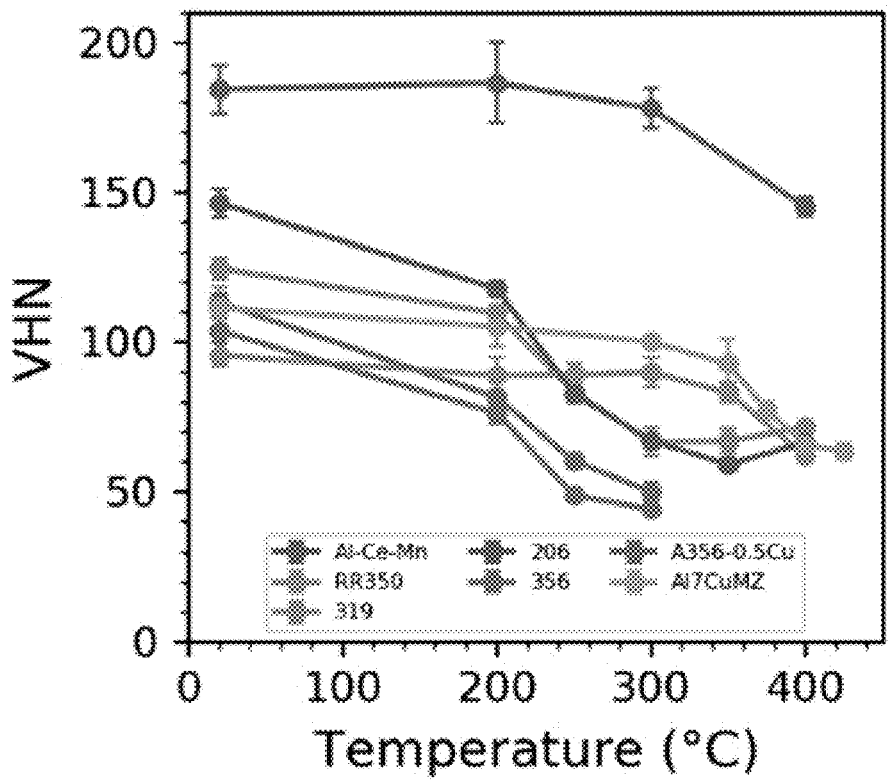

A similar comparison is made to a variety of common cast alloys for 200 h thermal exposures at various temperatures in FIG. 11C. The hardness of the Al—Ce—Mn alloy is higher than all of the available data across the full temperature range. Specifically, the fraction of the as-fabricated hardness retained after thermal exposure at 400° C. is greater than that of any of the reference alloys.

Figure 12A:
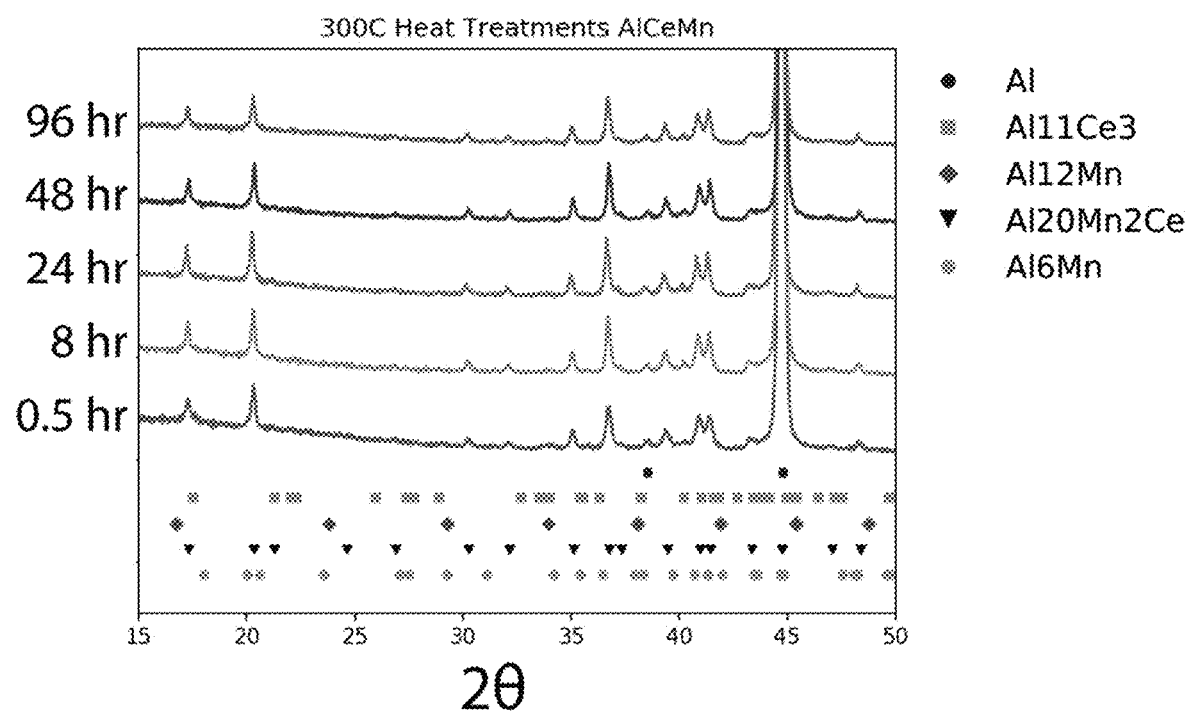
FIGS. 12A-12H show results obtained from analyzing an alloy embodiment after heat treatments at different temperatures.
Figure 12B:
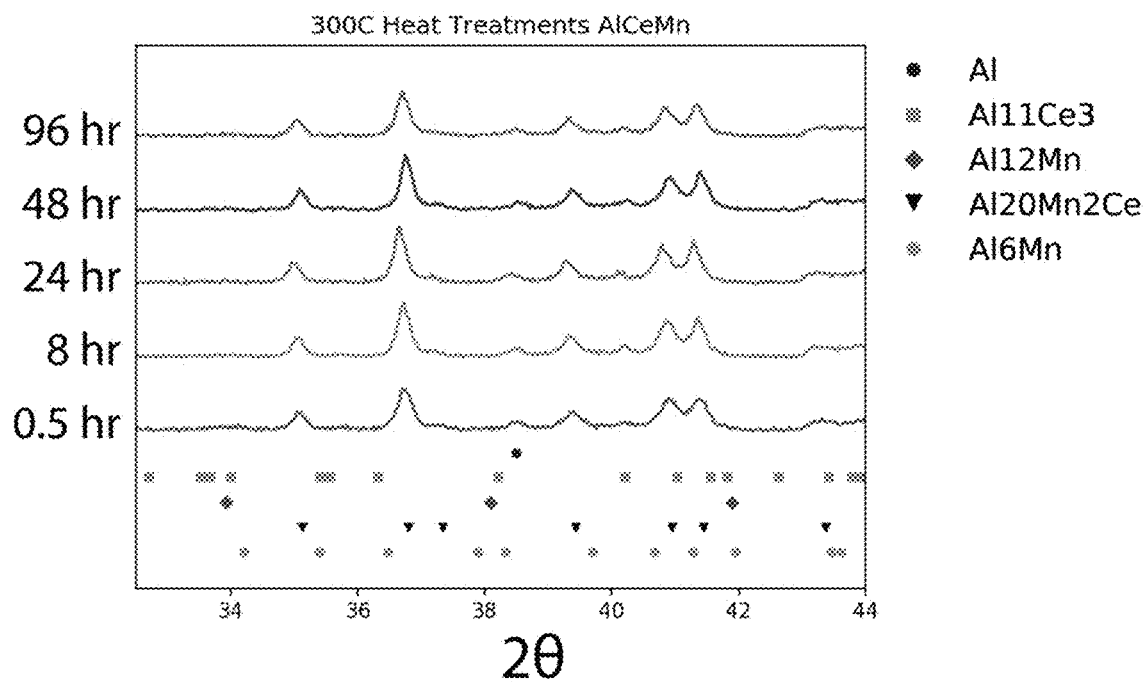
Figure 12C:
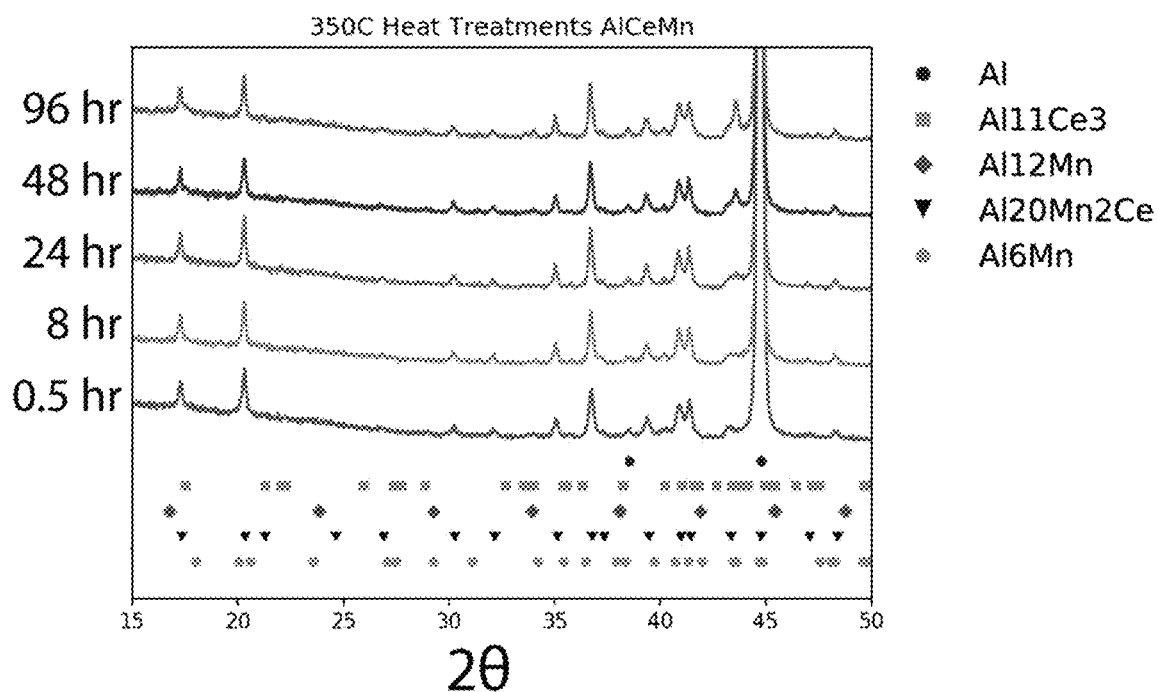
Figure 12D:
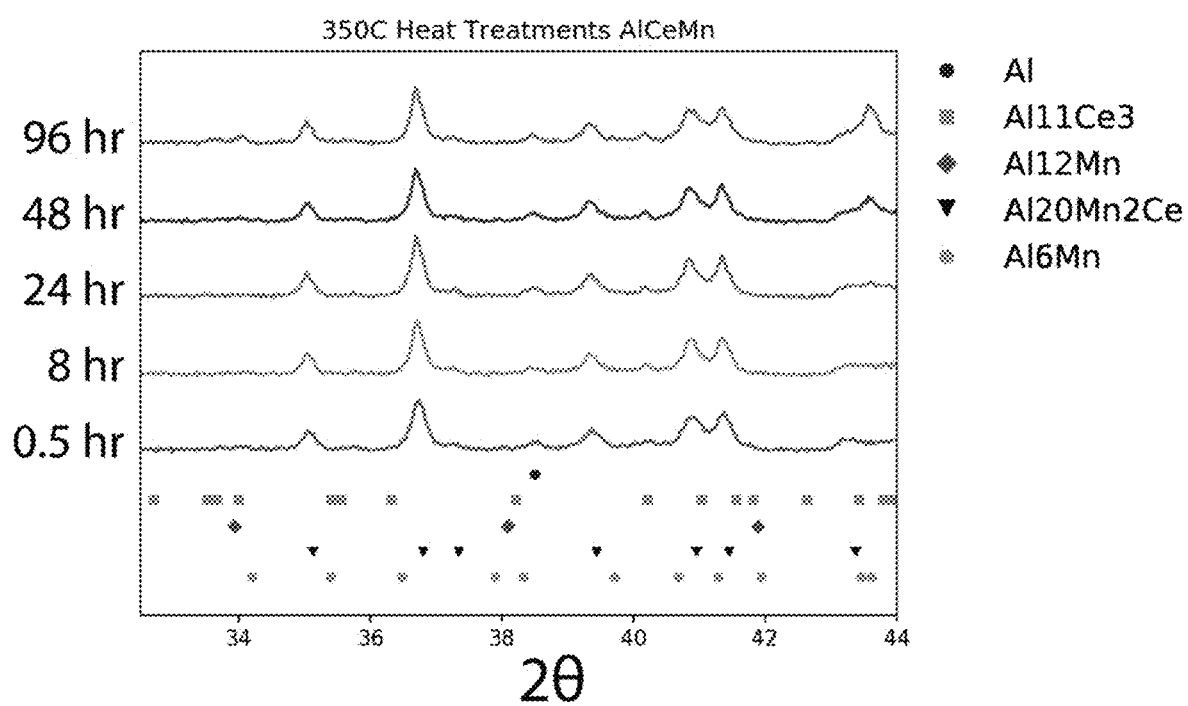
Figure 12E:
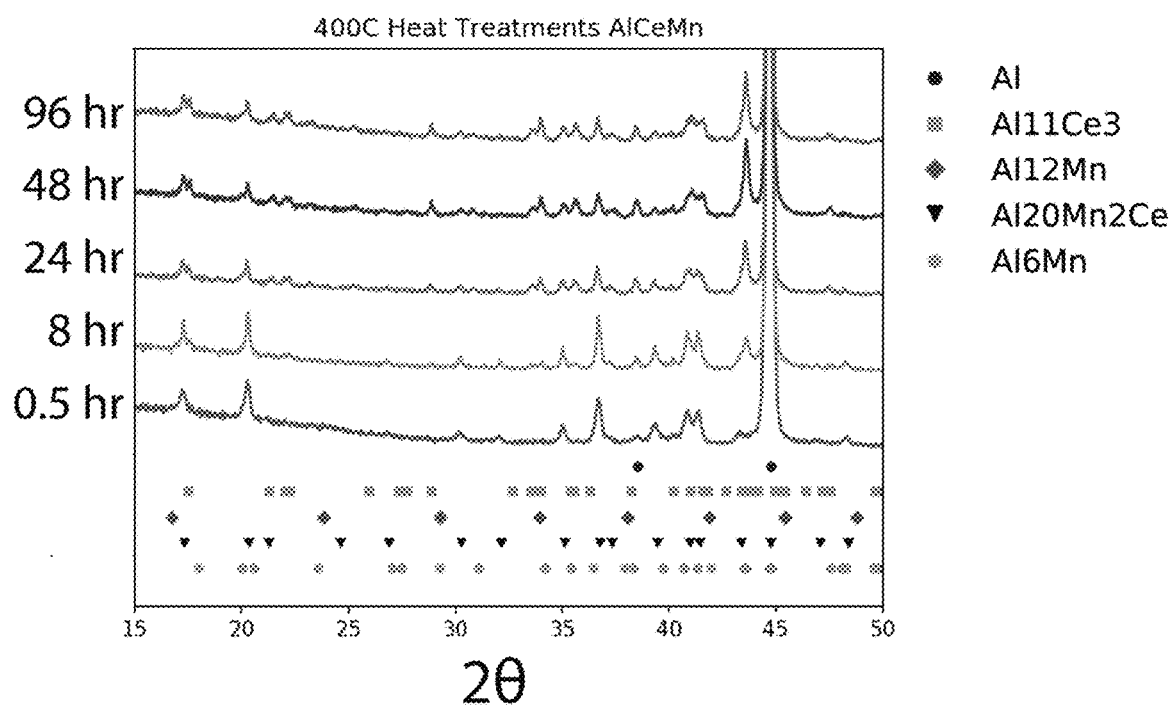
Figure 12F:
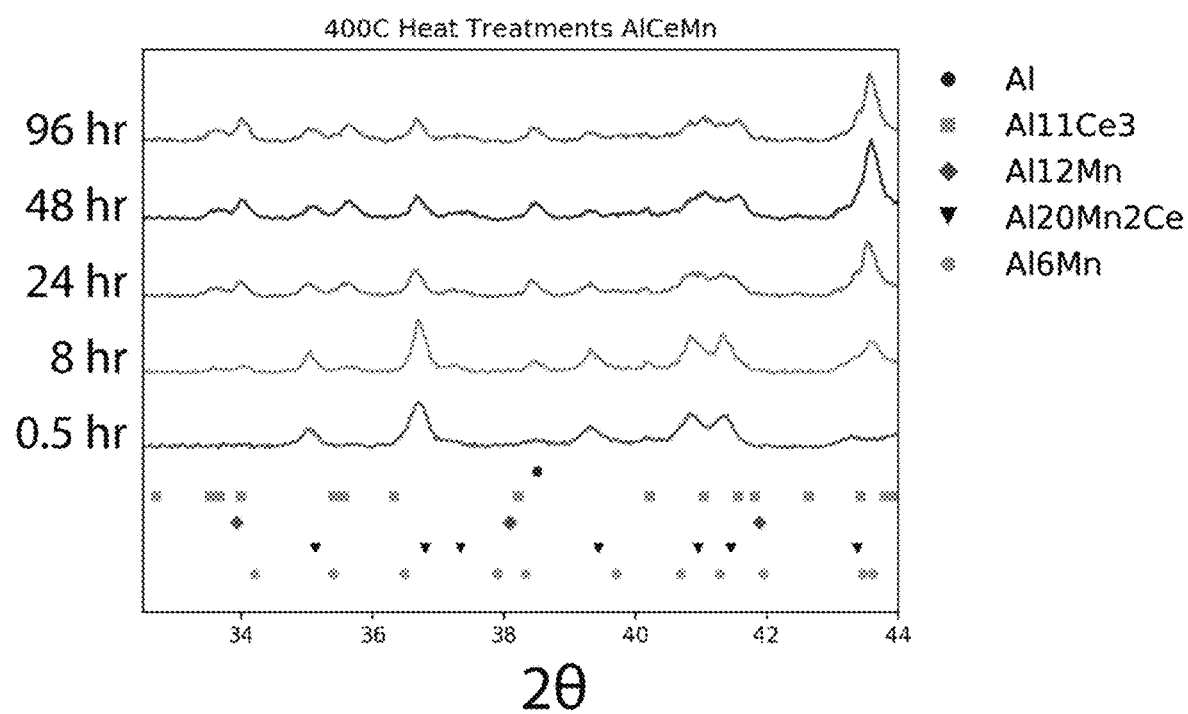
Figure 12G:
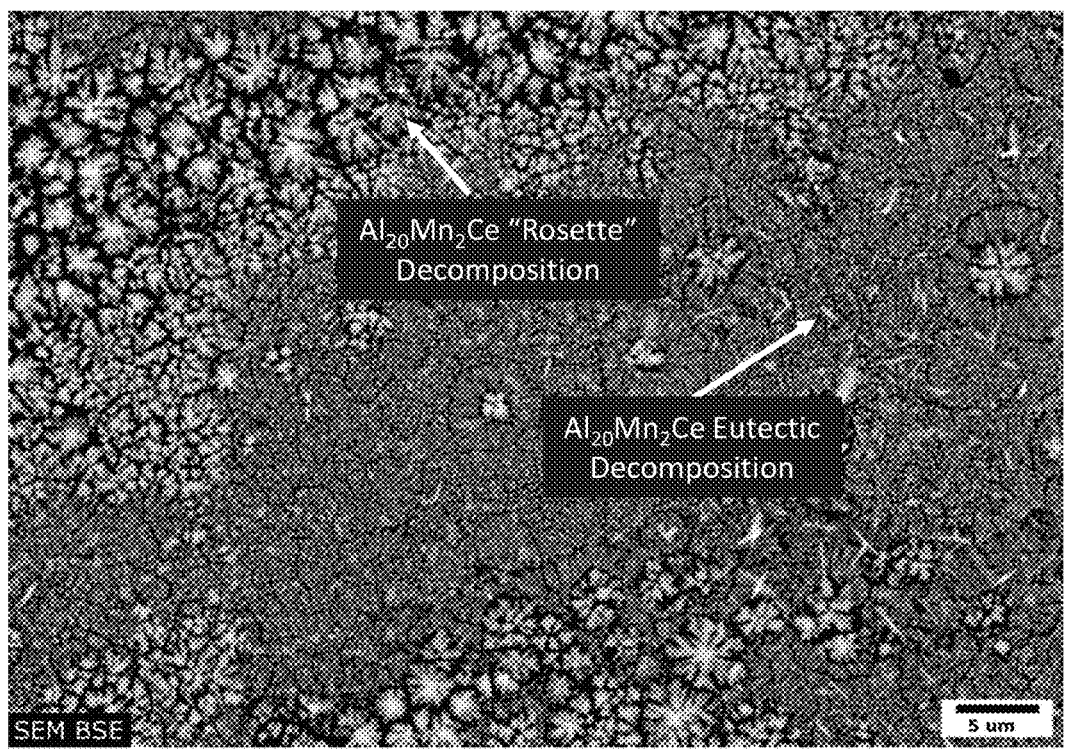
Figure 12H:
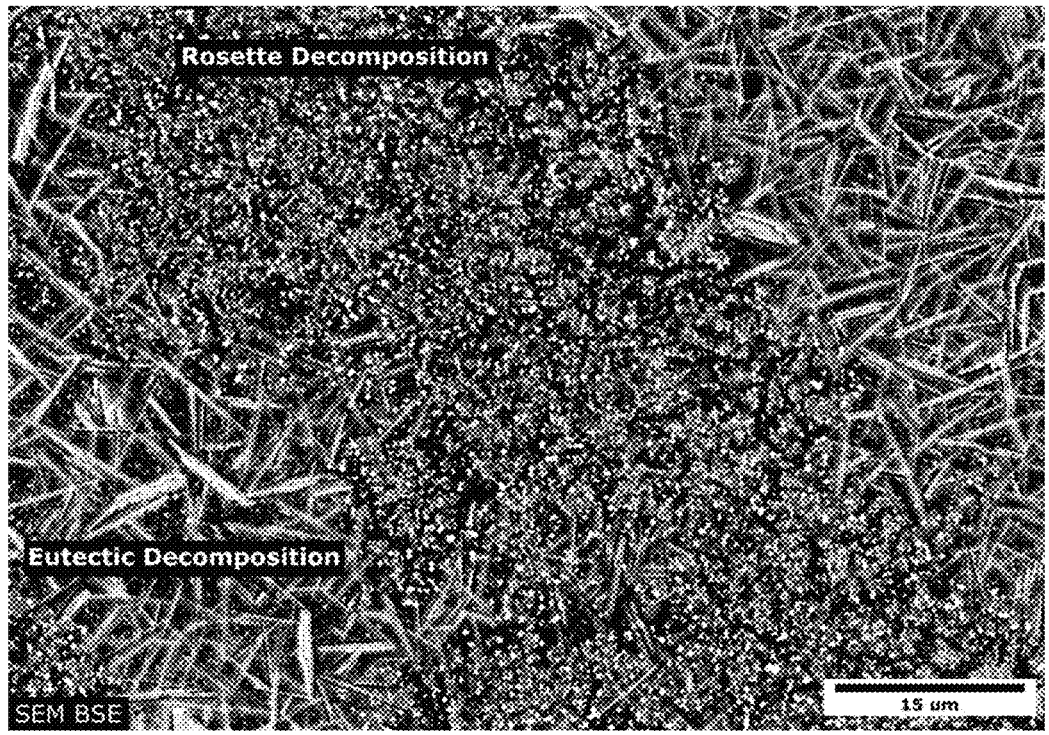

FIGS. 12A-12F provide XRD spectra showing results from additional heat treatments tests conducted at temperatures of 300° C. (FIGS. 12A and 12B), 350° C. (FIGS. 12C and 12D), and 400° C. (FIGS. 12E and 12F) for up to 96 hours. These figures illustrate that in some embodiments, phase transformations do not occur at 300° C. at least up to 96 hours, but that some phase transformations can occur at 350° C. and some phases can have increased volumes at 400° C. (see also FIGS. 12G and 12H, which provide SEM images showing decomposition of the "rosette-like" particles and the eutectic phase of a representative embodiment). Without being limited to a single theory, it currently is believed that at least one phase produced during decomposition of other phases at heat treatments at 400° C. can be $Al_{51}Mn_7Ce_4$.

A summary of certain tensile data is quantified in Table 2 at room temperature and for tests at 400° C. before and after a 200 h precondition. The room temperature tensile data clearly shows the ductility limited nature of the low-temperature tests for this material, with elongation at fracture just above 1%. As expected, the yield strength decreases relative with the increase in temperature. Also, with increasing the exposure time from 30 min to 200 h at 400° C., the yield strength decreases by approximately 16 MPa, although the change as a function of exposure time is within the range of sample variability. Interestingly however, the ductility of the material increases dramatically with thermal exposure, from 14.5% for a 30 min exposure to 43.5% after 200 h, suggesting that the gradual change in microstructure has a more significant effect on increasing ductility than it does on decreasing strength.

TABLE 2

Tabulated mechanical properties from selected tensile tests showing averages and standard deviation.

| Condition | YS (MPa) | Elongation (%) |
|---|---|---|
| As-fabricated - RT | 268 ± 15 | 1.14 ± 0.83 |
| As-fabricated - 400° C. | 70 ± 20 | 14.5 ± 3.7 |
| Pre-conditioned - 400° C. | 54 ± 2 | 43.5 ± 6.3 |

Figure 13A:
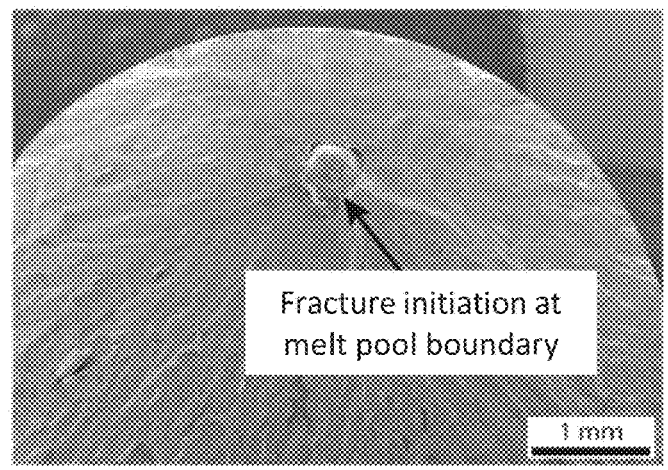
Figure 13B:
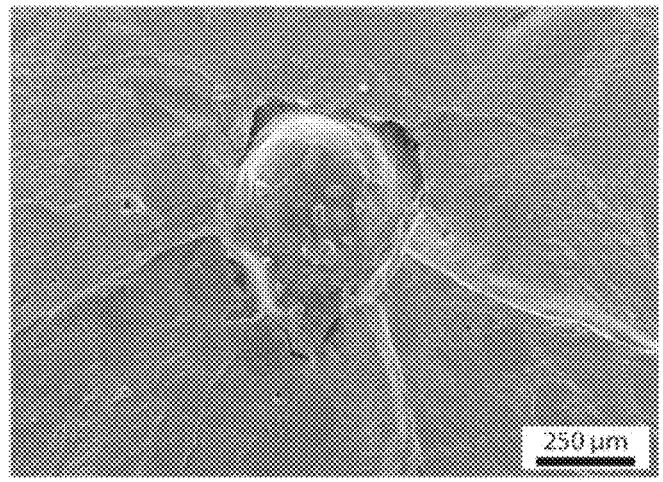
Figure 13C:
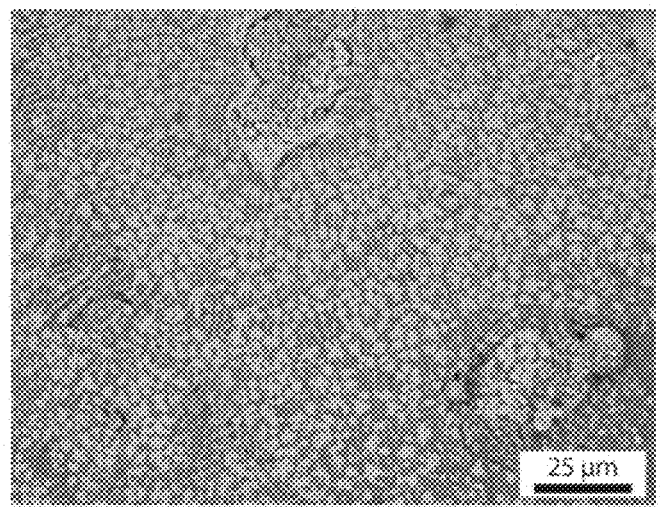
Figure 13D:
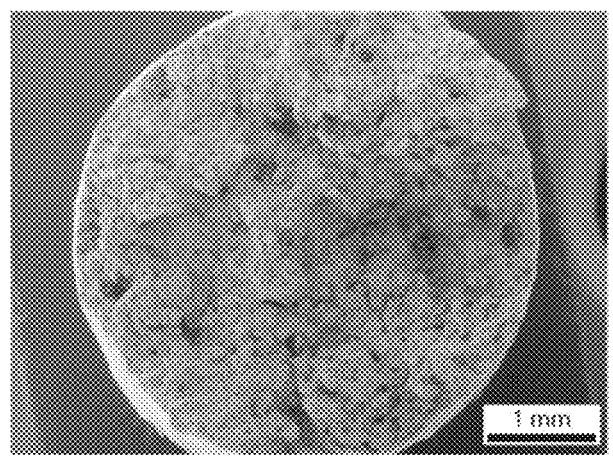
Figure 13E:
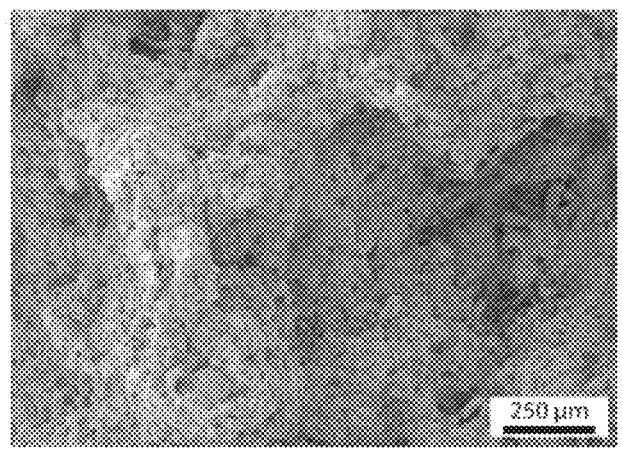
Figure 13F:
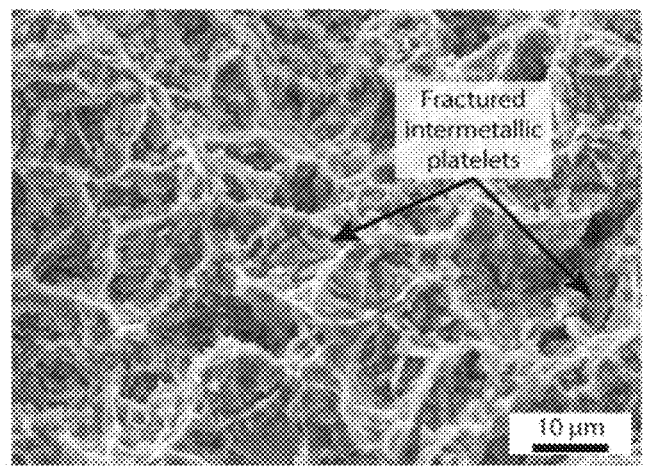

Example fracture surfaces for the room temperature and pre-conditioned 400° C. tensile tests are shown in FIGS. 13A-13C (room temperature) and FIGS. 13D-13F (400° C.). The room temperature fracture surface is brittle and exhibits a crack initiation point with a hemispherical shape, roughly 250 μm in diameter. These results suggest that the properties could be improved by varying the composition to change the relative fraction of the different phase morphologies. The initial fracture surface has a size that is the same order as the melt pool widths observed in FIG. 2A. At high-magnification, the surface of the fracture initiation site shows evidence of the coarse rosette morphology of the $Al_{20}Mn_2Ce$ phase previously observed primarily at the melt pool boundaries. On the other hand, the fracture surface of the pre-conditions 400° C. specimen shows a largely ductile behavior. However, evidence of some fracture of at least some platelets of the ternary intermetallic phases can be seen at higher magnification (FIG. 13F).

Figure 14A:
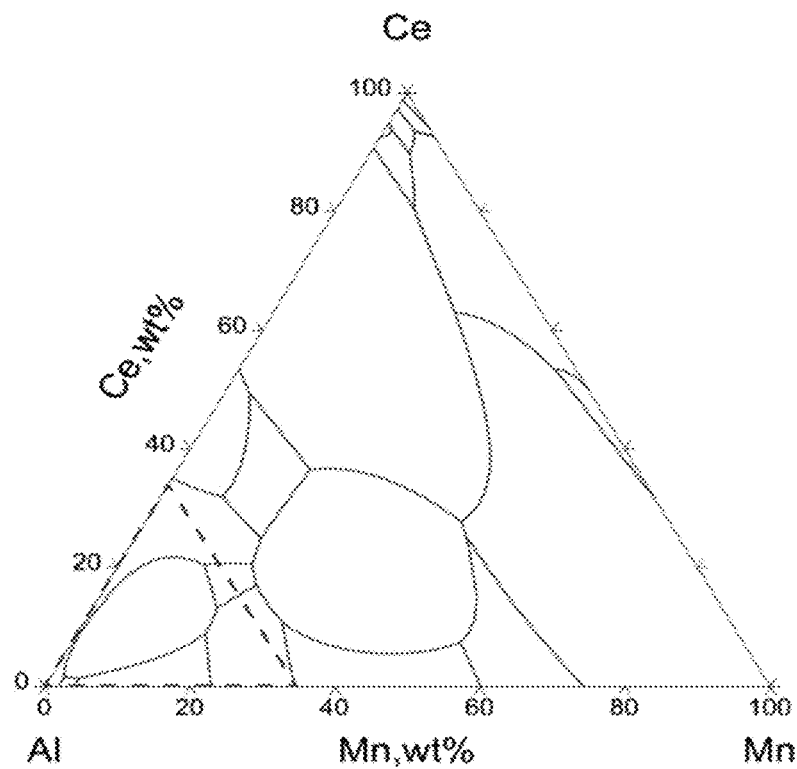
Figure 14B:
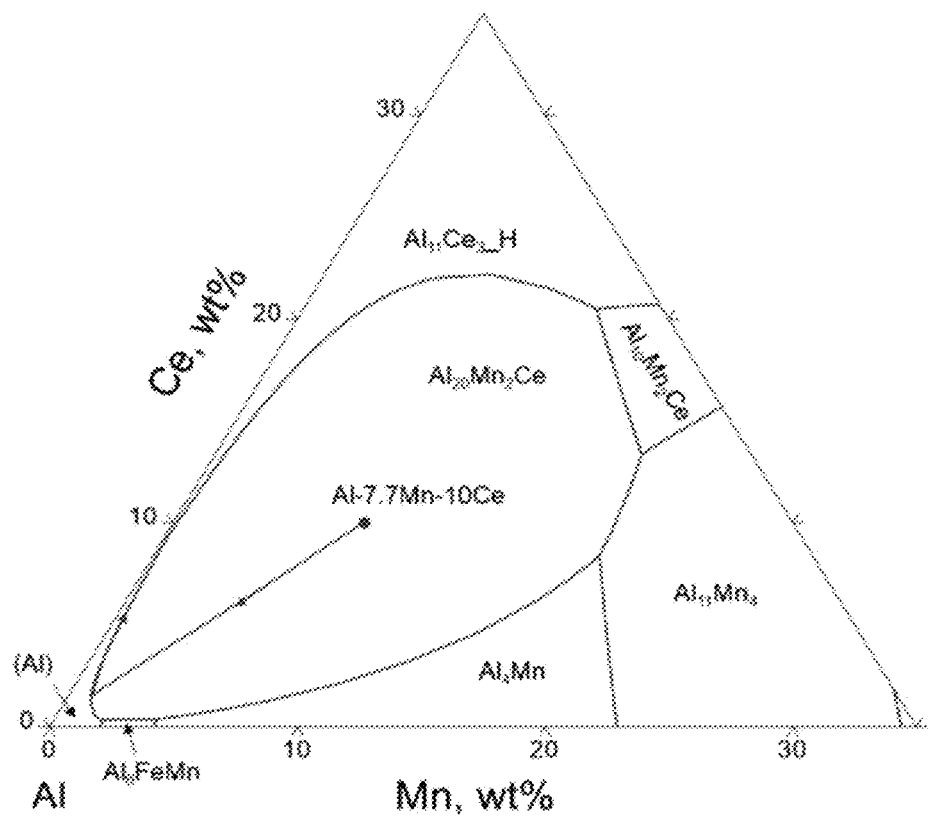
Figure 15:
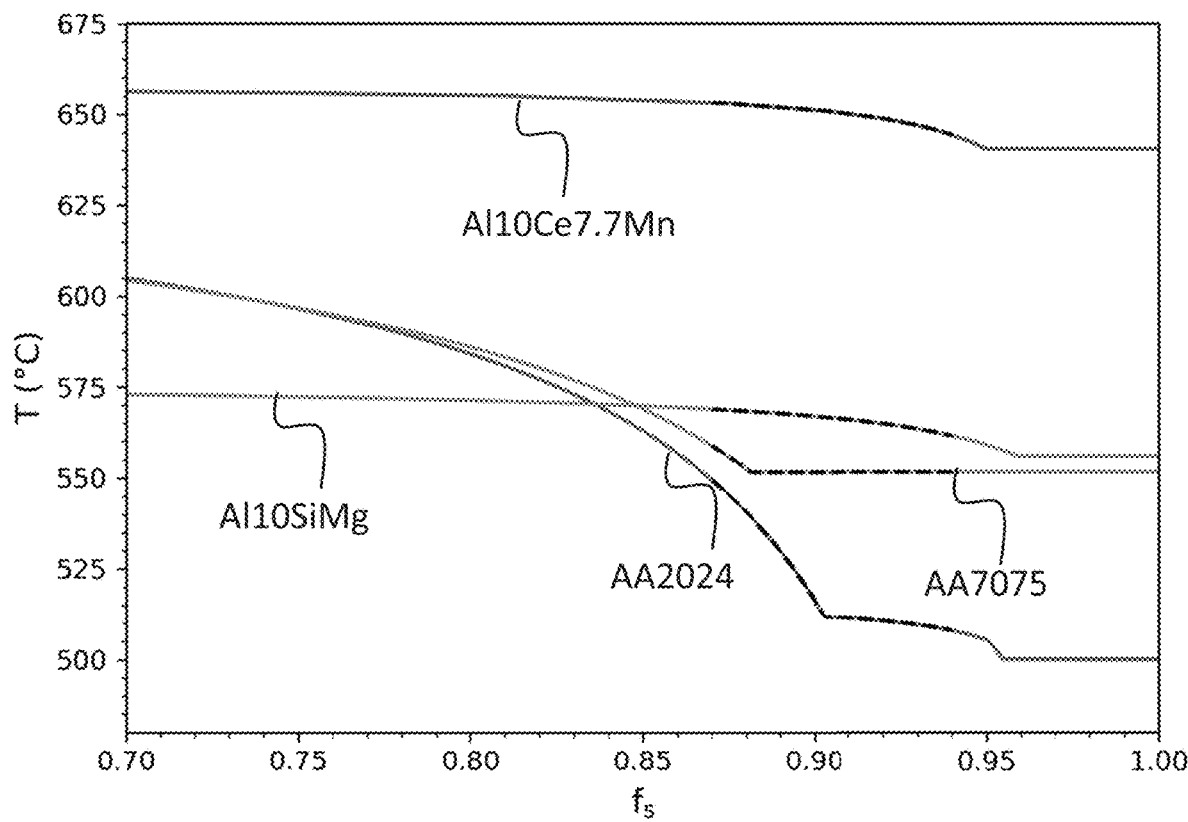
FIG. 15 is a representative Scheil simulation plot for comparison alloys (AA2024, AA7075, and AlSi10Mg) and an alloy embodiment of the present disclosure.
Figure 16:
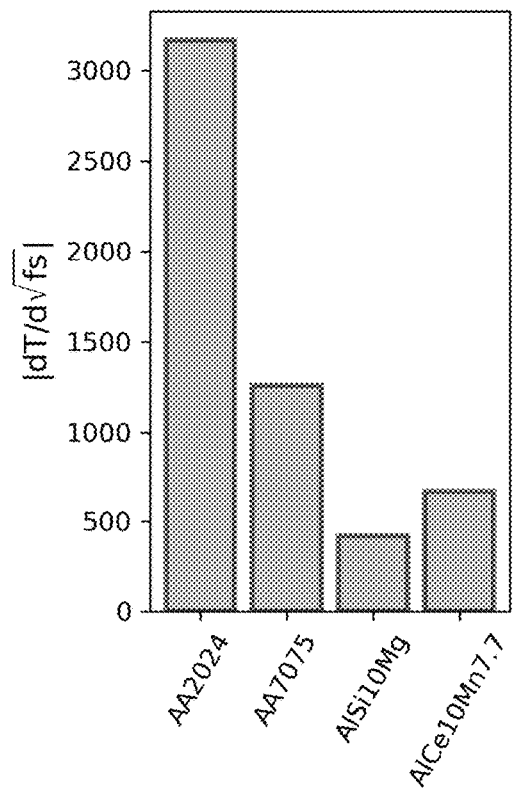
FIG. 16 shows hot tearing results for the comparison alloys and alloy embodiment of FIG. 15.

In some examples, the solidification structure observed in the as-fabricated samples can be understood by considering the thermodynamics of the ternary Al—Ce—Mn system. The calculated liquidus projection of the ternary system (including impurity levels of Fe and Si) is shown in FIGS. 14A and 14B. In the Al-rich corner, the measured composition of the Al—Ce—Mn alloy is found in the primary phase region for the $Al_{20}Mn_2Ce$ ternary intermetallic. A Scheil simulation shows that the solidification path follows the liquidus surface to a binary eutectic trough forming $Al_{20}Mn_2Ce$ and Al, and then follows this trough to terminate in a ternary eutectic with $Al_{20}Mn_2Ce$, Al, and $Al_{11}Ce_3$. A representative Scheil simulation plot for comparison alloys and an alloy embodiment of the present disclosure (labeled as "AlCe10Mn7.7"—which corresponds to an Al10Ce7.7Mn alloy) is shown in FIG. 15. In particular example, this prediction was consistent with the phase content in the as-fabricated samples as measured by XRD (FIGS. 9C and 9D), except for the peaks consistent with $Al_6Mn$ and Mn-rich regions observed by EDS. Since $Al_6Mn$ is not predicted to be stable in the solidification structure, this suggests that it evolves in the solid state due to the thermal cycling present in the additive process. Hot tearing results for the comparative alloys and the Al10Ce7.7Mn alloy of FIG. 15 are provided in FIG. 16.

Figure 17A:
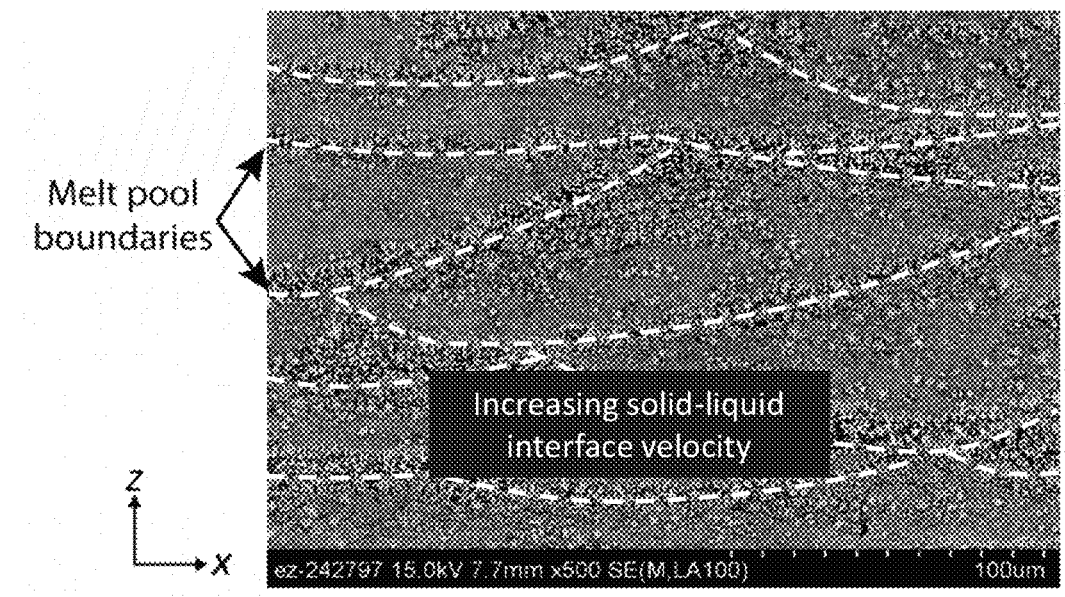
FIGS. 17A and 17B show SEM images (FIG. 17A=100 μm scale.
Figure 17B:
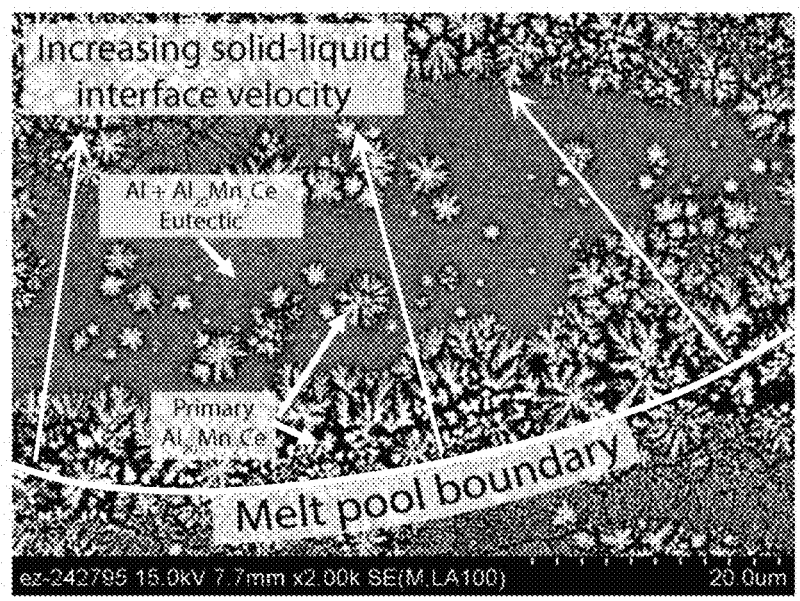

In some examples, the primary $Al_{20}Mn_2Ce$ phase is observed at melt pool boundaries, while the melt pool interior is made up mostly of an $Al_{20}Mn_2Ce+Al$ platelet eutectic structure. Within the melt pool during solidification, the solid-liquid velocity tends to be low at the melt pool boundary and increases toward the melt pool center. As such, in some examples, the primary phase tends to form when the growth velocity is low, and the eutectic reaction is selected when the growth velocity is high. This behavior suggests that this Al—Ce—Mn alloy system exhibits a skewed coupled eutectic zone in which the high surface energy of the primary intermetallic phase causes its formation to be suppressed at high growth velocities where curvature driven undercooling becomes significant. Illustrations of the interface growth velocity as a function of location within the melt pool of a representative Al—Ce—Mn alloy embodiment is shown in the SEM images provided by FIGS. 17A and 17B.

Figure 18A:
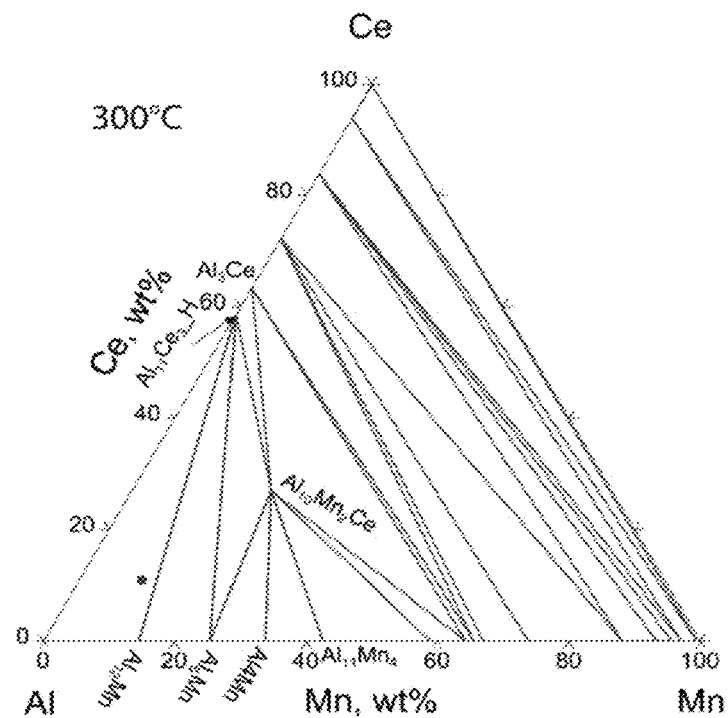
FIGS. 18A and 18B are illustrations of thermodynamic calculations of a representative Al—Ce—Mn ternary system, showing liquidus projections in the Al-rich corner and isothermal sections at 300° C.
Figure 18B:
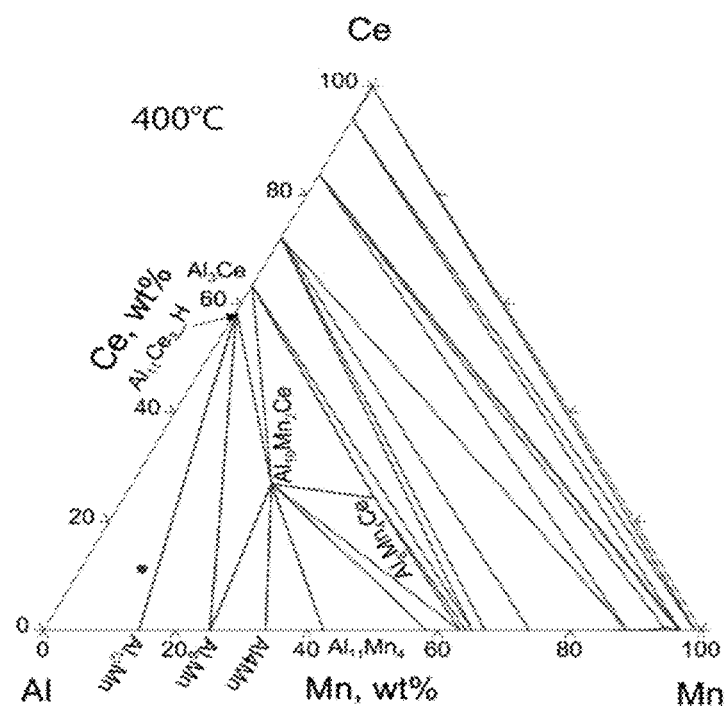

X-ray diffraction and STEM-EDS suggest that the as-fabricated structure included $Al_6Mn$ and potentially other Mn-rich intermetallic phases along the solidification path. Isothermal sections of the phase diagram at 300° C. and 400° C. are shown in FIGS. 18A and 18B, respectively. At these temperatures, the $Al_{20}Mn_2Ce$ phase is no longer stable, and is expected to decompose into a combination of $Al_{12}Mn$ and $Al_{11}Ce_3$; however, unexpectedly, it appears that either through localized segregation or kinetic effects, the $Al_6Mn$ phase is favored over $Al_{12}Mn$, which, without being limited to a particular theory, is currently believed to suggest that the $Al_6Mn$ observed in the as-fabricated material formed as a solid-state decomposition of $Al_{20}Mn_2Ce$ during in situ thermal cycling.

These observations also apply to the phase distribution following thermal exposure, where the fraction of the $Al_{20}Mn_2Ce$ phase decreases and $Al_6Mn$ and $Al_{11}Ce_3$ increase. Furthermore, the possible identification of the $Al_{10}Mn_2Ce$ intermetallic also suggests a highly meta-stable structure, which is contrary to anticipated results based on thermodynamic modeling as this phase is not stable at 400° C. for the Al—Ce—Mn alloy composition (FIG. 18B). This phase also likely originates from the decomposition of $Al_{20}Mn_2Ce$ and the subsequent phase transformation pathway, but the fact that it is not observed in the heat treated powder sample suggests that the phase evolution is strongly influenced by the as-fabricated additively manufactured microstructure.

In some embodiments, the mechanical properties for both the as-fabricated and thermally exposed conditions can be rationalized by considering the relevant strengthening mechanisms and their distribution among the heterogeneous microstructure and by utilizing information according to the present disclosure. In the as-fabricated condition, the rosettes at the melt pool boundary and the fine eutectic at the melt pool center may be modeled considering Orowan type strengthening. The increase in the yield strength due to this effect may be modeled for spherical particles using Equation 1:

$$\Delta \sigma_{Or}^{sphere} = \frac{MGb}{2\pi \lambda \sqrt{1-v}} \ln \frac{\pi d}{4b}, \quad (1)$$

where G is the shear modulus of the Al matrix, b the Burgers vector of the Al matrix, $\lambda$ the inter-particle spacing, v is Poisson's ratio, M the Taylor factor of polycrystalline FCC, and d the diameter of spherical particles. In some examples, the rosettes have a non-spherical morphology, and the inter-particle spacing can be measured or approximated (when needed). As an approximation, an area equivalent mean particle diameter can be calculated using the mean area of rosettes measured from SEM micrographs. The inter-particle spacing for a triangular arrangement of spherical particles is then given by Equation 2

$$\lambda = \left(\frac{0.779}{\sqrt{f}} - 0.785\right)d, \quad (2)$$

where f is the volume fraction of particles.

In the thermally exposed condition, these rosettes can decompose into a fine distribution of intermetallic particles; however, if the resulting intermetallic phases are assumed to be hard compared to the surrounding Al matrix, then the combined effect of these particles is anticipated to be similar to that of the prior rosette morphology. Therefore, Equations 1 and 2 can also be used, in some examples, to describe the Orowan strengthening in the fine globular regions of the thermally exposed microstructure.

In some examples, the platelets in the thermal exposed microstructure may also be modeled as an Orowan strengthening effect using the relationship developed by Zhu and Starke for hard particles on the {111} planes of the Al matrix (Equation 3):

$$\Delta \sigma_{Or}^{sphere} = \frac{0.12MGb}{\sqrt{Dt}}\left(\sqrt{f} + 0.7d\sqrt{\frac{d}{t}} + 0.12f^{3/2}\frac{d}{t}\right)\ln\left(\frac{0.079d}{r_i}\right), \quad (3)$$

where d is the diameter of the plate, t the plate thickness, f the volume fraction of plates, and $r_i$=b is the inner cut off radius for dislocations. In some examples, the matrix-plate orientation relationship in an alloy may be unknown, so using the equation can provide an approximation. The area between the plates in some exemplary Al—Ce—Mn alloy microstructure examples can also contains globular particles, which may be described using Equation 1.

The FCC-Al is also strengthened by the presence of solute atoms. In some examples, Ce can be assumed to have a low enough solubility in Al for its presence to be negligible, and therefore, only Mn is considered as a solute element. The solid solution strengthening can be modeled using Equation 4

$$\Delta \sigma_{ss} = A C_{Mn}^{\beta}, \quad (4)$$

where A and $\beta$ are constants specific to Mn solute and $C_{Mn}$ is the concentration of Mn in the Al matrix. In some examples, the concentration of Mn in both conditions was approximated from STEM-EDS data, with the matrix being super-saturated at approximately 1 at % in the as-fabricated condition but decreasing to 0.3 at % in the thermal exposed state, in some examples.

The yield strength of each distinct microstructure region may then be calculated by summing the appropriate strengthening mechanisms.

The values of the parameters used in calculating the contributions from the strengthening mechanisms are given in Table 3. For the as-fabricated structure, the calculated yield strength of each microstructure and the weighted yield strength of the combined structure are summarized in Table 4. The predicted yield strength of each microstructure roughly scales with the measured Vickers microhardness for the corresponding region. The weighted average yield strength (0.35 fraction rosettes, calculated from SEM micrographs) corresponds closely with the measured room temperature yield strength of the as-fabricated material as reported in Table 1.

TABLE 3

Parameters used in the calculation of the strengthening mechanism contributions to the as-fabricated yield strength for an exemplary embodiment.

| Condition | Region | Strengthening mechanism | Parameter | Value |
|---|---|---|---|---|
| As-fabricated | Rosettes | Orowan (Eqs. 1 and 2) | Volume fraction, f | 0.44 |
| | | | Avg. diameter, d | 1.2 μm |
| | Eutectic | Orowan (Eqs. 1 and 2) | Volume fraction, f | 0.3 |
| | | | Avg. diameter, d | 300 nm |
| | | | Inter-particle spacing, λ | 190 nm |
| | Al matrix | Solid solution (Eq. 5) | $C_{Mn}$ | 1 at. % |
| | | | A | 54.8 (at. %)$^{-1}$ |
| | | | β | 1 |
| Thermally exposed | Platelets | Orowan - plates (Eq. 3) | Platelet volume fraction, f | 0.29 |
| | | | Avg. diameter, d | 6.0 μm |
| | | | Avg. planar thickness, t | 0.26 μm |
| | | Orowan - spheres (Eq. 1) | Avg. diameter, d | 0.28 μm |
| | | | Volume fraction, f | 0.022 |
| | Spherical particles | Orowan (Eqs. 1 and 2) | Volume fraction, f | 0.44 |
| | | | Avg. diameter, d | 1.2 μm |
| | Al matrix | Solid solution (Eq. 5) | $C_{Mn}$ | 0.3 at. % |
| | | | A | 54.8 (at. %)$^{-1}$ |
| | | | β | 1 |

TABLE 4

Calculated yield strength of each microstructure regions and the weighted yield strength of the combined structure compared with the measured Vickers microhardness of each region.

| Region | Predicted Yield Strength (MPa) | Measured Hardness (HV) |
|---|---|---|
| Rosettes | 147 | 166 ± 8 |
| Eutectic | 222 | 198 ± 18 |

These results give insight into the relative contributions of the two microstructural regions, and can be used to design additional Al—Ce—Mn alloys with desired properties, with the benefit of the present disclosure. In this example, the fine spacing of the eutectic region has a significantly higher yield strength than the primary $Al_{20}Mn_2Ce$ rosettes found at the melt pool boundaries. This difference in mechanical properties may help explain the fracture behavior of the as-fabricated sample shown in FIGS. 13A-13C. For example, in some examples, the coarse primary intermetallic region is continuous along the boundaries of the melt pool so if a crack initiates in this region, it is possible that it will preferentially propagate along these boundaries, resulting in the observed roughly hemispherical fracture site.

Example 4

In this example, an Al-10Ce-8Mn (wt %) alloy was fabricated using a chilled Cu casting mold followed by homogenization and aging at different temperatures. Results generated from this example, along with first-principles calculations for the enthalpy of formation certain data from literature sources were used to develop thermodynamic models for the $Al_{20}Mn_2Ce$ and $Al_{10}Mn_2Ce$ phases observed in certain embodiments. The thermodynamic models were then coupled with classic nucleation theory to rationalize the primary solidification of Al-rich Al—Ce—Mn alloys experimentally observed under rapid cooling conditions. Without being limited to a single working theory, it currently is believed that, compositionally, the primary solidification region of $Al_{10}Mn_2Ce$ is dominant in the Al-rich Al—Ce—Mn system while the corresponding region for $Al_{20}Mn_2Ce$ is small. And, for at least the particular alloy composition of this example, the $Al_{20}Mn_2Ce$ phase was not the thermodynamically stable phase at T<~600° C. It also is currently believed that the greater enthalpy of fusion of $Al_{10}Mn_2Ce$ than $Al_{20}Mn_2Ce$ leads to a greater interfacial energy between $Al_{10}Mn_2Ce$ and liquid, which can mean that the thermodynamic driving force for nucleation of $Al_{10}Mn_2Ce$ is greater than $Al_{20}Mn_2Ce$ in certain embodiments of an Al-rich Al—Ce—Mn alloy. Also, in at least this example, the combined effect of thermodynamic driving force and interfacial energy favored the nucleation of $Al_{20}Mn_2Ce$ in highly undercooled liquid resulting from high cooling rates in rapid solidification processes and additive manufacturing.

Alloy buttons with a nominal composition of Al-10Ce-8Mn (wt %) were prepared from the constituent elements (purity >99.95 at %) by arc melting in a Ti-gettered Ar atmosphere in a water-chilled copper hearth. The alloy buttons were flipped and re-melted more than 10 times to ensure good homogenization. Then alloy buttons were drop-cast into a Cu mold with a dimension of 25.4×19×101.6 mm$^3$. The total weight loss after drop casting was about ~0.37%. The composition of the ingot was chemically analyzed through inductively coupled plasma-optical emission spectrometry (ICP-OES). The measured composition for this example was Al-9.0Ce-6.2Mn (wt %) with trace amounts of impurities (Fe<0.03, Mg<0.01, Si<0.02, wt %). The cast ingot was then subjected to the following heat treatment: homogenization at 595° C. for 2 hours followed by aging different specimens at 450° C. for 100 hours, 400° C. for 150 hours, and 350° C. for 200 hours, respectively.

Microstructures were characterized using a scanning electron microscope (SEM) in the back-scattered electron (BSE) mode and the phase composition was measured by an electron probe micro-analyzer (EPMA). Specimens for SEM and EPMA were prepared using the Struers tegraForce-5/TegraPol-31 polishing system following standard metallographic procedure, in that the final polishing was performed with a mixture of 50% Colloidal Silica (Syton HT-50) and 50% Distilled Water. SEM BSE images were acquired on an S4800 Hitachi microscope with a beam energy of 15 Kev and beam current of 20 nA. EPMA compositional analyses were acquired on a JEOL 8200 microprobe equipped with 5 tunable wavelength dispersive spectrometers. Operating conditions were a beam energy of 15 keV and a beam current of 50 nA. Pure standards were used to determine the unknown composition.

X-Ray Diffraction Data was acquired with a PANalytical Empyrean instrument. The instrument was configured in a Bragg-Brentano geometry, using Cu-Kα radiation (45 KV and 40 mA). A PIXcel detector was used in the data collection along with an incident and diffracted beam optics, which include programmable divergent slits, and anti-scattering slits. Data was collected between 10 and 120 degrees, with a step size of 0.0131 degrees, though only between 10 and 46 degrees for data clarity.

Computer coupling of phase diagrams and thermo-chemistry (the CALPHAD approach) was used to develop a thermodynamic model of phase compositions. In this approach, the Gibbs energy of individual phases was modeled based on crystal structure, defect type, and phase chemistry. The model parameters were obtained through an optimization procedure that aims to consistently reproduce the experimentally assessed phase equilibria and thermodynamic properties by the model-calculated ones. The thermodynamic database, e.g., a compilation of Gibbs energy functions of individual phases, was modeled in sequence from unary, binary, and ternary. The Gibbs energy functions of the three unary systems Al, Ce and Mn were adopted from the SGTE (Scientific Group Thermodata Europe) database compiled by Dinsdale. The Gibbs energy functions of phases in the three constituent binaries were adopted from those for Al—Mn, Al—Ce, and Ce—Mn.

To accommodate for any uncertainties relating to the transition between $Al_8Mn_4Ce$ and $Al_{10}Mn_2Ce$ and the homogeneity range of individual phases, these two phases were treated as stoichiometric. $Al_{20}Mn_2Ce$ was also modeled as a stoichiometric compound due to negligible homogeneity range. The Gibbs energy for a stoichiometric compound is described by Equation 5:

$$G = x_{Al}G_{Al}^{ref} + x_{Ce}G_{Ce}^{ref} + x_{Mn}G_{Mn}^{ref} + \Delta H + T\Delta S \quad (5)$$

where $x_i$ is the mole fraction of element "i" and $G_i^{ref}$ is the Gibbs energy of element "i" at its stable structure. ΔH and ΔS are the enthalpy and entropy of formation of a ternary compound. Due to scarcity of phase equilibrium data, the enthalpies of formation of $Al_{20}Mn_2Ce$, $Al_{10}Mn_2Ce$ and $Al_8Mn_4Ce$ at zero K were calculated from first principles. The Perdew-Burke-Ernzerhof (PBE) exchange-correlation functional as implemented in Vienna Ab initio Simulation Package (VASP) was used for the total energy calculations. All the structures were fully relaxed with respect to all degrees of freedom (e.g., volume, shape, and internal atomic positions) to find the ground states of each structure. The energy cutoff for the plane-wave basis was set as 500 eV, and 10,000 k-points per reciprocal atom was used for the Brillouin-zone sampling. These enthalpies of formation were assumed constant with temperature and were not allowed to change substantially during optimization; specifically, the deviation from the first-principles-calculated value was limited to 10%. The entropies were also assumed as constant; they were optimized to fit available experimental data.

The Gibbs energy of disordered solution phases such as liquid and fcc(Al) is described by a substitutional solution model. The Gibbs energy of liquid and fcc (Al) phases in the ternary space was obtained through extrapolation of Gibbs energies of constituent binary phases, as shown in Equation 6. No ternary parameters were needed.

$$G = x_{Al}G_{Al}^{ref} + x_{Ce}G_{Ce}^{ref} + x_{Mn}G_{Mn}^{ref} + RT(x_{Al}\ln x_{Al} + x_{Ce}\ln x_{Ce} + x_{Mn}\ln x_{Mn}) + \Delta G_{binary}^{xs} \quad (6)$$

where, R and T are the universal gas constant and absolute temperature, respectively. $\Delta G_{binary}^{xs}$ is the excess energy contributed from the constituent binary systems.

Kinetic analysis on primary solidification from an undercooled liquid was performed based on classical homogeneous nucleation theory. The embryo of a solid phase can only survive when its size becomes larger than a critical dimension. Beyond that point, the embryo becomes stable and will grow further, that is a nucleus is formed. The rate of formation of these nuclei can be described by Equation 7:

$$I_v = k(T)\exp\left(-\frac{\Delta G^*}{RT}\right), \quad (7)$$

where k(T) is a function of atomic mobility.

The term k(T) can be expressed as:

$$K(T) = N_V \vartheta = N_V \frac{D}{a_0^2}, \quad (8)$$

where $N_V$ and $\vartheta$ are the number of atoms per unit volume in the liquid and the frequency of atoms attaching to the nucleus, respectively. The latter term can be further expressed as $D/a_0^2$, where D is a effective diffusion coefficient for nucleation and $a_0$ is the atomic diameter of the matrix. The quantity of ΔG* is called the activation barrier for nucleation of spherical particles and is given by Equation 9:

$$\Delta G^* = \frac{16}{3}\pi\frac{\gamma^3}{(\Delta G^2)} \quad (9)$$

where ΔG is the thermodynamic driving force for the transformation and γ is the interfacial energy between the new phase and the old one.

Another quantity that can affect nucleation barrier is interfacial energy between the liquid and φ phase. A first-order approximation of interfacial energy can be derived from the molar enthalpy of fusion $\Delta H_m$ as:

$$\gamma = \alpha \cdot \frac{\Delta H_m}{V_m^{2/3} N_a^{1/3}}, \quad (10)$$

where α is an empirical constant taken as 0.44, $V_m$ is molar volume and $N_a$ is the Avogadro's constant. In the current kinetic analysis, k(T) is assumed to be the same for $Al_{10}Mn_2Ce$ and $Al_{20}Mn_2Ce$ as k(T) is mainly related to atomic movement in liquid. This analysis is for homogeneous nucleation, as the characteristics of potential substrates for heterogeneous nucleation are unknown; however, the relative difference in nucleation rates between phases is expected to hold for heterogeneous nucleation if the contact angle for a given nucleation site is similar between $Al_{10}Mn_2Ce$ and $Al_{20}Mn_2Ce$ phases.

Figure 19A:
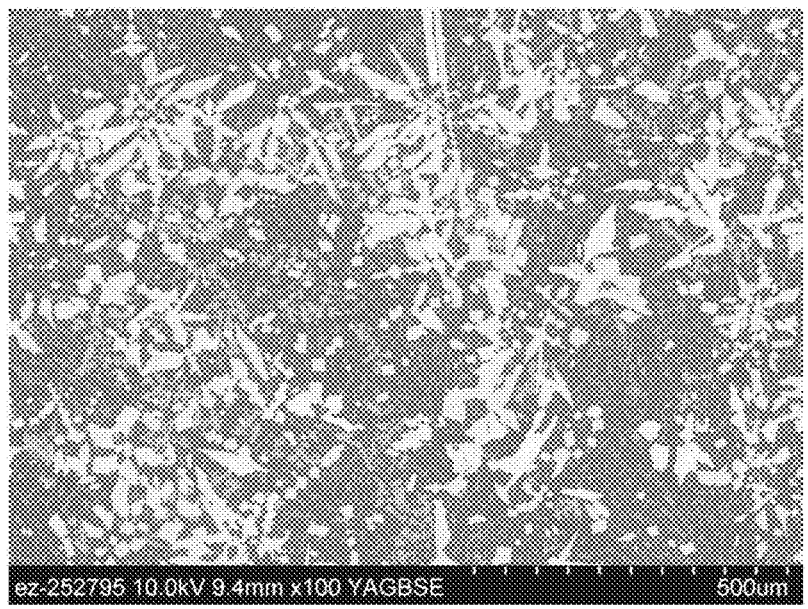
FIGS. 19A and 19B are low-magnification (FIG. 19A) and high-magnification (FIG. 19B) backscattered electron (BSE) images of as-cast samples of an Al—Ce—Mn alloy embodiment of the present disclosure, which has a composition of Al9Ce6.2Mn.
Figure 19B:
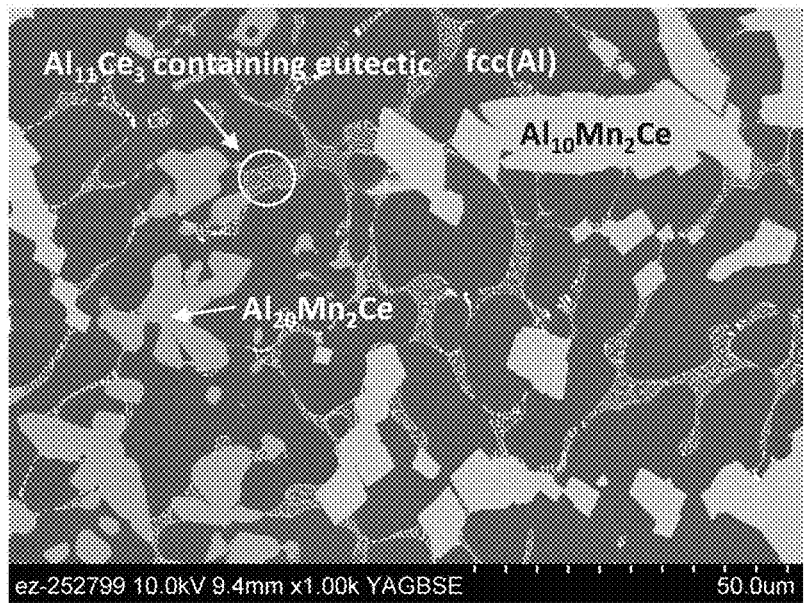
Figure 20:
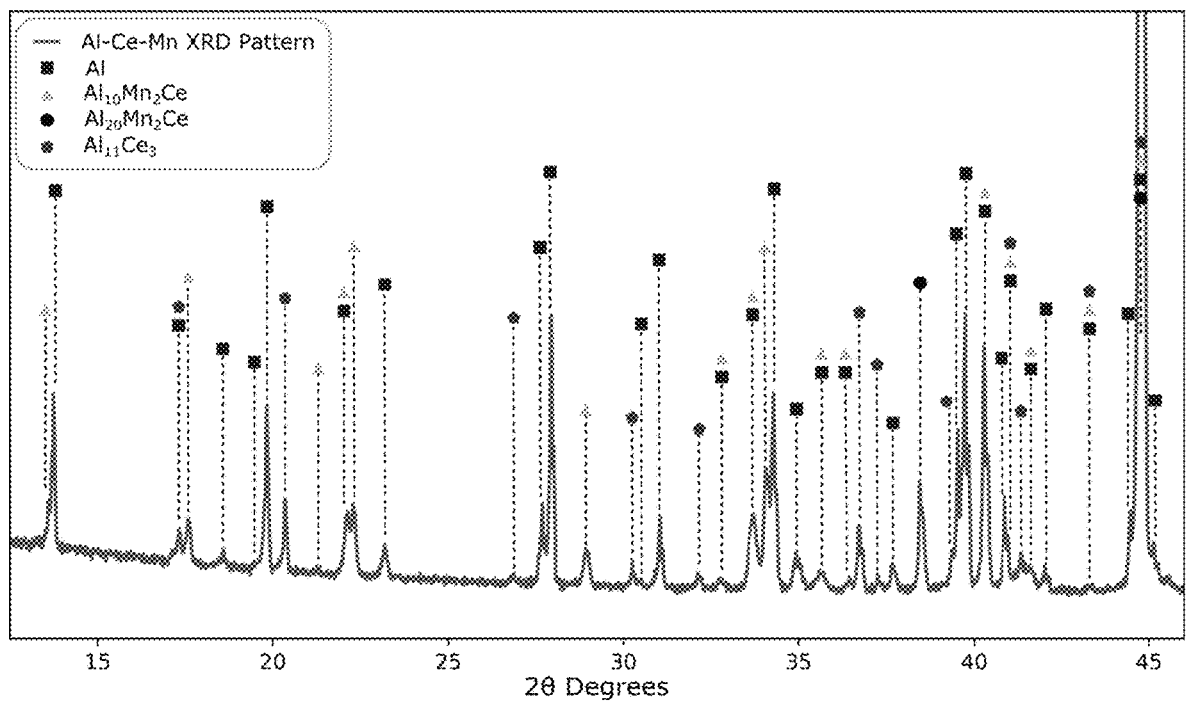
FIG. 20 is an X-ray diffraction spectrum showing X-ray diffraction data, taken from 10 to 46 degrees, of the alloy of FIGS. 19A and 19B, after casting.

The BSE images of the as-cast microstructure in FIG. 19A (low magnification) and FIG. 19B (high magnification)

show that other than the fine eutectic phases, there are three coarse phases: a light gray faceted phase, a medium gray interdendritic phase, and a dark gray dendritic phase in the as-cast microstructure. The contrast corresponds to the average atomic weight of individual phases. The atomic weight of $Al_{20}Mn_2Ce$ and $Al_{10}Mn_2Ce$ are 34.3 and 40 (g/mol), respectively. Electron probe microanalysis (EPMA) results suggested that they have compositions of Al-8.2Ce-15.1Mn, Al-5.3Ce-9.0Mn and Al-0.1Ce-0.6Mn in at %, respectively. All compositional measurements have a standard deviation of 5 relative at %. In view of this, it currently is believed that the composition of light gray phase corresponds to $Al_{10}Mn_2Ce$, medium gray to $Al_{20}Mn_2Ce$ and dark gray to fcc(Al). The XRD results in FIG. 20 confirmed the existence of these three phases. In addition to peaks from $Al_{20}Mn_2Ce$, $Al_{10}Mn_2Ce$ and fcc(Al), peaks from $Al_{11}Ce_3$ were also observed in the as-cast microstructure, which corresponds to the bright phases in the fine eutectic region. The EPMA shows that this phase is more Ce-rich than other phases presented in the microstructure, which is consistent with the XRD results. Any abnormal intensity of the aluminum peaks is currently believed to result from texture produced during Cu-mold casting.

Figure 21:
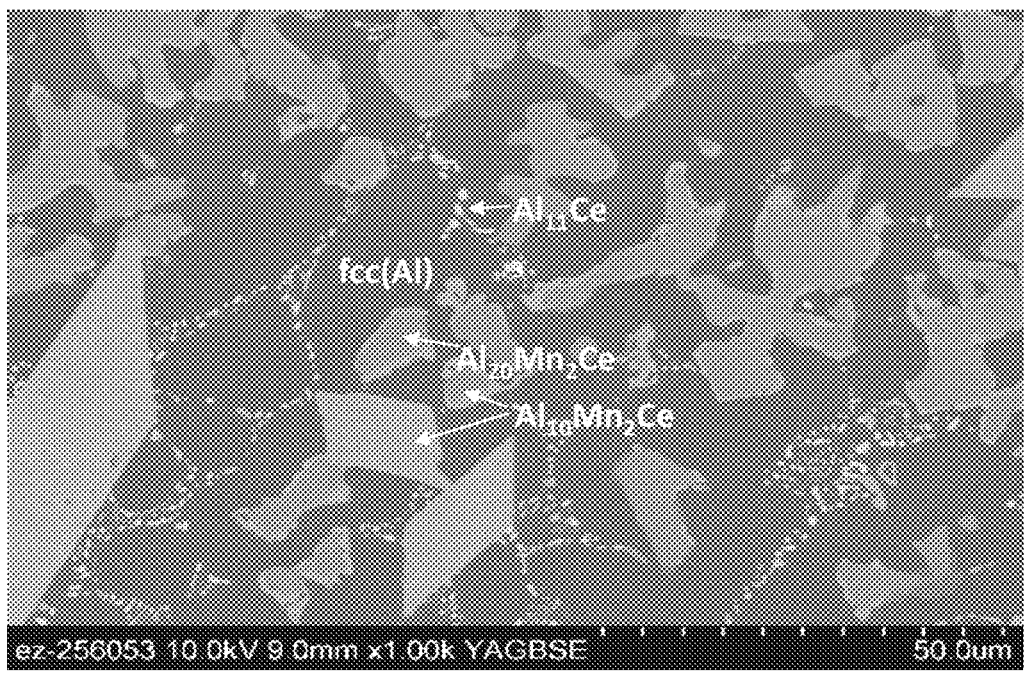
FIG. 21 is a BSE image of the as-cast sample of FIGS. 19A and 19B, after homogenization at 595° C. for 2 hours.

The as-cast alloy of this example was subjected to homogenization at 595° C. for 2 hours followed by a room-temperature water quench. The microstructure of the as-homogenized alloy is shown in FIG. 21. The as-homogenized microstructure differs from the as-cast microstructure mainly in that a layer of the $Al_{10}Mn_2Ce$ phase (light gray) was formed on the edge the $Al_{20}Mn_2Ce$ phase (medium gray). This microstructural feature suggests that the $Al_{20}Mn_2Ce$ phase, in some embodiments, may not be stable at 595° C. and that it can transform to $Al_{10}Mn_2Ce$ through a peritectoid type of solid-state reaction: $Al_{20}Mn_2Ce+fcc(Al) \rightarrow Al_{10}Mn_2Ce$. This reaction was not complete due to the sluggish kinetics of peritectoid reaction caused by the need for solute diffusion through the reaction product. In this case, the newly formed $Al_{10}Mn_2Ce$ layer made the mass transport between fcc(Al) and $Al_{20}Mn_2Ce$ more difficult and further slowed down the reaction kinetics. On the other hand, the faceted $Al_{10}Mn_2Ce$ phase in the as-cast microstructure did not show any noticeable change upon homogenization, suggesting that it is a thermodynamically stable phase at 595° C. $Al_{11}Ce_3$ shows slightly coarsening after homogenization, suggesting it is also a thermodynamically stable phase.

Figure 22A:
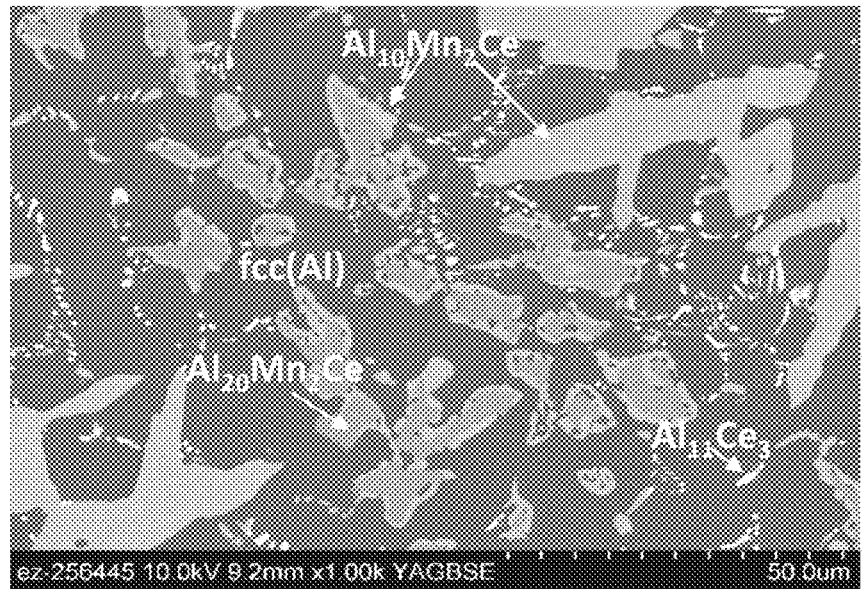
FIGS. 22A-22C are BSE images of the homogenized sample of FIG. 21 after aging at 450° C. for 100 hours (FIG. 22A), 400° C. for 150 hours (FIG. 22B), and 350° C. for 200 hours (FIG. 22C).
Figure 22B:
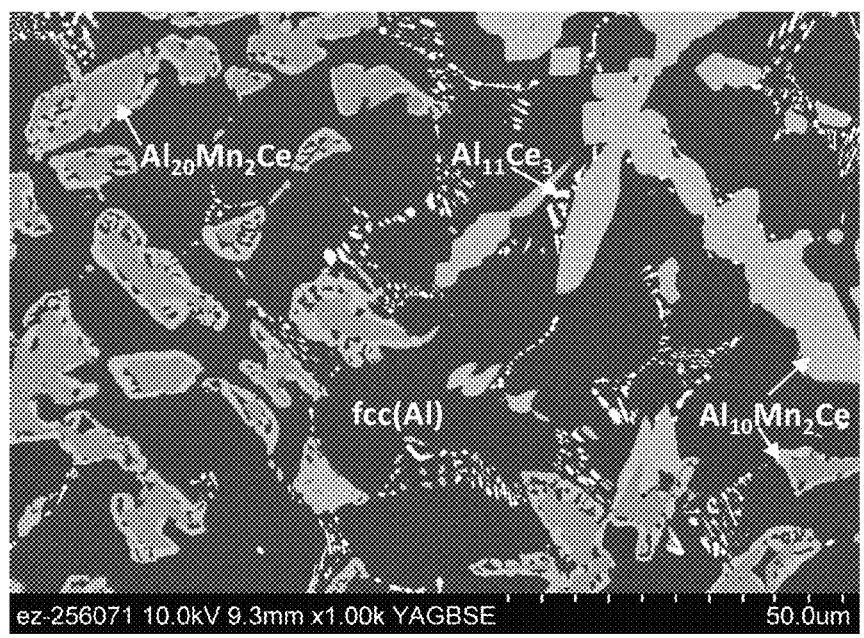
Figure 22C:
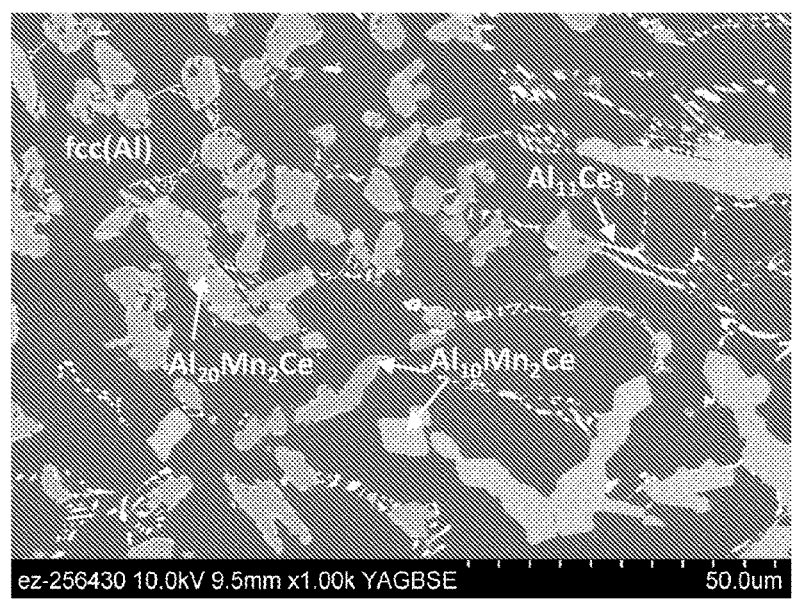

The homogenized alloy was aged at 450° C. for 100 hours, 400° C. for 150 hours, and 350° C. for 200 hours, respectively. The microstructures from these aged conditions are shown in FIGS. 22A (top), 22B (middle) and 22C (bottom), respectively. These microstructures look similar to that of the as-homogenized sample except that the reaction from $Al_{20}Mn_2Ce$ to $Al_{10}Mn_2Ce$ proceeds more progressively, although this reaction was not able to complete under any of the three aging conditions in some examples. Based on the Gibbs phase rule, at a fixed pressure and temperature, the maximum number of equilibrium phases in a ternary system that can coexist is three. In FIGS. 22A-22C, each condition shows four coexisting phases: $Al_{10}Mn_2Ce$, $Al_{20}Mn_2Ce$, fcc(Al) and $Al_{11}Ce_3$, of which the $Al_{20}Mn_2Ce$ was not a thermodynamically stable phase at least in this example. As such, it currently is believed that the phase equilibria in the Al-10Ce-8Mn alloy is fcc(Al)+$Al_{10}Mn_2Ce$+$Al_{11}Ce_3$ from 350° C. to 595° C.

TABLE 5

Ab-initio calculated formation energy and lattice constant of $Al_{20}Mn_2Ce$, $Al_8Mn_4Ce$ and $Al_{10}Mn_2Ce$ at 0K and compared with the Calphad calculated or experimental values (in parenthesis), together with crystal structure information.

| | Crystal structure | Lattice constant (Å) | Formation energy (ev) | Formation energy (ev/atom) | Formation energy (J/mole atom) |
|---|---|---|---|---|---|
| $Al_{20}Mn_2Ce$ | fd3̄m, xx184 | (14.4) | −3.991 | −0.174 | −16741 (−15374) |
| $Al_8Mn_4Ce$ | I4/mmm | | −4.004 | −0.308 | −29717 (−29127) |
| $Al_{10}Mn_2Ce$ | P4/nmm xx52 | (9.5) | −3.947 | −0.304 | −29292 (−31550) |

Figure 23A:
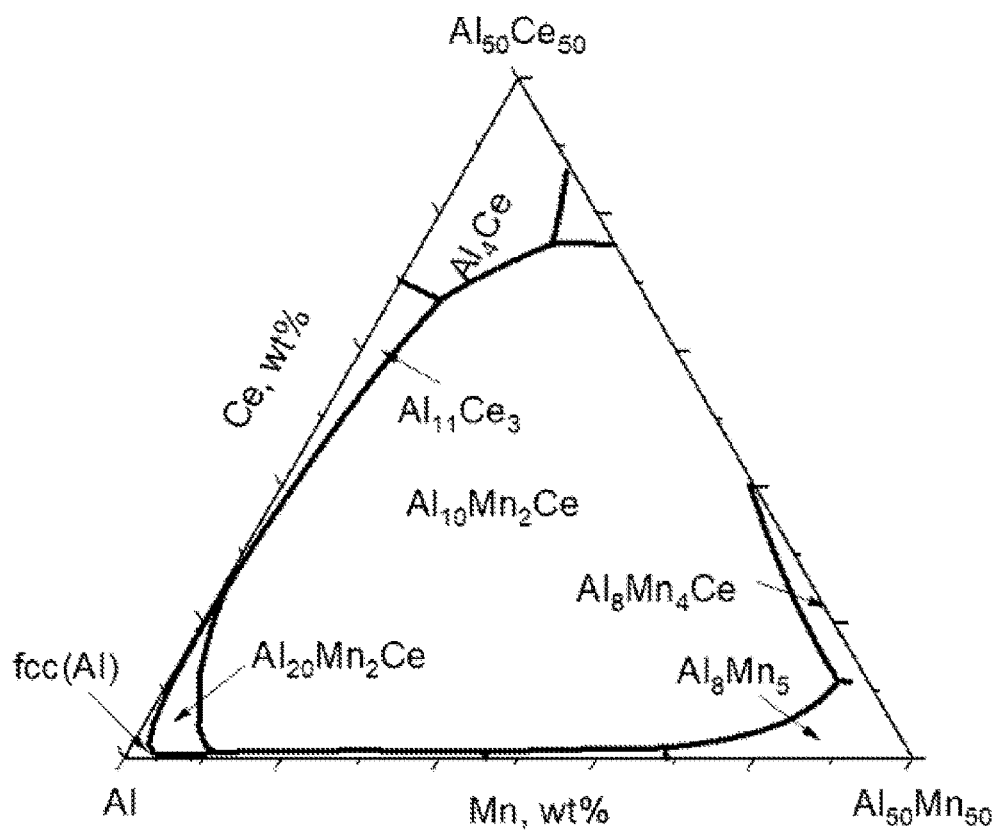
FIGS. 23A-23C shows a liquidus projection of Al—Ce—Mn and invariant reactions (I1, P1-6) in the Al-rich region (FIG. 23A), wherein enlarged figures along the Al—Ce binary (FIG. 23B) and Al—Mn binary (FIG. 23C) also are illustrated.
Figure 23B:
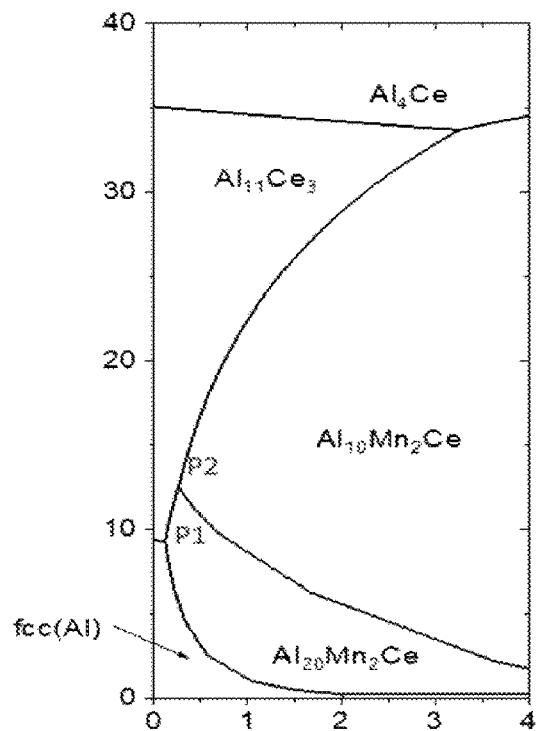
Figure 23C:
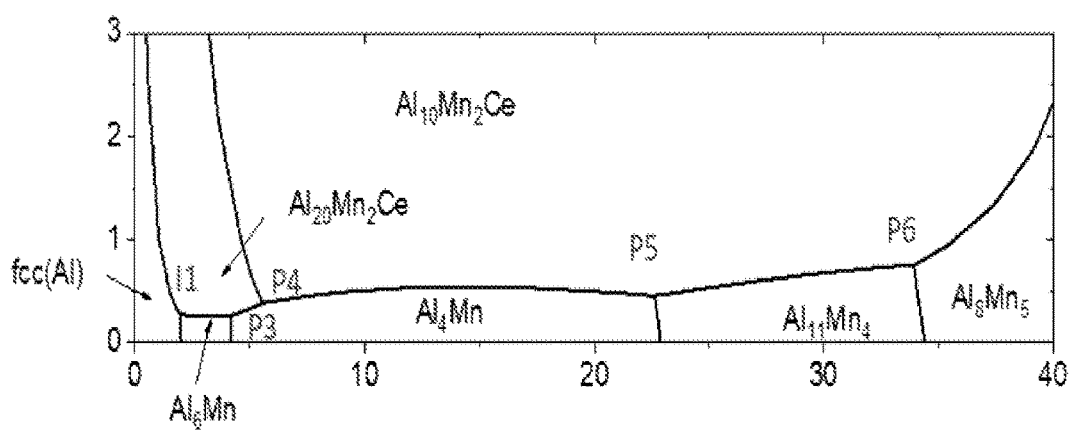

The liquidus projection in the Al-rich region (Al wt % greater than 50%) of the Al—Ce—Mn ternary is shown in FIGS. 23A-23C. The primary solidification region of $Al_{10}Mn_2Ce$ predominates according to the calculated results. A small primary solidification region of $Al_{20}Mn_2Ce$ was calculated to exist towards the Al corner. Other primary solidification regions are extended from those of binary phases, such as $Al_4Ce$, $Al_{11}Ce_3$, $Al_6Mn$, $Al_4Mn$, $Al_{11}Mn_4$, and $Al_8Mn_5$. The liquidus projection along the Al—Ce and Al—Mn binaries are enlarged to show the primary solidification regions of these binary phases. A total of seven invariant reactions were predicted in the Al-rich region of Al—Ce—Mn system, labeled as I1 and P1~P6. "I" means eutectic type and "P" peritectic type. The reaction with the lowest temperature is Liquid+$Al_{20}Mn_2Ce \rightarrow$fcc(Al)+$Al_{11}Ce_3$ at 641° C. In this example, both the nominal (Al-10Ce-8Mn) and measured (Al-9Ce-6.23Mn) compositions are in the primary solidification region of $Al_{10}Mn_2Ce$.

Figure 24A:
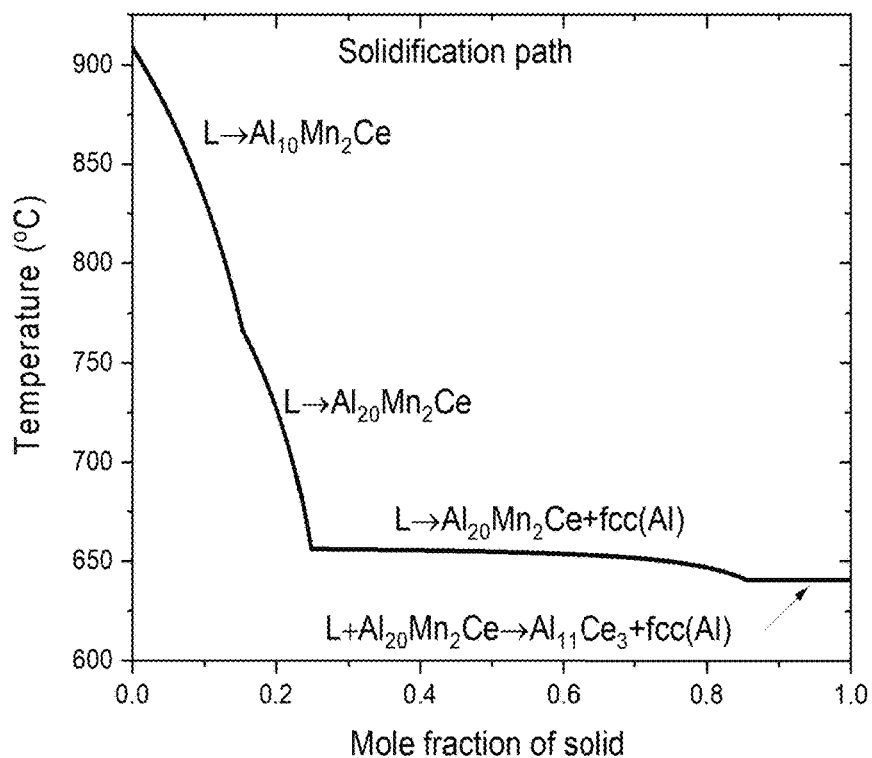
FIGS. 24A and 24B are graphs showing a calculated solidification path in an Al9Ce6.2Mn alloy, using the Scheil model (FIG. 24A) and calculated phase fractions as a function of temperature under equilibrium conditions (FIG. 24B).

Based on the current thermodynamic database, the solidification path of the Al-9Ce-6.23Mn alloy was calculated using the Scheil model, as shown in FIG. 24A. This model assumes phase equilibrium at the liquid-solid interface, no diffusion in solid and infinite diffusion in liquid. Based on the calculation and without being limited to a single theory, it currently is believed that the solidification sequence in this alloy starts with the primary solidification of $Al_{10}Mn_2Ce$. Then the liquid composition transverses the peritectic ridge between $Al_{10}Mn_2Ce$ and $Al_{20}Mn_2Ce$ into the primary solidification region of $Al_{20}Mn_2Ce$, leading to primary solidification of $Al_{20}Mn_2Ce$. After that, the liquid composition hits the eutectic valley between fcc(Al) and $Al_{20}Mn_2Ce$, to form the eutectic of fcc (Al)+$Al_{20}Mn_2Ce$. Finally, the liquid composition hits the eutectic valley between fcc(Al) and $Al_{11}Ce_3$. This eutectic reaction continues until all liquid is consumed. Therefore, the presence of the primary phases of $Al_{10}Mn_2Ce$ and $Al_{20}Mn_2Ce$, eutectic of fcc(Al)+$Al_{20}Mn_2Ce$, and eutectic of fcc(Al)+$Al_{11}Ce_3$ in the as-cast microstructure in FIGS. 19A and 19B agrees with the calculated solidification path.

Figure 24B:
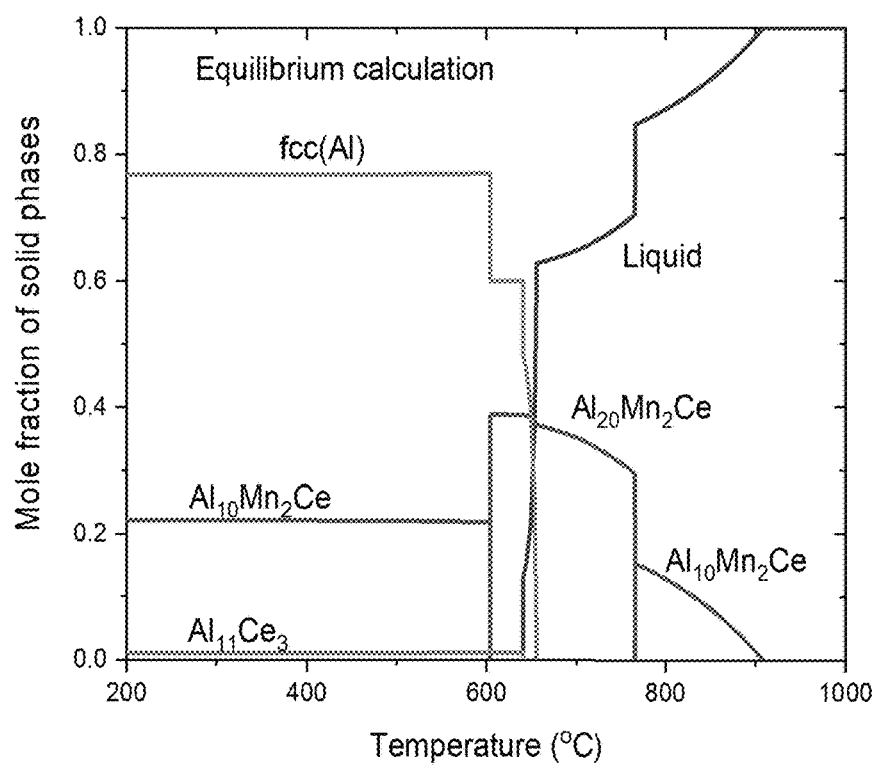

The microstructure in the homogenized and aged samples were compared to equilibrium calculation results in FIG. 24B, in which the mole fraction of equilibrium phases was plotted against temperature. Without being limited to a particular theory, it currently is believed that the model predicts that $Al_{10}Mn_2Ce$, fcc(Al) and $Al_{11}Ce_3$ are the three equilibrium phases at temperatures below 600° C. This equilibrium state can explain why the $Al_{20}Mn_2Ce$ phase (formed during solidification), in some embodiments, decomposes in subsequent homogenization and aging.

Figure 25A:
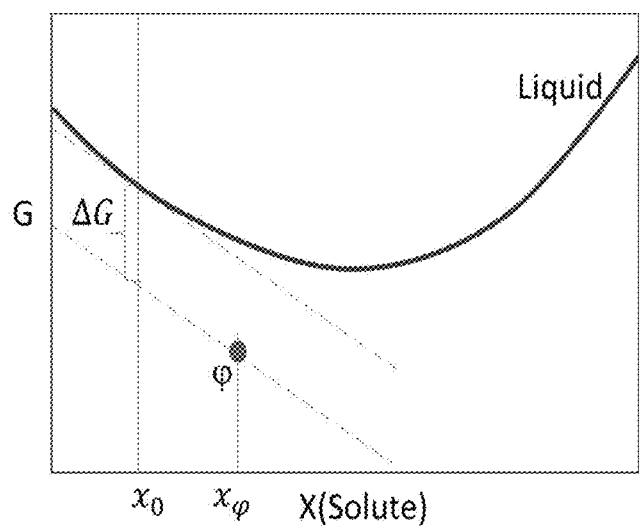
FIG. 25A-25D show a schematic diagram showing thermodynamic driving force ($\Delta G$) for transformation from liquid to solid $\varphi$ (FIG. 25A); calculated $\Delta G$ for $Al_{10}Mn_2Ce$ and $Al_{20}Mn_2Ce$ in the Al9Ce6.2Mn alloy as a function of temperature (FIG. 25B); and calculated $\Delta G$ as a function of liquid composition at 700° C. for $Al_{10}Mn_2Ce$ and $Al_{20}Mn_2Ce$ (FIGS. 25C and 25D, respectively).
Figure 25B:
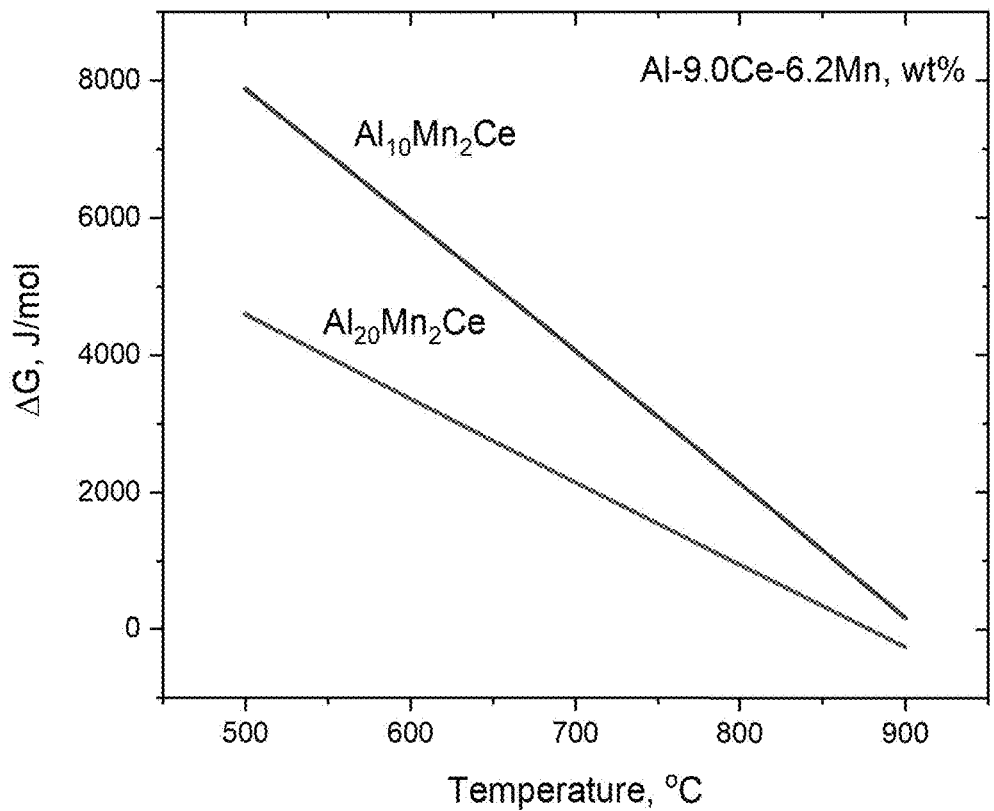
Figure 25C:
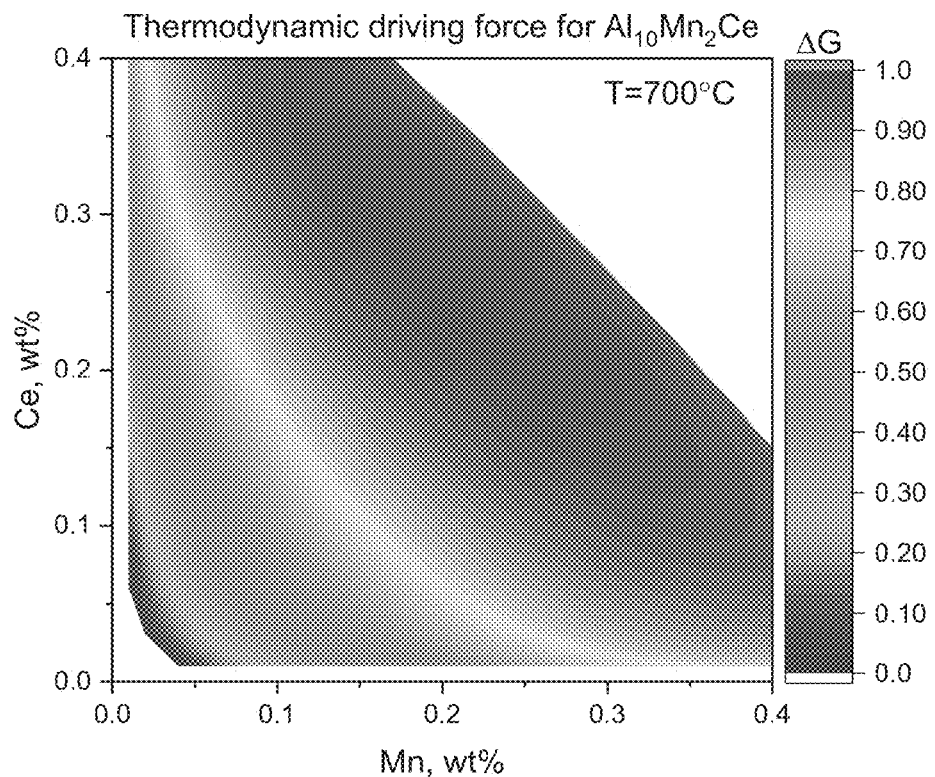
Figure 25D:
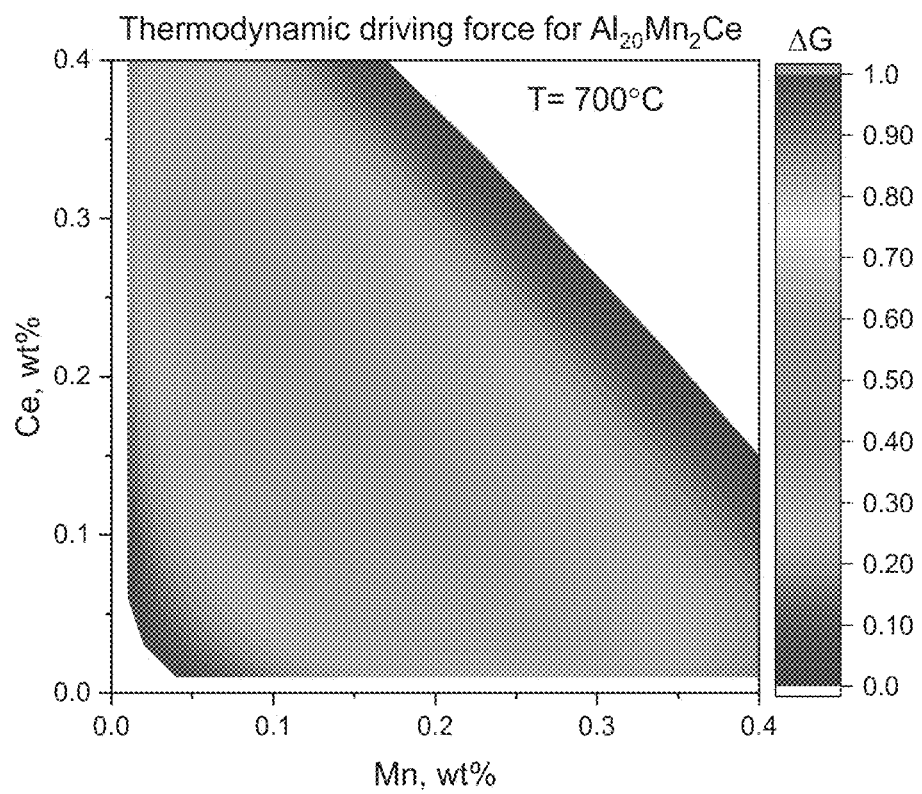

To understand nucleation kinetics, the thermodynamic driving force (ΔG) for nucleation at a given temperature and pressure should be understood. This (ΔG) function is schematically drawn in FIG. 25A, where $x_0$ and $x_\varphi$ are the solute content of the liquid and φ phases, respectively. The distance between the tangent line of Gibbs energy function of liquid at $x_0$ and the parallel line that crosses the Gibbs energy of the φ phase is defined as the thermodynamic driving force. With the developed thermodynamic models for liquid and φ phases, the thermodynamic driving force for any given melt composition at any given temperature and pressure can be calculated. For the Al-9.0Ce-6.2Mn alloy, the calculated thermodynamic driving forces for solidification of $Al_{10}Mn_2Ce$ and $Al_{20}Mn_2Ce$ as a function of temperature are plotted in FIG. 25B. It shows that the thermodynamic driving force for solidification of $Al_{10}Mn_2Ce$ is greater than $Al_{20}Mn_2Ce$ at all temperatures for the Al-9Ce-6.23Mn alloy. The thermodynamic driving force of $Al_{10}Mn_2Ce$ and $Al_{20}Mn_2Ce$ at 700° C. also was calculated as a function of composition for the Al-rich region of the Al—Ce—Mn system (Al wt % great than 50%), as shown in FIGS. 25C and 25D. The calculated results again show that the thermodynamic driving force for nucleation of $Al_{10}Mn_2Ce$ is greater than that of $Al_{20}Mn_2Ce$ throughout the entire composition range.

The interfacial energy between solid and liquid also is calculated. The parameters and the calculated interfacial energies for such calculations are listed in Table 6. The enthalpy of fusion was calculated from the current thermodynamic models. The molar volume was calculated from the density which were calculated from the lattice constants.

TABLE 6

| Compounds | $\Delta H_m$ (J/mol) | Density (g/m³) | $V_m$ (m³/mol) | γ (J/m²) |
|---|---|---|---|---|
| $Al_{10}Mn_2Ce$ | 28238 | 4070000 | 9.828e–6 | 0.321 |
| $Al_{20}Mn_2Ce$ | 14612 | 3500000 | 9.814e–6 | 0.166 |

Figure 26:
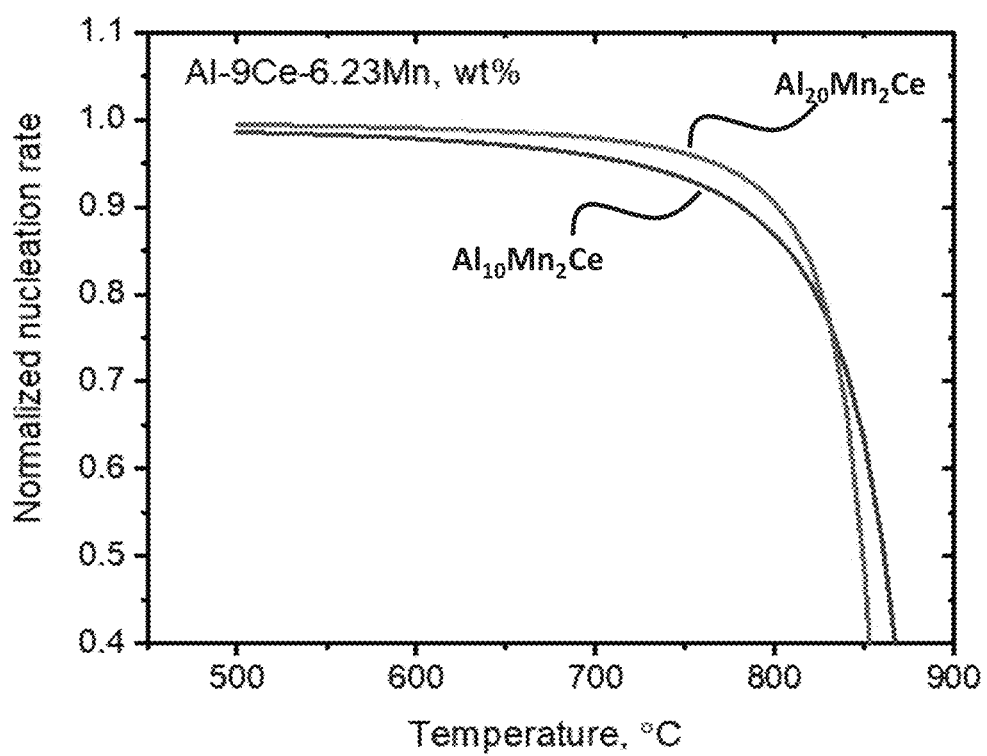
FIG. 26 is a graph showing normalized nucleation rate of $Al_{10}Mn_2Ce$ and $Al_{20}Mn_2Ce$ in Al-9Ce-6.23Mn as a function of temperature of undercooled liquid.

The interfacial energy between $Al_{20}Mn_2Ce$ and liquid is approximately half of that between $Al_{10}Mn_2Ce$, which is due to the smaller enthalpy of fusion of $Al_{10}Mn_2Ce$. Substituting the thermodynamic driving force and interfacial energy into the nucleation rate equation, the nucleation rates for $Al_{10}Mn_2Ce$ and $Al_{20}Mn_2Ce$ as function of temperature for the Al-9Ce-6.23Mn alloy can be calculated, as shown in FIG. 26. The plotted nucleation rate in FIG. 1 is a normalized quantity by dividing K(T) or $$N_V \frac{D}{a_0^2},$$

assuming the same K(T) for $Al_{10}Mn_2Ce$ and $Al_{20}Mn_2Ce$. The results suggest that at temperature T>~830° C., the nucleation rate for $Al_{10}Mn_2Ce$ phase is greater than $Al_{20}Mn_2Ce$ phase, while at temperature T<~830° C., the nucleation rate for $Al_{20}Mn_2Ce$ phase is greater. This plot suggests that when under fast cooling conditions, the liquid is quickly undercooled to temperatures below 830° C. and the nucleation of the $Al_{20}Mn_2Ce$ phase alone is preferred. Under conventional casting conditions, however, the melt cannot be undercooled fast enough to reach the temperature regime where the nucleation of $Al_{10}Mn_2Ce$ can be completely bypassed.

FIG. 1 plots the ratio of calculated nucleation rate of $Al_{10}Mn_2Ce$ to that of $Al_{20}Mn_2Ce$ in the Al-rich region of the Al—Ce—Mn system. The calculation assumes that the liquid can be quickly undercooled to 700° C. The gray zone is the region with nucleation ratio greater than 1, (indicating that the nucleation of $Al_{10}Mn_2Ce$ is preferred). The colored zone is the region with the ratio smaller than 1 (indicating that the nucleation of $Al_{20}Mn_2Ce$ is preferred). The larger region enclosed by the dashed lines is the calculated primary solidification region for $Al_{10}Mn_2Ce$, and the smaller one is for $Al_{20}Mn_2Ce$, as shown in the liquidus projection in FIG. 23. The comparison suggests if the liquid can be quickly undercooled to 700° C., the nucleation-preferred regime for the $Al_{20}Mn_2Ce$ phase is much broader than the primary solidification region calculated from liquidus projection. The star symbols denote the stoichiometric compositions of $Al_{10}Mn_2Ce$ and $Al_{20}Mn_2Ce$.

In view of the many possible embodiments to which the principles of the present disclosure may be applied, it should be recognized that the illustrated embodiments are only preferred examples and should not be taken as limiting. Rather, the scope of the present disclosure is defined by the following claims. We therefore claim as our invention all that comes within the scope and spirit of these claims.

We claim:

1. An alloy composition for additive manufacturing, comprising:
   4 wt % to 20 wt % cerium;
   5 wt % to 15 wt % manganese;
   zero to 2 wt % iron;
   zero to 2 wt % magnesium;
   zero to 2 wt % zirconium; and
   a balance of aluminum;
   wherein the amount of the cerium and the amount of the manganese are selected to provide an aluminum matrix phase, an $Al_{20}Mn_2Ce$ intermetallic phase, and an $Al_{10}Mn_2Ce$ intermetallic phase upon additively manufacturing the composition,
   provided that the alloy composition is not selected from the formulas Al5Mn2Ce, Al6Mn2Ce, Al8Mn4Ce, Al6Mn4Ce, Al10Mn5Ce, or Al12Mn2Ce, wherein amounts of alloying elements in the formulas are in atomic percent.

2. The alloy composition of claim 1, wherein the cerium is present in an amount ranging from 8 wt % to 20 wt %.

3. The alloy composition of claim 1, wherein the cerium is present in an amount ranging from 8 wt % to 12 wt %.

4. The alloy composition of claim 1, wherein the manganese is present in an amount ranging from 5 wt % to 10 wt %.

5. The alloy composition of claim 1, wherein the alloy comprises iron and the iron is present in an amount ranging from greater than zero wt % to less than 1 wt %.

6. The alloy composition of claim 1, wherein the alloy comprises magnesium and/or zirconium and wherein each of the magnesium and/or zirconium is present in an amount ranging from greater than 0 wt % to 2 wt % or less.

7. The alloy composition of claim 1, wherein the alloy further comprises silicon, nickel, scandium, vanadium, titanium, erbium, or any combination thereof, wherein each of the silicon, nickel, scandium, vanadium, titanium, and erbium are individually present in an amount ranging from greater than 0 wt % to 1% or less.

8. The alloy composition of claim 1, wherein the alloy comprises 10 wt % cerium, 8 wt % manganese, zero wt % to less than 0.1 wt % iron, zero wt % to less than 0.1 wt % silicon, zero wt % to 0.02 wt % or less magnesium, and a balance of aluminum.

9. A method, comprising:
   (a) adding a first amount of a feedstock comprising the alloy composition of claim 1 to a build platform;

(b) exposing the first amount, or a portion thereof, of the feedstock to an energy source to provide a first energy-treated region on the build platform;
(c) adding a second amount of the feedstock to the build platform, wherein the second amount of the feedstock is positioned immediately adjacent to the first energy-treated region on the build platform; and
(d) exposing the second amount, or a portion thereof, of the feedstock to the energy source to provide a second energy-treated region on the build platform.

10. The method of claim 9, further comprising repeating any one of (a) through (d).

11. The method of claim 9, wherein the feedstock is a feedstock powder and the energy source is a laser.

12. The method of claim 11, wherein each of the first energy-treated region and the second energy-treated region comprises a consolidated alloy formed from melting and consolidating particles of the feedstock powder.

13. The method of claim 9, wherein the method is used to make a fabricated bulk component comprising an Al—Ce—Mn alloy and comprising a heterogeneous microstructure.

14. The method of claim 9, wherein the wherein the $Al_{20}Mn_2Ce$ intermetallic phase has a higher nucleation rate than the $Al_{10}Mn_2Ce$ intermetallic at a melt temperature of 700° C.

15. The alloy composition of claim 1, wherein the $Al_{20}Mn_2Ce$ intermetallic phase has a higher nucleation rate than the $Al_{10}Mn_2Ce$ intermetallic at a melt temperature of 700° C.

16. An alloy composition for additive manufacturing, comprising:

4 wt % to 20 wt % cerium;

5 wt % to 15 wt % manganese;

zero to 2 wt % iron;

zero to 2 wt % magnesium;

zero to 2 wt % zirconium; and a balance of aluminum;

wherein the amount of the cerium and the amount of the manganese are selected to provide an aluminum matrix phase and an $Al_{10}Mn_2Ce$ intermetallic phase upon additively manufacturing the composition, provided that the alloy composition is not selected from the formulas Al5Mn2Ce, Al6Mn2Ce, Al8Mn4Ce, Al6Mn4Ce, Al10Mn5Ce, or Al12Mn2Ce, wherein amounts of alloying elements in the formulas are in atomic percent.

* * * * *